US012783264B2

(12) United States Patent
Tryfonas et al.

(10) Patent No.: US 12,783,264 B2
(45) Date of Patent: Nov. 3, 2026

(54) ARTIFICIAL INTELLIGENCE VOICE AGENT INTEGRATION USING OVERLAY APPLICATION TOOLS

(71) Applicant: Teameight.AI Inc., Sammamish, WA (US)

(72) Inventors: Christos Tryfonas, Foster City, CA (US); Purushottam Shridhar Amradkar, Sammamish, WA (US); Chinna Polinati, Snoqualmie, WA (US)

(73) Assignee: Teameight.AI Inc., Sammamish, WA (US)

( * ) Notice: Subject to any disclaimer, the term of this patent is extended or adjusted under 35 U.S.C. 154(b) by 0 days.

(21) Appl. No.: 19/574,217

(22) Filed: Mar. 20, 2026

(65) Prior Publication Data

US 2026/0289515 A1 Sep. 24, 2026

Related U.S. Application Data

(60) Provisional application No. 63/811,517, filed on May 23, 2025, provisional application No. 63/775,785, filed on Mar. 21, 2025.

(51) Int. Cl.

| | |
|---|---|
| ***G06Q 10/109*** | (2023.01) |
| ***G06F 3/16*** | (2006.01) |
| ***G06T 11/60*** | (2026.01) |
| ***G10L 15/18*** | (2013.01) |
| ***G10L 15/22*** | (2006.01) |
| ***G10L 15/30*** | (2013.01) |
| ***H04L 9/40*** | (2022.01) |

(52) U.S. Cl.
CPC ........... *G06Q 10/109* (2013.01); *G06F 3/165* (2013.01); *G06T 11/60* (2013.01); *G10L 15/1815* (2013.01); *G10L 15/22* (2013.01); *H04L 63/10* (2013.01); *G06T 2200/24* (2013.01); *G10L 2015/223* (2013.01); *G10L 15/30* (2013.01)

(58) Field of Classification Search
None
See application file for complete search history.

(56) References Cited

U.S. PATENT DOCUMENTS 7,007,235 B1 * 2/2006 Hussein ................. G06Q 10/10 715/753
8,706,689 B1 * 4/2014 Adam .................. G06Q 10/101 707/616
9,712,576 B1 * 7/2017 Gill .......................... G06N 5/04

(Continued)

*Primary Examiner* — Teshome Hailu
*Assistant Examiner* — Mahabub S Ahmed
(74) *Attorney, Agent, or Firm* — Ashurst Perkins Coie US LLP

(57) ABSTRACT

Systems, methods, and computer-readable media are disclosed herein for integrating an artificial intelligence (AI) voice agent into a meeting such that the voice agent responsively manipulates an overlay application accessible by a user. An invitation specifying an operation mode for the voice agent can be obtained from the user and the voice agent can be activated in accordance with the operation mode. The voice agent can be provided with access to a set of tools, each of which, when executed, performs a function of the overlay application. An execution request for a particular tool can be obtained from the voice agent and, in response to obtaining the execution request, the particular tool can be executed.

20 Claims, 23 Drawing Sheets

(56) References Cited

U.S. PATENT DOCUMENTS

| | | | | |
|---|---|---|---|---|
| 11,948,560 | B1 * | 4/2024 | Coursey | G10L 15/1815 |
| 12,469,483 | B1 * | 11/2025 | Tran | G06F 40/56 |
| 12,585,655 | B1 * | 3/2026 | Nucci | G06F 16/24542 |
| 2003/0145054 | A1 * | 7/2003 | Dyke | H04L 65/1096 709/227 |
| 2010/0332404 | A1 * | 12/2010 | Valin | G06Q 99/00 705/310 |
| 2013/0144603 | A1 * | 6/2013 | Lord | H04L 67/306 704/235 |
| 2013/0226758 | A1 * | 8/2013 | Reitan | G06Q 30/02 705/35 |
| 2014/0344718 | A1 * | 11/2014 | Rapaport | H04L 67/306 715/753 |
| 2018/0115645 | A1 * | 4/2018 | Iyer | G06N 3/09 |
| 2022/0051691 | A1 * | 2/2022 | Goshen | G06F 3/167 |
| 2022/0093088 | A1 * | 3/2022 | Rangarajan Sridhar | G06F 16/338 |
| 2022/0130379 | A1 * | 4/2022 | Sharifi | G06F 16/90332 |
| 2022/0182253 | A1 * | 6/2022 | Pawar | G06Q 10/1093 |
| 2024/0169980 | A1 * | 5/2024 | Choi | G06F 3/167 |
| 2024/0272877 | A1 * | 8/2024 | Girdhar | G06F 8/33 |
| 2024/0385744 | A1 * | 11/2024 | White | G06F 3/04883 |
| 2024/0412720 | A1 * | 12/2024 | Vasylyev | G06F 16/90332 |
| 2024/0422291 | A1 * | 12/2024 | Ramde | H04N 7/155 |
| 2024/0428798 | A1 * | 12/2024 | Engelke | G10L 15/01 |
| 2025/0028579 | A1 * | 1/2025 | Mehmeri | G06F 9/543 |
| 2025/0063140 | A1 * | 2/2025 | Grillo | G06F 3/0481 |
| 2025/0182754 | A1 * | 6/2025 | Saad | G10L 13/02 |
| 2025/0316263 | A1 * | 10/2025 | Rosenberg | G10L 15/22 |
| 2025/0345009 | A1 * | 11/2025 | Vakili | A61B 5/7465 |
| 2025/0350703 | A1 * | 11/2025 | Inkpen | H04L 51/02 |
| 2026/0024547 | A1 * | 1/2026 | Shriberg | G10L 25/63 |
| 2026/0065016 | A1 * | 3/2026 | Fox | G06N 3/044 |
| 2026/0080869 | A1 * | 3/2026 | Byrd | G06F 16/9535 |
| 2026/0099975 | A1 * | 4/2026 | Gronsbell | G06T 13/40 |
| 2026/0101019 | A1 * | 4/2026 | Harrington | H04N 7/155 |
| 2026/0127554 | A1 * | 5/2026 | Yoon | G06Q 10/109 |
| 2026/0128919 | A1 * | 5/2026 | Dallas | H04L 12/1822 |

* cited by examiner

ARTIFICIAL INTELLIGENCE VOICE AGENT INTEGRATION USING OVERLAY APPLICATION TOOLS

CROSS-REFERENCE TO RELATED APPLICATIONS

This application claims priority to and the benefits of U.S. Provisional Application No. 63/755,785, titled "REAL-TIME AND ON-DEMAND VIRTUAL COMPUTING ENVIRONMENT SUPPLEMENTATION SYSTEMS AND METHODS" and filed on Mar. 21, 2025, and U.S. Provisional Application No. 63/811,517, titled "ENTITY MODELS GENERATED USING ARTIFICIAL INTELLIGENCE" and filed on May 23, 2025. The contents of the aforementioned applications are herein incorporated by reference in their entirety.

TECHNICAL FIELD

The systems, methods, and computer-readable media disclosed herein relate generally to enhancing/supplementing an in-meeting experience for computer-enabled environments, such as virtual meetings. In particular, enhancements can pertain to visual overlays and presentation tools for virtual meetings as well as the integration of expert and artificial intelligence (AI) agent attendees to these meetings.

BACKGROUND

A slideshow presentation is a series of data artifacts (or "slides") that are displayed in sequence to an audience. Each slide can contain text, images, charts, videos, and/or other multimedia elements. Slideshow presentations are commonly used in business, education, and other fields to convey information in a structured and visually appealing manner.

A virtual meeting is a form of communication that enables people in different physical locations to meet in the same virtual space using internet-connected devices. Virtual meetings typically involve meeting participants sharing video and/or audio streams with other participants. It is also commonplace for virtual meeting applications to offer a presentation mode, which allows a presenter to share their screen or specific content with other participants in the meeting. This mode is designed to facilitate the delivery of presentations, demonstrations, or any other content that needs to be viewed by the audience, such as a slideshow presentation.

Customer relationship management (CRM) is a strategic process that organizations use to manage, analyze, and improve their interactions with customers. By leveraging data-driven insights, CRM helps businesses optimize communication, enhance customer satisfaction, and drive sustainable growth. CRM systems compile data from a range of different communication channels, including a company's web site, telephone, email, live chat, meetings (both virtual and in-person), marketing materials, and, more recently, social media. CRM data allows businesses to learn more about their target audiences and how to better cater to their needs, thus retaining customers and driving sales growth.

CRM is typically used with past, present, or potential customers. However, CRM can also be applied to business-to-business (B2B) environments to streamline transactions and improve interactions between businesses. The main differences between business-to-consumer (B2C) and B2B CRM systems concern aspects such as sizing of contact databases and length of relationships.

An application window is a graphical user interface (GUI) element of a computer display that represents a running software program on the screen. It is a framed area with defined boundaries where the application's content and controls are displayed, allowing users to interact with the program. Application windows are a core GUI construct that makes modern operating systems user-friendly, enabling efficient multitasking and clear separation of application contexts.

Figure 1A:
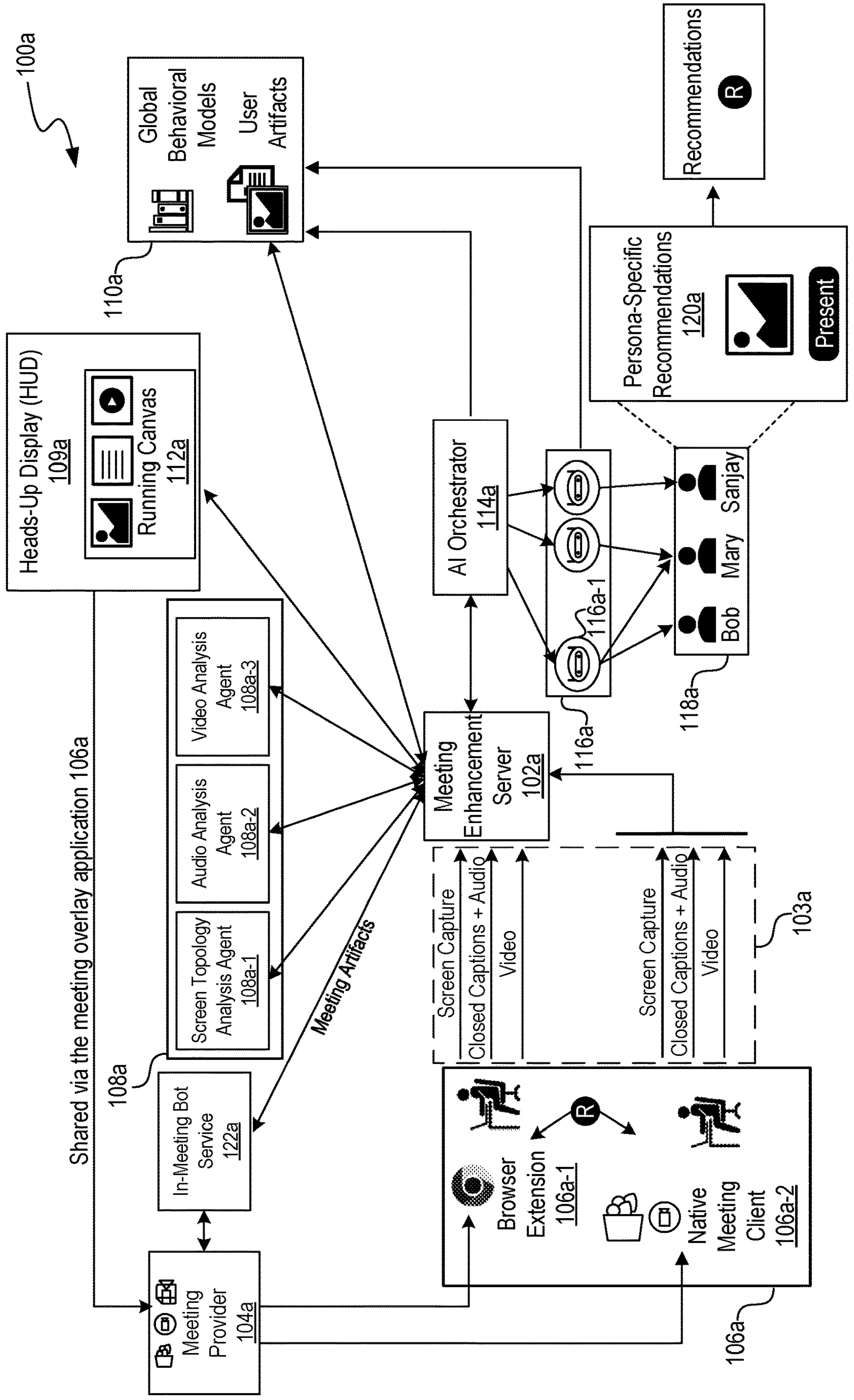
FIG. 1A shows an example meeting environment that includes a meeting enhancement server, in accordance with some implementations of the present technology.

The drawings have not necessarily been drawn to scale. For example, some components and/or operations can be separated into different blocks or combined into a single block for the purposes of discussion of some of the implementations of the disclosed system. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Existing meeting technologies provide a communication channel between multiple meeting participants and often allow for content to be shared between participants. However, these technologies lack robust features for adapting to the dynamically changing context and discussion topics in a meeting. For example, existing meeting technologies often lack controls for dynamically adapting presentation content using a single screen, gauging participant engagement and sentiment, dynamically summarizing an in-progress meeting, dynamically highlighting outstanding questions/action items, and/or incorporating expert knowledge/information held by individuals outside of the meeting itself when unexpected topics arise during discussions. Additionally, existing technologies may not integrate artificial intelligence (AI) and content generated by AI into an overlay application to offer persona-specific recommendations and simulated personas of individuals not present in a meeting.

The disclosed technology addresses these limitations by providing systems, methods, and computer-readable media for enhancing an in-meeting experience through real-time overlay modifications, collaborative modifications to a presentation, and intelligent participant invitation. In some implementations, the present technology provides dynamic visual overlays via a meeting overlay application that customizes the overlays for each participant using AI, allowing for real-time display of sentiment analysis, asked and answered questions, tracking of open items that are set prior to the meeting, and personalized meeting insights. This can enable more effective communication and engagement among participants, even in large virtual gatherings.

The present technology can also include a running canvas for collaborative modifications to a set of presentation artifacts being presented in a meeting. The running canvas is a single collaborative workspace that can be accessed by one or more meeting participants. The running canvas is maintained by a meeting enhancement server and can be accessed via a meeting overlay application. The running canvas allows for decoupling of the presentation of a set of presentation artifacts from the dynamic control of the artifacts in the set, enabling a presenter to perform fully dynamic presentations even with a single screen. The running canvas can be further supplemented by personalized, context-based AI-driven suggestions and integration of relevant presentation artifacts (e.g., as displayed via the meeting overlay application). These features can enhance the flexibility and responsiveness of presentations, enabling presenters to adapt their content in real time based on the flow of the discussion and to receive assistance from other individuals and AI tools, easing the burden of making these adaptations individually. Moreover, the content of a set of presentation artifacts can be modified by multiple participants via the running canvas without the need to change which meeting participant is screen sharing.

Furthermore, the present technology can identify and invite relevant experts to ongoing meetings when specific discussion topics arise that are outside the area of expertise of current meeting participants. These experts may be human experts or AI agents trained to provide expertise on a particular discussion topic. Inviting experts to the meeting can allow for integration of specialized knowledge as the specialized knowledge becomes relevant, helping to improve the overall quality and productivity of virtual meetings. In implementations where an AI agent is invited to the meeting, an invitation sent to the AI agent can specify an operation mode for the AI agent within the meeting, which determines actions that the AI agent can perform in relation to the meeting (e.g., unsupervised actions within the meeting, supervised actions within the meeting, direct communications to a user only), thereby integrating AI agent features while maintaining a configurable level of user control. Additionally or alternatively, the AI agent can be provided with a set of tools for executing functions of the meeting overlay application, enabling the AI agent to direct actions within the meeting overlay application without performing an excess number of operations itself, conserving computational resources while still enabling robust integration.

In existing technologies that provide meeting overlay applications, these technologies often lack a means of integrating with external (e.g., third-party) applications, which can limit these meeting overlay applications to providing a static feature set that is determined only by processes of the meeting overlay application itself. This lack of integration limits the content that these meeting overlay applications can display to artifacts that the meeting overlay application display can retrieve and/or generate independently of third-party interaction. Furthermore, many existing meeting overlay applications lack robust tracking capabilities that enable an overlay generated by the meeting overlay application to responsively move along with a target window. This can create a disjointed and/or choppy visual display where the overlay does not smoothly integrate with the target window, making it difficult for users to view content in both the target window and the overlay simultaneously.

The present technology can address both shortcomings of prior solutions by providing a meeting overlay application that is exposed as a platform to external applications and that maintains a particular configuration with respect to a target window by tracking the target window using operating system-level application programming interfaces (APIs). The present technology can enable external applications to subscribe to categories of events related to input data processed by a meeting enhancement server and/or meeting overlay application and transmit relevant data to those external applications. A set of tools for displaying visual indicators within the meeting overlay application can be exposed to these external applications, enabling the external applications to request execution of one or more of these tools in response to the received data. Thus, external applications can dynamically control behavior of the meeting overlay application in a structured fashion that enables efficient integration with external applications across various use cases. Additionally, the present technology can cause display of an overlay in a particular configuration relative to the target window and maintain that particular configuration as the target window is moved and/or resized by monitoring for these changes using the operating system-level APIs and reconfiguring the overlay in response to changes. This tracking technique enables low-latency tracking of various application windows that is agnostic to the type of application window being tracked, enabling the present technology to track multiple types of windows in a more computationally efficient manner than existing solutions.

Meetings can be a valuable source of behavioral data about an entity (e.g., an individual, company, or organization) that participates in a meeting, among other sources such as documents, emails, presentation slides, and/or other artifacts associated with the entity. Collecting behavioral data about an entity is valuable for preparing for and modeling future interactions with that entity, such as negotiations, sales, or other transactions. However, as the complexity of transactional relationships between entities and the amount of available data continues to increase, there is a growing need for sophisticated tools that can process and analyze large volumes of behavioral data from diverse sources to predict/forecast the behavior of particular entities.

In existing behavioral modeling/entity modeling technologies, behavioral data is typically collected in an unstructured manner based on human reporting, which is difficult to systematically compile and analyze because of its unstructured nature, especially when trying to fit the behavioral data into a structured schema. Furthermore, human reporting of behavioral data is prone to error, bias, and/or subjectivity as humans commonly misremember details of an interaction and/or report the interaction as being more positive than it was in reality in order to make a positive impression. Existing technologies also lack features for effectively integrating data from multiple sources, processing both structured and unstructured information, and generating comprehensive behavioral models in real time or near real time.

To address these limitations, the present technology includes a behavioral modeling platform for generating global behavioral models of entities using AI. In some implementations, an AI orchestrator collects and processes data for behavioral modeling, reducing the bias, subjectivity, and/or errors of human reporting and thus the propagation of inaccurate information throughout a CRM workflow that is common in existing technologies. Additionally, AI collection and processing of unstructured behavioral data allows synthesizing of large amounts of data from diverse sources that would otherwise be difficult to compile. Collected data can remain in their unstructured form and still be effectively processed, reducing the computational resources spent on pre-processing operations.

Another shortcoming of existing solutions is that they lack a means for automatically sharing, between entities, behavioral data collected by those entities. Thus, each entity is limited to using its own data for behavioral modeling, resulting in less accurate modeling than if data were shared. Because of this shortcoming, entities at present must typically independently decide to share behavioral data with one another and do so manually in order to gain access to more behavioral data. However, there is little incentive for each entity to do so because this disjointed approach lacks a strong network effect where behavioral data is received from multiple other entities in return for an entity sharing its data.

The present technology overcomes these limitations by including a global data lake that an AI orchestrator can access to generate a global behavioral model. The global data lake can include data from all entities using the behavioral modeling platform, allowing the AI orchestrator to draw from an enriched pool of data and thereby generate more accurate models of entities. In some implementations, each entity can adjust its level of behavioral data sharing within the behavioral modeling platform to maintain privacy of data when desired, while in other embodiments, a global level of behavioral data sharing can be enforced to encourage higher amounts of data sharing. Additionally or alternatively, the behavioral modeling platform can provide more data, which can be anonymized, to an entity when that entity opts into sharing more data, incentivizing wider sharing and creating network effects for users of the platform. In these implementations, the global data lake only stores data that complies with the permitted level of data sharing, conserving computational resources that would otherwise be spent on collecting and storing data that would ultimately not be used for behavioral modeling.

Example Meeting Environment

FIG. 1A shows an example meeting environment 100*a* that includes a meeting enhancement server 102*a*, in accordance with some implementations of the present technology. The meeting environment 100*a* additionally includes input data 103*a*, a meeting provider 104*a*, a meeting overlay application 106*a*, one or more analysis agents 108*a*, a heads-up display (HUD) 109*a*, an artifact database 110*a*, a running canvas 112*a*, an AI orchestrator 114*a*, one or more persona-specific agents 116*a*, one or more members 118*a*, persona-specific recommendations 120*a*, and an in-meeting bot service 122*a*. The meeting environment 100*a* can be implemented using components of the example computer system illustrated and described in more detail with reference to FIG. 20. Likewise, implementations of the example meeting environment 100*a* can include different and/or additional components or can be connected in different ways.

The meeting enhancement server 102*a* is configured to provide various enhancing features for a virtual meeting, such as a videoconference, webinar, or other virtual meeting including a plurality of meeting participants located remotely from one another. In some implementations, the meeting is hosted by a meeting provider 104*a*, which is an application providing commercial virtual meeting services (e.g., Zoom®, Microsoft® Teams®, Google® Meet®, and so on). In some implementations, the meeting enhancement server 102*a* obtains (e.g., actively retrieves or passively receives) one or more streams of input data 103*a* (e.g., audio, closed captions, video, screen captures) from an in-meeting bot participant generated by an in-meeting bot service 122*a* (e.g., a component of the meeting enhancement server 102*a* that generates AI agents, or bot participants, to participate in meetings, as described in more detail below) and/or a meeting overlay application 106*a* (e.g., a browser extension 106*a*-1 or a native meeting client 106*a*-2, as described in more detail below). For example, the meeting enhancement server 102*a* can obtain input data 103*a* of a certain type from each meeting participant in a meeting when that data is unique to each meeting participant (e.g., audio/video generated by each meeting participant) and/or can obtain another type of data (e.g., video being shared by a presenter) shared between all meeting participants from a single meeting participant. Selectively receiving certain shared input data from a single meeting participant and participant-specific input data from each individual meeting participant improves computational efficiency of the meeting enhancement server 102*a* in comparison to other solutions where all input data streams are indiscriminately obtained, as the storage and processing of duplicative data that is shared between meeting participants can be reduced without also omitting data that is unique to, or more efficiently obtained from, an individual meeting participant. In some implementations, each type of data obtained is obtained in a separate data stream.

In some implementations, the meeting enhancement server 102*a* obtains the input data 103*a* via a meeting overlay application 106*a*. The meeting overlay application 106*a* can be a software application for generating and displaying a user interface (UI) element (for example, a transparent or semi-transparent visual meeting overlay) layered on top of the underlying meeting, including elements visible to one or more of the meeting participants. The meeting overlay application 106*a* from which the meeting enhancement server 102*a* receives data can differ depending on whether the meeting provider 104*a* is a web meeting client (e.g., accessed by a participant from a web-based client) or a native meeting client (e.g., accessed by a participant from a native application). For example, when the meeting provider 104*a* is a web meeting client, the meeting overlay application 106*a* can be a browser extension 106*a*-1 for the browser by which the meeting provider 104*a* is accessed. As another example, when the meeting provider 104*a* is a native meeting client, the meeting overlay application 106*a* can be a native meeting client 106*a*-2 installed on the same computing device as the meeting provider 104*a*. In either example, the input data 103*a* can be received from the meeting provider 104*a* and/or directly from individual meeting participants. The types of meeting overlays generated by the meeting overlay application 106*a* and the manner in which they are generated are described in more detail in relation to FIGS. 2, 3A, and 3B below.

In some implementations, although multiple meeting participants access meeting overlay applications, the meeting enhancement server 102*a* can select a first meeting participant's meeting overlay application 106*a* from which to obtain input data 103*a* and/or select one or more backup meeting participants' meeting overlay application 106*a* from which to receive input data 103*a* when the first meeting participant's input data is no longer available (e.g., the first meeting participant leaves the meeting or is otherwise disconnected from the meeting). Selecting a single meeting participant at a time from whom to receive input data allows the meeting enhancement server 102*a* to conserve computational resources by not receiving duplicate data from multiple participants in the same meeting, while selecting a backup meeting participant can enable reliable ingestion of input data when the input data of the first meeting participant becomes unavailable. Although the input data 103*a* can be collected from only a single meeting participant, the meeting enhancement server 102*a* can cause the display of different visual indicators (e.g., visual elements of an overlay conveying information) within the meeting overlays of each meeting participant, as the overlays can be customized in relation to each meeting participant, the meeting participant's role in the meeting, and/or the meeting participant's role in an organization to which the meeting participant belongs. The meeting enhancement server 102*a* can generate the unique visual indicators and determine which participant can receive each visual indicator using at least an AI orchestrator 114*a* and/or a persona-specific agent 116*a*, as described in more detail below.

In some implementations, the meeting enhancement server 102*a* provides, as input, the input data 103*a* to one or more AI agents, which generate, as output, one or more visual indicators. An AI agent is a software component that executes an AI model or algorithm, applies the model to a dataset, and processes the output of the model to automatically perform one or more functions. For example, the one or more AI agents can invoke a neural network, decision tree, or other machine learning (ML) algorithm trained to interpret natural language and/or other input data from a meeting (e.g., the input data 103*a*); apply this algorithm to the natural language, other input data, and/or context data available to the one or more AI agents; and then use the output of the algorithm to generate a visual indicator and/or other content for inclusion in the meeting overlay application 106*a*. Additionally or alternatively, each of the one or more AI agents is to be associated (e.g., by the meeting enhancement server 102*a*) with a corresponding computer-executable operation set configured to be autonomously executed by the AI agent on a software application set (e.g., a set of applications including the meeting overlay application 106*a*), enabling the one or more AI agents to autonomously perform one or more functions of the meeting enhancement server 102*a* in relation to manipulating and/or communicating with the software application set. The computer-executable operation set can include operations for performing functions such as data ingestion, feature extraction, inference using an AI model, and/or visual indicator generation without requiring manual intervention for each operation. This autonomous execution capability can enable the one or more AI agents to process input data in real time or near real time as the meeting progresses. In some implementations, the one or more AI agents include one or more components of the example transformer 1812 described in relation to FIG. 18 below and/or the AI system 1900 described in relation to FIG. 19 below.

The one or more AI agents can include one or more analysis agents 108*a* that process a particular type of data from the input data 103*a*. For example, the analysis agents 108*a* can include a screen topology analysis agent 108*a*-1 for processing screen captures, an audio analysis agent 108*a*-2 for processing audio, and a video analysis agent 108*a*-3 for processing video. In such implementations, the one or more analysis agents 108*a* can process input data streams of the types corresponding to each analysis agent 108*a* in parallel and/or asynchronously to generate different elements or visual indicators for inclusion in a HUD 109*a*, or a visual overlay of the meeting overlay application 106*a* that is visible to a user of the meeting overlay application 106*a* (e.g., as an overlay atop one or more other applications accessible by the user). Additionally or alternatively, the analysis agents 108*a* can have different processing backends/software configurations according to the type of data corresponding to each analysis agent 108*a* and/or the visual indicators generated by each analysis agent 108*a*. For example, the analysis agents 108*a* can invoke different AI models trained to process the particular type of data received. In some implementations, one or more of the analysis agents 108*a* can be hosted within the meeting overlay application 106*a* in addition to or instead of the meeting enhancement server 102*a* and can obtain relevant input data using an operating system-level API, as described in more detail in relation to FIG. 16 below.

In some implementations, the meeting enhancement server 102*a* causes display of one or more visual indicators within the HUD 109*a*. For example, the meeting enhancement server 102*a* can transmit the one or more visual indicators to the meeting overlay application 106*a*, which responsively displays the one or more visual indicators in a specified location within the HUD 109*a*. In such implementations, the location can be specified by the meeting enhancement server 102*a* based on processing of a screen capture from a certain meeting participant by the screen topology analysis agent 108*a*-1. For example, the screen topology analysis agent 108*a*-1 can receive a screen capture from a participant and identify the presence of various elements in the screen capture (e.g., participants' video streams, participants' icons, text entries in a chat) as well as the locations of those elements within the meeting UI being accessed by the participant. Continuing with the same example, the screen topology analysis agent 108*a*-1 can then identify a location with respect to these existing elements where a newly generated visual indicator can be inserted. The screen topology analysis agent 108*a*-1 can identify the location for the visual indicator based on different considerations in different implementations. For example, the screen topology analysis agent 108*a*-1 can identify a location where the visual indicator will not overlap with other elements (e.g., by identifying the shape of the boundaries of both the visual indicator and other elements) to avoid visual clutter. As another example, in implementations where the visual indicator is a representation of the sentiment or emotion of a particular meeting participant, the screen topology analysis agent 108*a*-1 can determine a location of a video stream or icon of the particular participant and identify an overlapping or adjacent location as the location for the visual indicator. An example of such an implementation is described in relation to FIG. 2 below. As yet another example, the specified location within the HUD 109*a* can be a predetermined screen location, such as a location where other visual elements of the meeting overlay application 106*a* will not be obscured or a location within a top-center area of a display screen of the HUD 109*a*, as such a location can keep eyes of a meeting participant viewing the visual indicator focused near a camera of a computing device used to display the HUD 109*a* (e.g., a personal computer (PC), a mobile phone).

In some implementations, the meeting enhancement server 102*a* includes and/or communicates with an artifact database 110*a*. The artifact database 110*a* can be hardware and/or software for storing artifacts (e.g., objects or units of data) uploaded to and/or collected by the meeting enhancement server 102*a*. For example, the artifact database 110*a* can include one or more global behavioral models and/or customer assets, which are described in more detail in relation to FIGS. 7 and 8 below, respectively. As another example, the user can upload a set of presentation artifacts (e.g., a collection of artifacts to be presented as a slideshow) arranged in a predetermined order and including slides, videos, audio, and/or other artifacts to the meeting enhancement server 102*a*, and the meeting enhancement server 102*a* can store the set of presentation artifacts in the artifact database 110*a*. Continuing with the same example, the meeting enhancement server 102*a* can receive an indication from the user to present the set of presentation artifacts (e.g., to other participants in a virtual meeting).

In some embodiments, in response to the indication to present the set of presentation artifacts, the meeting enhancement server 102*a* causes display of at least one artifact from the set of presentation artifacts in a running canvas 112*a*. As depicted in FIG. 1A, the display of the running canvas 112*a* can be included in the HUD 109*a*; however, the present technology is not so limited, as the running canvas 112*a* can also be displayed separately from the HUD 109*a*. The running canvas 112*a* can be a collaborative workspace where one or more users can simultaneously view and interact with (e.g., click on, drag, and/or otherwise select) the displayed artifacts from the set of presentation artifacts. The running canvas 112*a* also includes a presentation index array, which is a sequence of the indexes of previously presented artifacts from the set of presentation artifacts, and/or metadata related to how/when an artifact was placed into the set of presentation artifacts (e.g., a specification of the meeting participant who added the artifact, a specification of the command used to add the artifact, a specification of the source of the artifact). For example, the running canvas 112*a* can be a web application or native application that hosts a copy of the set of presentation artifacts, enabling a meeting participant to present the display of the running canvas 112*a* to other meeting participants (e.g., by selecting a "share screen" or "share window" feature within a meeting provider 104*a*). As another example, the running canvas 112*a* can instead use pointers indicating the location of the artifacts in the artifact database 110*a* and/or use bitmap representations of the artifacts to display the set of presentation artifacts. Using these alternative representations of the artifacts allows multiple users to view and/or interact with the artifacts without having to expend computational resources on copying and/or transferring the artifacts multiple times, improving upon existing solutions that struggle to enable efficient artifact access/modification by multiple users, as artifacts including significant amounts of data are repeatedly duplicated and/or transmitted between users.

In some implementations, the running canvas 112*a* is presented in a meeting such that the set of presentation artifacts is shared/displayed to meeting participants. For example, a presenter in the meeting may select an artifact from the set of presentation artifacts to be the starting point of a presentation, and the index of the artifact in the set of presentation artifacts can be added to a presentation index array. The presentation index array is a sequence of the indexes of the artifacts that have been presented in a meeting, enabling the history of presented artifacts to be tracked even as the set of presentation artifacts is modified (as described in more detail below).

In some implementations, one or more users (e.g., meeting participants) may dynamically adjust the set of presentation artifacts, thereby allowing the artifacts being shared to be modified as called for by the context of the meeting. In such implementations, the running canvas 112*a* is accessible to the presenter and/or to other users having a link (e.g., a uniform resource locator (URL)) associated with a web address of the running canvas 112*a*. For example, users accessing the running canvas 112*a* can be presented with a graphical user interface (GUI) for suggesting modifications to (e.g., additions to, subtractions from, rearranging of artifacts in, or other adjustments to) the set of presentation artifacts. Continuing with the same example, a user can suggest addition of an artifact into the set of presentation artifacts by uploading the artifact to the meeting enhancement server 102*a* via the HUD 109*a* and/or searching, via one or more interactable elements of the HUD 109*a*, for an artifact (e.g., within the artifact database 110*a*) to add. As another example, an artifact in the set of presentation artifacts can be modified or removed from the set by a user in response to the user selecting the artifact and performing editing operations within the running canvas 112*a* (e.g., via the HUD 109*a*) to either modify or delete the artifact. As yet another example, an entire set of presentation artifacts may be cleared from the running canvas 112*a* and replaced with a new set of presentation artifacts selected by a user. In implementations where a user other than a presenter suggests a modification, a visual notification of the modification can be provided to a presenter of the set of presentation artifacts (e.g., via the HUD 109*a*, where the HUD 109*a* is viewable by the presenter) and/or the presenter can accept the modification (e.g., by interacting with the visual notification via the HUD 109*a*) before the modification to the set of presentation artifacts is enacted. In these and other implementations, all users accessing the running canvas 112*a* are presented with the same view of the set of presentation artifacts, which reflects the artifacts currently queued for presentation within the meeting, regardless of the point during the meeting at which each user accesses the running canvas 112*a*. As modifications to the set of presentation artifacts are made (e.g., as described above), this view can be updated to reflect the latest set of presentation artifacts.

In some implementations, the running canvas 112*a* is used by one or more meeting participants to change (e.g., advance) the artifact from the set of presentation artifacts being presented within a meeting. For example, the running canvas 112*a* can include a graphical element that, when selected by a meeting participant with access to the running canvas 112*a*, advances the presentation to the artifact immediately following the currently presented artifact in the set of presentation artifacts. As another example, an interactable display of the set of presentation artifacts can allow a user to select any artifact in the set of presentation artifacts to be presented next, enabling the meeting participant with access to the running canvas 112*a* to advance the presentation to the index of any artifact in the set of presentation artifacts. In some implementations, the running canvas 112*a* includes a visual indication of the presentation index array. This visual indication allows a user to view the artifacts that have previously been presented and to select an entry in the presentation index array, thereby causing the running canvas 112*a* to navigate the presentation back to the artifact associated with that entry.

In some implementations, each user accessing the running canvas 112*a* can have different permissions for interacting with the set of presentation artifacts. For example, the different permissions can include an administrator privilege that allows full control of the running canvas 112*a*, a collaborator privilege that allows adding/removing recommended artifacts from the set of presentation artifacts but does not allow approval of artifacts for presentation, and/or a viewer privilege that only allows viewing of the running canvas 112*a*.

In some implementations, artifacts added to the set of presentation artifacts are automatically modified (e.g., by the one or more AI agents) to match the style or theme of one or more other artifacts in the set of presentation artifacts (e.g., modifying the visual theme of an added slide to match another slide). In these and other implementations, the HUD 109*a* displays a history of artifacts presented via the running canvas 112*a* to meeting participants, allowing users accessing the running canvas 112*a* to reference all previously presented artifacts in a single location. For example, the artifacts in the history of artifacts can be selected by a user of the running canvas 112*a* to suggest the presenter return to presenting the selected artifact. Additionally or alternatively, when the user is the presenter, selecting an artifact in the history of artifacts can automatically present the selected artifact. Thus, the running canvas 112*a* provides an improvement over existing presentation tools, as users can view and/or interact with all previously presented artifacts without having to navigate between interfaces, and the visual style of the set of presentation artifacts can automatically be made coherent despite individual presentation artifacts originating from different sources and/or having different initial styles.

The AI orchestrator 114*a* is another AI agent of the one or more AI agents that invokes an AI model or algorithm, applies the model to a dataset, and processes the output of the model to automatically perform functions of the meeting enhancement server 102*a*. For example, the AI orchestrator 114*a* can receive the same input data as the analysis agents 108*a* and/or communicate with the analysis agents 108*a* to determine, using an invoked AI model, the current context of a meeting and then direct the generation of visual indicators relevant to that context.

In some implementations, the AI model invoked by the AI orchestrator 114*a* is a language model, which uses techniques such as natural language processing (NLP) to interpret textual data comprising a query and feature extraction to identify variables influencing the relevance of artifacts to that query. For instance, NLP can be used to analyze requests for a certain artifact (e.g., "Find marketing specialists in my network") and extract keywords that indicate instructions (e.g., search within the user's network), artifact type (e.g., contact artifacts for marketing specialists), number of artifacts desired, and so forth. A language model is trained to model how words relate to each other in a textual sequence, based on probabilities. In some implementations, the language model includes some or all of the components of the transformer 1812 described in relation to FIG. 18 below.

In some implementations, the AI orchestrator 114*a* uses the determined context of a meeting and/or information about the meeting provided by a user to curate a set of presentation artifacts to be displayed in the running canvas 112*a* (and subsequently presented to meeting participants). For example, the AI orchestrator 114*a* can invoke one of the AI models described above to process input data from a meeting to determine a context of the meeting (e.g., a purpose of the meeting or a particular topic being discussed) and retrieve one or more artifacts from the artifact database 110*a* relevant to that context. Continuing with the same example, the relevance of artifacts retrieved from the artifact database 110*a* can be determined by the AI orchestrator 114*a* generating a characterization of the semantic content (e.g., a numerical vector embedding representing the semantic meaning of the content) of the artifact using one or more of the AI models described above. As another example, a presenter can search for a set of presentation artifacts using a natural language search query describing desired content for a set of presentation artifacts. Continuing with the same example, the AI orchestrator 114*a* can direct one of the AI models described above to process the search query to determine the content the presenter is requesting. The AI orchestrator 114*a* can then search the artifact database 110*a* and identify (e.g., using the AI model) a set of presentation artifacts including that content.

In other implementations, the AI orchestrator 114*a* generates a new set of presentation artifacts to be displayed in the running canvas 112*a* based on a determined context of the meeting and/or a search query from a presenter. For example, the AI orchestrator 114*a* can determine, after searching the artifact database 110*a* for content requested in a particular search query, that the artifact database 110*a* does not contain a set of presentation artifacts with the requested content. In such an example, the AI orchestrator 114*a* can direct an AI model (e.g., a transformer) to generate a new set of presentation artifacts including the content missing from the artifact database 110*a*. The newly generated set of presentation artifacts can then be displayed to and/or edited by the presenter before being presented to meeting participants via the running canvas 112*a*. As another example, the AI orchestrator 114*a* can direct an AI model to compile artifacts from various locations within the artifact database 110*a* that are relevant to the context of the meeting into a set of presentation artifacts.

In some implementations, the AI orchestrator 114*a* directs the actions of one or more persona-specific agents 116*a*, which are AI agents included in the one or more AI agents that are configured to invoke a specific behavioral model corresponding to a meeting participant or group of meeting participants. For example, members 118*a* of a particular organization can use separate instances of the meeting overlay application 106*a* in communication with the meeting enhancement server 102*a* during virtual meetings, and as the input data 103*a* generated by these members 118*a* is ingested by the AI orchestrator 114*a* over time, the AI orchestrator 114*a* can train a different AI model to model the behavior of each of the members 118*a* (e.g., by providing the AI model with artifacts reflecting the behavior of each member, such as emails, other chat/text communications, and video/audio recordings from past meetings). Continuing with the same example, each of these behavioral models can then be invoked by a different persona-specific agent associated with each member. As another example, a persona-specific agent of the persona-specific agents 116*a* can model the behavior of individuals having a particular role within the organization rather than the behavior of a single member of the members 118*a*. Continuing with the same example, the AI orchestrator 114*a* can train an AI model based on input data generated by some or all individuals of the members 118*a* having a particular role within an organization and/or based on information provided to the AI orchestrator 114*a* associated with the particular role, and the AI orchestrator 114*a* can thereby create a behavior model representing the role in general. This behavior model can then be invoked by a persona-specific agent, which can represent one or more individuals of the members 118*a* sharing the role. An example of such a persona-specific agent is depicted in FIG. 1A by the first persona-specific agent 116*a*-1 with arrows leading to two different individuals of the members 118*a* (Bob and Mary) who share the same role within the organization.

In some implementations where the members 118*a* are participants in a meeting, each individual of the members 118*a* receives persona-specific recommendations 120*a* of artifacts to be presented in the meeting. For example, the AI orchestrator 114*a* can receive the input data 103*a* from the meeting and direct a persona-specific agent for each individual to determine (e.g., based on a behavioral model representing an individual or a role) whether the individual has expertise (e.g., a field of knowledge or specialized information) relevant to the content of the meeting.

In some implementations where some participants in a meeting do not have access to the meeting overlay application 106*a* and/or are not part of the same organization as the members 118*a*, a link (e.g., a URL or quick-response (QR) code) to a web address hosting a display of some or all of the visual indicators generated by the meeting enhancement server 102*a* in connection with the meeting is provided to those participants who do not have access to the meeting overlay application 106*a*. Participants who interact with the link can view these visual indicators and thereby receive some or all of the information included in the visual indicators without using the meeting overlay application 106*a*.

In implementations where an individual of the members 118*a* has relevant expertise for the meeting, the persona-specific agent corresponding to the individual can recommend an artifact including content associated with that expertise for inclusion in a set of presentation artifacts being presented via the running canvas 112*a*. The AI orchestrator 114*a* can receive this recommendation and display the recommendation to the member (e.g., via a visual indicator generated by the meeting overlay application 106*a*). The member can then accept the recommendation (e.g., by interacting with the visual indicator within the meeting overlay application 106*a*), causing the meeting enhancement server 102*a* to suggest inclusion of the artifact in the set of presentation artifacts to a presenter presenting the set of presentation artifacts within the meeting. As a specific example, when the topic of discussion in a meeting shifts to sales of a product, a persona-specific agent representing a salesperson in the meeting and/or the salesperson role generally can generate a recommendation for a slide deck including sales statistics to be included in a set of presentation artifacts being presented in the meeting. Continuing with the same example, the AI orchestrator 114*a* can then display this recommendation to the salesperson who, given their expertise in sales, can evaluate whether the slide deck would be valuable to include in the presentation and should therefore be suggested to the presenter. Further continuing with the same example, the salesperson can determine that the slide deck is valuable to include in the presentation and therefore accepts the recommendation, causing the meeting enhancement server 102*a* to display a recommendation of including the slide deck to a presenter as a visual indicator (e.g., via a meeting overlay application 106*a* being accessed by the presenter). An example of such a visual indicator is described in more detail in relation to FIG. 4A below. As a different example, a persona-specific agent can represent the presenter in a meeting directly, in which case the AI orchestrator 114*a* can receive a recommendation as described above but display the recommendation directly to the presenter (e.g., via a meeting overlay application 106*a* being accessed by the presenter). Continuing with the same example, the presenter can then accept the recommendation (e.g., by interacting with the visual indicator within the meeting overlay application 106*a*), causing the meeting enhancement server 102*a* to include the recommended artifact in the set of presentation artifacts being shared via the running canvas 112*a*.

Figure 1B:
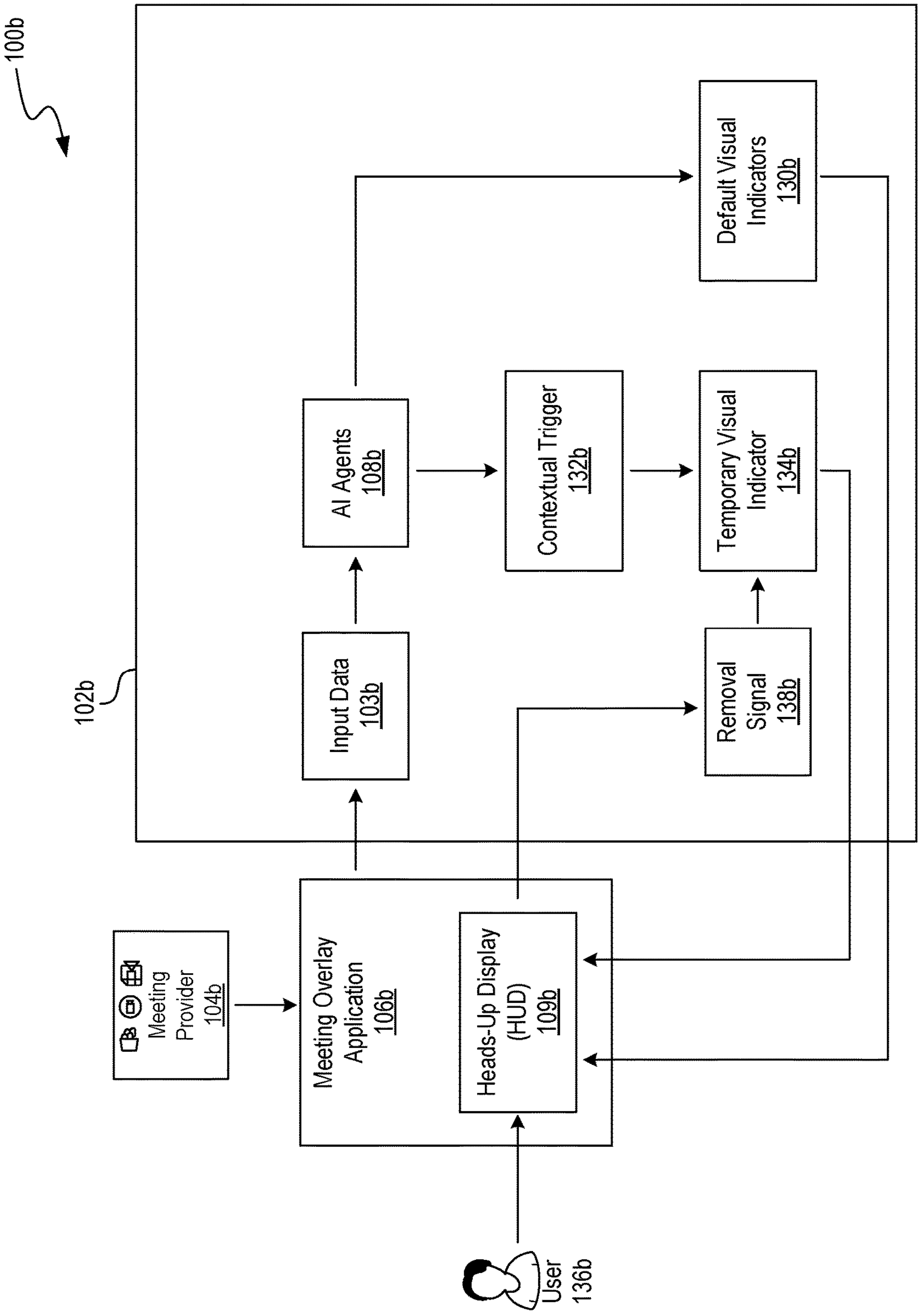
FIG. 1B shows a second example meeting environment that includes a meeting enhancement server, in accordance with some implementations of the present technology.

FIG. 1B shows a second example meeting environment 100*b* that includes a meeting enhancement server 102*b*, in accordance with some implementations of the present technology. The meeting environment 100*b* additionally includes input data 103*b*, a meeting provider 104*b*, a meeting overlay application 106*b*, one or more AI agents 108*b*, a HUD 109*b*, a set of default visual indicators 130*b*, a contextual trigger 132*b*, a temporary visual indicator 134*b*, a user 136*b*, and a removal signal 138*b*. The meeting environment 100*b* can be implemented using components of the example computer system illustrated and described in more detail with reference to FIG. 20. Likewise, implementations of the example meeting environment 100*b* can include different and/or additional components or can be connected in different ways.

In some implementations, after obtaining the input data 103*b* (e.g., input data associated with a meeting hosted by the meeting provider 104*b*) from the meeting overlay application 106*b*, the meeting enhancement server 102*b* provides, as input, the input data 103*b* to one or more AI agents 108*b*, which generate, as output, a set of default visual indicators 130*b*. The one or more AI agents 108*b* can be the same as or generally similar to the one or more AI agents described in relation to FIG. 1A above, which can include the analysis agents 108*a* and/or the AI orchestrator 114*a*. Each default visual indicator in the set of default visual indicators 130*b* can be a visual indicator including a dynamic representation of a property of the input data 103*b* (e.g., a measurable characteristic of audio, video, and/or text included in the input data 103*b*). A dynamic representation of a property is a numerical, text-based, or other visual indicator of the property that changes along with changes in the input data 103*b* that indicate an updated value of that property. For example, a default visual indicator can dynamically represent a sentiment of a meeting participant (e.g., based on NLP/sentiment analysis of audio produced by the meeting participant and/or facial expression analysis of video of the meeting participant), a speaking time of a meeting participant, a pace of speech of the meeting participant (e.g., words per minute, as calculated based on an audio component of the input data 103*b*), and/or other properties derived from the input data 103*b*. The dynamic nature of the set of default visual indicators 130*b* means that the set of default visual indicators 130*b* is continuously updated as new input data is received and processed by the one or more AI agents 108*b*. For instance, a sentiment indicator can change from a neutral expression to an irritated expression as the one or more AI agents 108*b* detect changes in a meeting participant's tone of voice and/or facial expressions. This dynamic representation provides meeting participants with real-time feedback about the state of the meeting, enabling them to adapt their behavior accordingly.

In some implementations, the meeting enhancement server 102*b* causes display, within the HUD 109*b*, of the set of default visual indicators 130*b* for a duration of a session of the meeting overlay application 106*b*. Persisting the set of default visual indicators 130*b* throughout the meeting session provides consistent access to continuously updated information about one or more properties of the input data 103*b*. This persistent display improves upon other HUD technologies that do not continuously display information about input data properties, as meeting participants viewing the HUD 109*b* have consistent access to relevant information without needing to actively request the information. The set of default visual indicators 130*b* can be displayed in a specified location within the HUD 109*b*, which can be based on at least one of a screen capture, a predetermined screen location, as described in relation to FIG. 1A above, or a screen location dynamically selected based on positioning data for visual elements of a display screen that is obtained via an operating system-level API (e.g., an accessibility API or another similar API) of a computing device hosting the meeting overlay application 106*b*.

In some implementations, the one or more AI agents 108*b* detect a contextual trigger 132*b* within the input data 103*b*. The contextual trigger 132*b* can be any signal within the input data 103*b* that indicates specific information is relevant to display within the meeting overlay application 106*b*, such as a mention of a competitor by a meeting participant, a question/objection directed to a proposal presented during the meeting, and/or a request for a particular action to be taken. The contextual trigger 132*b* can be associated with a category of informational artifact, denoting a type of information that is relevant to display when the contextual trigger 132*b* is detected. For instance, a mention of a competitor can be associated with a category of competitive intelligence artifacts, while a pricing question can be associated with a category of pricing and value proposition artifacts. The one or more AI agents 108*b* can detect the contextual trigger 132*b* by processing the input data 103*b* using AI models trained to identify specific patterns, keywords, visual cues, and/or semantic meanings indicative of each type of contextual trigger.

In response to detecting the contextual trigger 132*b*, the meeting enhancement server 102*b* can generate a temporary visual indicator 134*b* including an informational artifact associated with the category and having an opacity value. On account of being associated with the category, the informational artifact includes information contextually relevant to a topic/issue raised by the contextual trigger 132*b* that can be displayed to a user 136*b* of the meeting overlay application 106*b* (e.g., via the HUD 109*b*). The user 136*b* can be an individual or entity having access to the meeting overlay application 106*b*, such as a meeting participant. For example, when a competitor to the user 136*b* is mentioned in the contextual trigger 132*b*, the informational artifact can be text including differentiating features between a product of the user 136*b* and a product of the competitor. The opacity value of the temporary visual indicator 134*b* is a measure of the visual opacity of the temporary visual indicator 134*b* when the temporary visual indicator 134*b* is displayed to the user 136*b* (e.g., via the HUD 109*b*). The temporary visual indicator can initially be set to a default opacity value (e.g., fully opaque or a high opacity level) to enable display of the temporary visual indicator 134*b* in a manner that is clearly visible to the user 136*b*.

In some implementations, the meeting enhancement server 102*b* determines, based on the category of the informational artifact, an urgency level of the informational artifact. The urgency level can reflect how time-sensitive, impactful, and/or critical the information is within the context of the meeting. For example, a contextual trigger 132*b* associated with a competitive mention during a sales negotiation can be assigned a higher urgency level than a contextual trigger 132*b* associated with a general informational request. The meeting enhancement server 102*b* can add, to the temporary visual indicator 134*b*, an urgency indicator that visually represents the urgency level using at least one of a color or a pulsing effect. For instance, a high urgency level can be represented by a red color and/or a rapid pulsing effect, while a moderate urgency level can be represented by a yellow or orange color and/or a slower pulsing effect, and a low urgency level can be represented by a neutral color without pulsing. The urgency indicator enables the user 136*b* to quickly assess the importance of the informational artifact and prioritize their attention accordingly during the meeting.

In some implementations, the temporary visual indicator 134*b* is generated based on behavioral data associated with the user 136*b* and/or another meeting participant. For example, the meeting enhancement server 102*b* can obtain unstructured data associated with the user 136*b* from a global data lake. The unstructured data can include behavioral data extracted from meetings, presentations, and/or communications involving the user 136*b*, as described in more detail in relation to FIG. 5 below. The meeting enhancement server 102*b* can then provide, as input, the unstructured data to the one or more AI agents 108*b*, which generate, as output, a global behavioral model associated with the user 136*b*. Further description of global behavioral models is also provided in relation to FIG. 5 below. Continuing with the same example, the meeting enhancement server 102*b* can generate the informational artifact based on the global behavioral model, such that the informational artifact includes content tailored to the specific behavioral patterns and preferences of the user 136*b*. The meeting enhancement server 102*b* can then insert the informational artifact into the temporary visual indicator 134*b* for display to the user 136*b* via the HUD 109*b*. By leveraging the global behavioral model to generate the informational artifact, the temporary visual indicator 134*b* can provide the user 136*b* with contextually relevant guidance that accounts for the historical behavior and predicted responses of the meeting participant, thereby more effectively aiding the user 136*b* within the meeting than existing HUD systems that provide less tailored guidance.

In some implementations, the contextual trigger 132*b* and the informational artifact included in the temporary visual indicator 134*b* correspond to specific types of conversational events and responsive information. For example, the contextual trigger 132*b* can be a mention of a particular entity (e.g., a competitor of the user 136*b*, a partner of the user 136*b*, or another organization), and the informational artifact can be a distinguishing feature between the user 136*b* (or an organization to which the user 136*b* belongs) and the particular entity, such as a differing area of expertise or a distinguishing feature of a product offered by the respective entities (e.g., "They focus on Feature X, we focus on Outcome Y"), thereby assisting the user 136*b* in articulating differentiators during the meeting. As another example, the contextual trigger 132*b* can be a budgetary constraint raised by a meeting participant (e.g., a statement that a particular proposal made by the user 136*b* exceeds available budget), and the informational artifact can be a value reframing associated with the budgetary constraint, such as a return-on-investment calculation (e.g., "the proposal will generate $X in revenue"), a cost-benefit analysis (e.g., "Doing nothing costs $X per month in lost productivity"), and/or an alternative pricing structure that addresses the budgetary concern (e.g., a quarterly billing proposal or other installation payment plan). As yet another example, the contextual trigger 132*b* can be a timing objection (e.g., a statement that the timing is not right to proceed or that a decision needs to be delayed), and the informational artifact can be a momentum reframing associated with the timing objection that suggests that the timing of an action should not be delayed, such as information about costs of delay (e.g., "you will miss x months of revenue with delay"), friction-lowering opportunities (e.g., "We can handle the heavy lifting/onboarding for you"), and/or time-sensitive opportunities that encourage maintaining forward progress. As a further example, the contextual trigger 132*b* can be an approval constraint (e.g., a statement that additional stakeholders or decision-makers need to approve a proposal), and the informational artifact can be an approval obtainment artifact associated with the approval constraint that helps resolve said approval constraint, such as a template for an internal justification document, a case study or other artifact tailored to different stakeholder concerns, and/or suggested next steps for navigating the approval process.

In some implementations, the meeting enhancement server 102*b* causes display, within the HUD 109*b*, of the temporary visual indicator 134*b* such that the opacity value of the temporary visual indicator 134*b* gradually decreases over a predetermined time interval (e.g., a duration of time determined by the user 136*b* and/or chosen by the meeting enhancement server 102*b*). The predetermined time interval can be a single value applied by the meeting enhancement server 102*b* or can be a dynamically adjusted value based on specific characteristics of the temporary visual indicator 134*b* and/or the input data 103*b*, such as the complexity of the informational artifact or a pace of the meeting (e.g., more complex information corresponds to a longer predetermined time interval). The gradual decrease in opacity enables the temporary visual indicator 134*b* to direct attention of the user 136*b* to the newly displayed informational artifact by presenting the informational artifact prominently when first displayed, while still fading the informational artifact out of view over time such that the HUD 109*b* does not become cluttered with persistent visual indicators that may no longer be relevant. Thus, display of the temporary visual indicator 134*b* improves upon existing HUD systems by maintaining a clean and readable interface while still enabling new information within the HUD 109*b* to be readily noticed. Furthermore, the gradual decrease in opacity of the temporary visual indicator 134*b* means the HUD 109*b* can display the temporary visual indicator 134*b* for less than a total duration of the meeting, conserving computational resources that would otherwise be spent on persisting the temporary visual indicator 134*b*, potentially in conjunction with other visual indicators, throughout the meeting. The temporary visual indicator 134*b* can be displayed in a specified location within the HUD 109*b*, which can be based on either (i) a screen capture or (ii) a predetermined screen location, as described in relation to FIG. 1A above.

In some implementations, the meeting enhancement server 102*b* detects an interaction, by the user 136*b*, with the temporary visual indicator 134*b*. The interaction can include hovering over the temporary visual indicator 134*b*, clicking on the temporary visual indicator 134*b*, and/or performing another gesture indicating interest, by the user 136*b*, in the informational artifact. In response to detecting the interaction, the meeting enhancement server 102*b* resets the opacity value of the temporary visual indicator 134*b* to a default opacity value. This reset mechanism allows the user 136*b* to indicate that the information remains relevant to the user 136*b* and should continue to be displayed visibly within the HUD 109*b*. Thus, the reset mechanism works in conjunction with the gradual decrease of opacity to enable the HUD 109*b* to persist visual indicators that include information with persisting relevance while removing other visual indicators, thereby more efficiently allocating computational resources to visual indicator maintenance in comparison to existing solutions that do not include a mechanism for selectively fading out and persisting visual indicators.

In such implementations, the meeting enhancement server 102*b* can persist the temporary visual indicator 134*b* within the HUD 109*b* until a removal signal 138*b* is received. The removal signal 138*b* can be at least one of (i) a selection, from the user 136*b*, to remove the temporary visual indicator or (ii) a detection, by the one or more AI agents 108*b*, of a second contextual trigger within the input data. The second contextual trigger can be generally similar to the contextual trigger 132*b*, except that the second contextual trigger indicates the informational artifact has a decreased relevance to the meeting. For example, where the temporary visual indicator 134*b* displays an informational artifact differentiating the organization from a competitor and the conversation moves away from discussing the competitor to a different topic, the one or more AI agents 108*b* can detect this shift in context and generate the removal signal 138*b*. Additionally or alternatively, where the user 136*b* explicitly dismisses the temporary visual indicator 134*b* (e.g., by clicking a close button or swiping the indicator away), the removal signal 138*b* can be generated. The removal signal 138*b* can thereby further improve computational efficiency of the HUD 109*b* as, when visual indicators are persisted, they can be automatically or manually removed when the visual indicators are no longer relevant, meaning computational resources are not expended on persisting the visual indicators for longer than the visual indicators are relevant.

The overall approach to displaying visual indicators in the HUD 109*b* described in relation to FIG. 1B represents a technical improvement over existing HUD technologies. Existing HUD systems typically display static information or otherwise require manual user input to update displayed content. In contrast, the present technology dynamically generates and manages visual indicators based on continual analysis of meeting content by AI agents. The combination of persistent default visual indicators and context-triggered temporary visual indicators with automatic opacity management can provide a more intelligent, responsive, and computationally efficient user interface than less dynamically updated HUD systems.

Although FIGS. 1A and 1B are both examples of meeting environments in which a meeting enhancement server performs particular functions and is separate from a meeting overlay application, which performs other functions, the present technology is not so limited. In other implementations, some functions described herein as being performed by a meeting enhancement server can be performed by a meeting overlay application, and vice versa. Likewise, components described herein as being included in a meeting enhancement server can additionally or alternatively be included in a meeting overlay application, and vice versa. Furthermore, the present technology need not be implemented in a meeting environment; the same and/or similar components of the technology as described above can be used in any environment in which input data is collected from a user and related visual indicators are displayed within an overlay application.

Example Meeting Overlays

Figure 2:
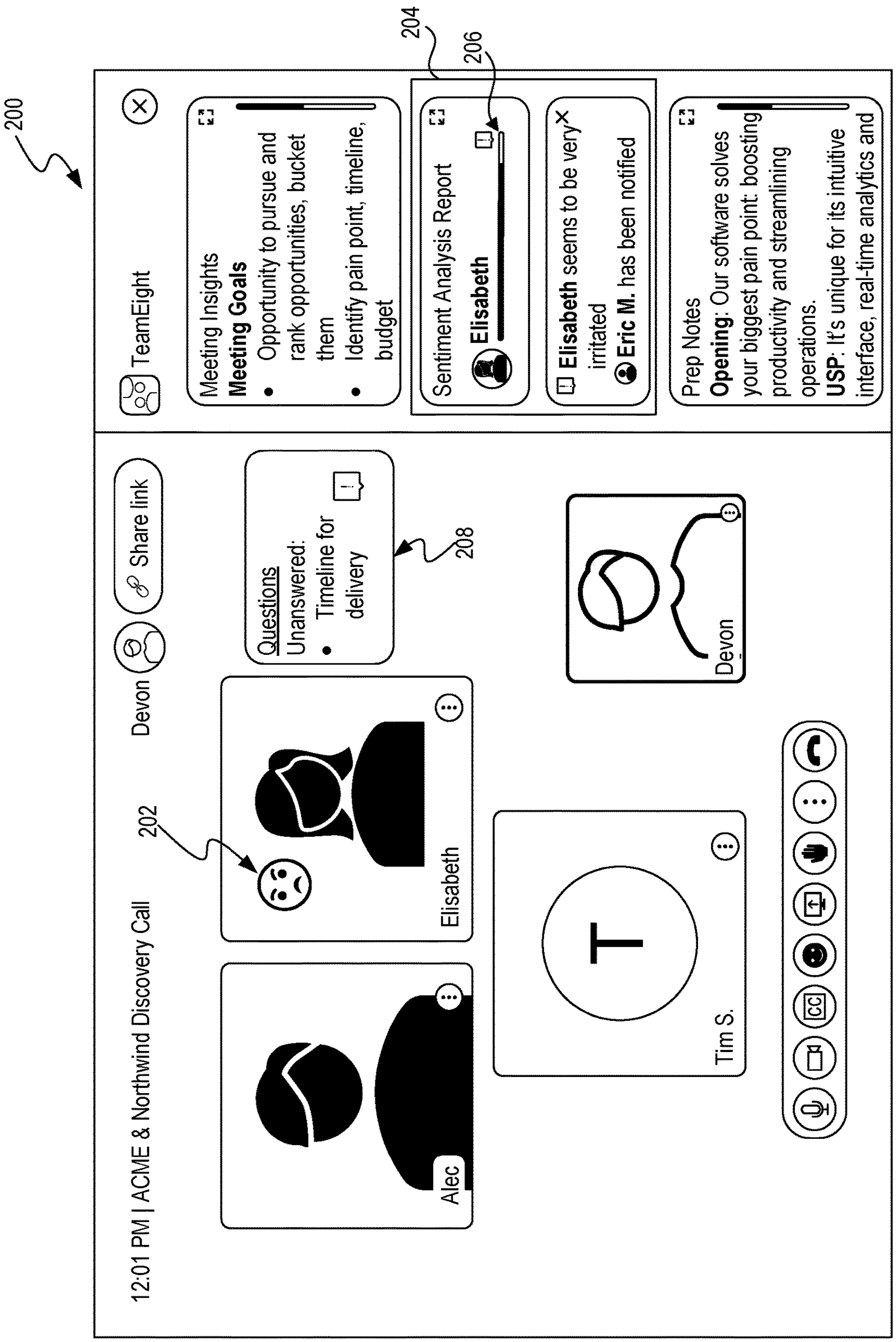
FIG. 2 is an example user interface (UI) including sentiment analysis and a question queue, in accordance with some implementations of the present technology.

FIG. 2 is an example UI 200 including sentiment analysis and a question queue, in accordance with some implementations of the present technology. The UI 200 includes a sentiment indicator 202, a sentiment analysis report 204, an intensity scale 206, and a question queue 208. In some implementations, the UI 200 is a HUD displayed by a meeting overlay application as described in relation to FIGS. 1A and 1B above.

In some implementations, the UI 200 includes a sentiment indicator 202 for one or more participants. The sentiment indicator 202 can be a visual indicator indicating a detected sentiment of a meeting participant. For example, a meeting enhancement server (e.g., the meeting enhancement server 102*a* or the meeting enhancement server 102*b* described, respectively, in relation to FIGS. 1A and 1B above) can process input data associated with a participant using one or more AI agents, such as audio of the participant processed via an audio analysis agent (e.g., the audio analysis agent 108*a*-2 described in relation to FIG. 1A above) and/or video of the participant processed via a video analysis agent (e.g., the video analysis agent 108*a*-3 described in relation to FIG. 1A above), to determine that the participant's words, facial expressions, mannerisms, and/or other behaviors indicate a particular sentiment in relation to the meeting. Such an example is illustrated in FIG. 2; the meeting participant "Elisabeth" has been determined by the meeting enhancement server (e.g., based on input data associated with her behavior) to be irritated and, thus, a sentiment indicator 202 showing an irritated face has been placed within the UI 200 of another participant ("Devon") near the video of Elisabeth (e.g., via the screen topology analysis agent 108*a*-1, as described in relation to FIG. 1A above, recognizing the location of Elisabeth's video). The sentiment indicator 202 can therefore intuitively indicate Elisabeth's irritation to Devon, thereby drawing his attention to her irritation and allowing Devon to address the source of the irritation during the meeting.

In some implementations, as depicted in FIG. 2, a sentiment indicator 202 is supplemented by a sentiment analysis report 204. The sentiment analysis report 204 is a visual indicator including further details associated with the determined sentiment of a meeting participant. For example, as depicted in FIG. 2, the sentiment analysis report 204 includes an intensity scale 206 visually depicting the intensity or severity of the sentiment expressed by a participant and/or text detailing the detected intensity or severity of the sentiment. As depicted in FIG. 2, the meeting enhancement server has determined that Elisabeth's degree of irritation is high, causing the display of an intensity scale 206 that is almost at the maximum level and text notifying Devon that Elisabeth appears "very irritated." In other implementations, the sentiment analysis report 204 instead indicates the overall sentiment of a plurality of participants in the meeting (e.g., by displaying an intensity scale 206 depicting the overall level of a particular sentiment present in the meeting).

In some implementations where a negative sentiment is detected for a participant, the meeting enhancement server automatically notifies (e.g., sends an email, text message, and/or another communication to) an individual who is not a participant in the meeting. For example, the notified individual can hold a management role within an organization associated with the meeting and therefore find feedback about the sentiment of participants in the meeting valuable. As another example, the notified individual can be an individual identified by the meeting enhancement server as an individual who can improve the negative sentiment of the participant by joining and contributing to the meeting. Continuing with the same example, the meeting enhancement server can determine, using one or more AI agents, that a particular member of the organization has expertise and/or a personality allowing the member to address the concerns of the participant that are contributing to the participant's negative sentiment. In such implementations, the UI 200 can indicate to a current participant in the meeting that another individual has been notified and/or can join the meeting to assist in resolving the negative sentiment. For example, as depicted in FIG. 2, Devon is notified by text within the sentiment analysis report 204 that "Eric M." has been notified of the irritated sentiment of Elisabeth. Eric M., in turn, is an individual determined by the meeting enhancement server to have expertise and/or a personality that allows for Elisabeth's irritation to be reduced.

In some implementations, the UI 200 includes a question queue 208 associated with one or more participants. The question queue 208 can be a visual indicator including a list of one or more questions asked by a participant and/or including an indication of whether questions from the list have been answered by other participants in the meeting. For example, the meeting enhancement server can process, using the one or more AI agents, input data associated with a participant to determine that the participant has asked a question. Such an example is illustrated in FIG. 2; Elisabeth has been determined by the meeting enhancement server (e.g., based on input data associated with her behavior) to have asked about the timeline for delivery of a product and thus a question queue 208 including this question has been placed within the UI 200 of Devon near the video of Elisabeth (e.g., via a screen topology analysis agent recognizing the location of Elisabeth's video). Also as depicted in FIG. 2, the question queue 208 indicates that Elisabeth's question has not yet been answered, intuitively signaling to Devon that Elisabeth is still waiting for the question to be addressed. In implementations where a question displayed in the question queue 208 is answered (e.g., as determined by the one or more AI agents), the question queue 208 can be automatically updated to include a visual indication that the question has been addressed.

In some implementations, the UI 200 includes a visual indicator denoting the importance of questions that have been previously asked in the meeting, aiding the participant viewing the UI 200 in prioritizing addressing those questions. For example, the importance of a question can be determined by the one or more AI agents based on the content of the question (e.g., the relevance of the semantic content of the question to the overall context of the meeting) and/or the role of the individual asking the question (e.g., the questions of a participant identified by another meeting participant and/or the one or more AI agents as a key decision-maker are prioritized more highly). Continuing with the same example, the visual indicator of importance can be placed near the associated question in a question queue 208 (e.g., via a screen topology analysis agent recognizing the location of the question), as depicted by the exclamation point in FIG. 2. Additionally or alternatively, the UI 200 may include a visual indicator of the amount of time within the meeting that one or more of the participants has spent speaking.

Figure 3A:
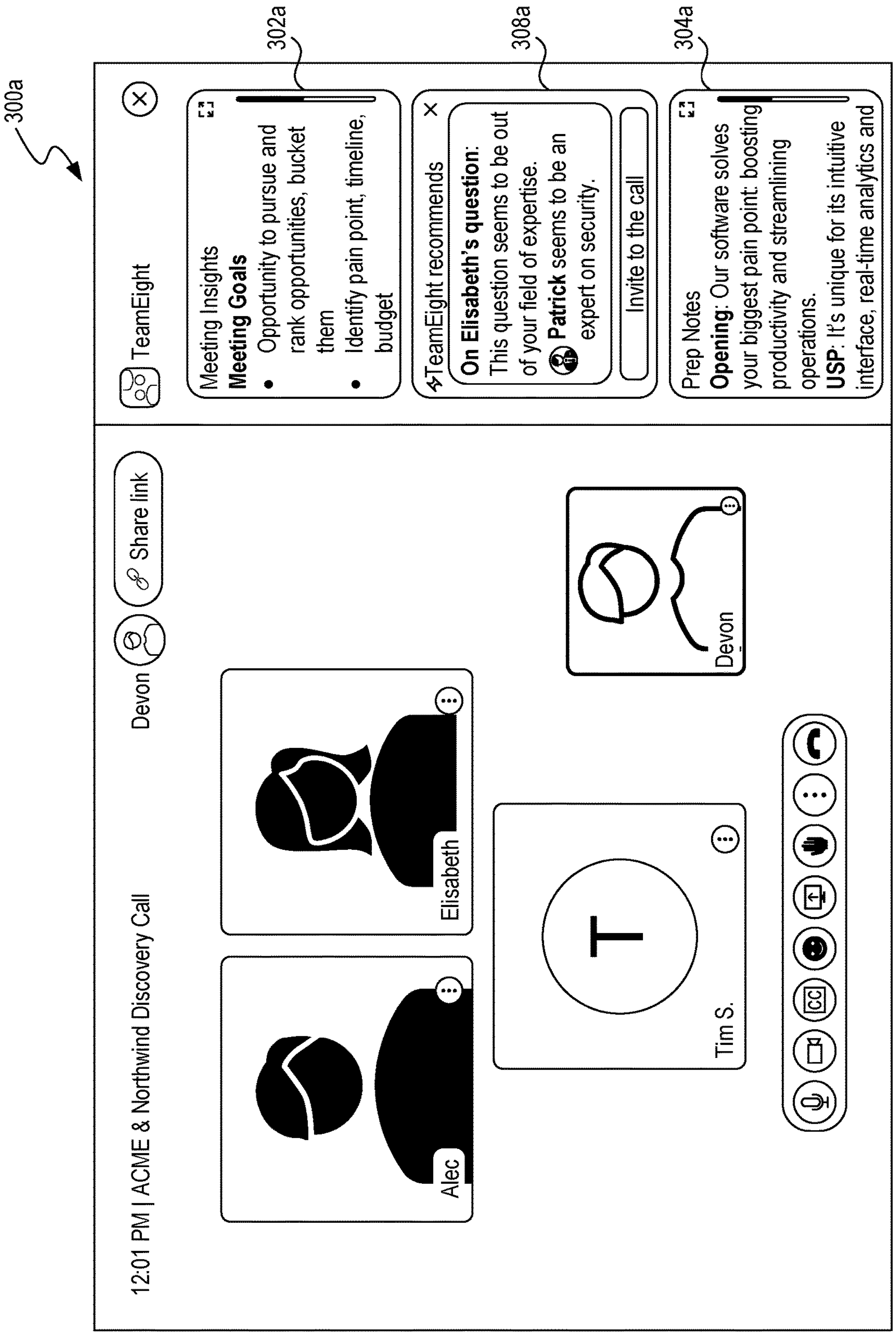
FIG. 3A is an example UI illustrating invitation of an expert to a meeting, in accordance with some implementations of the present technology.
Figure 3B:
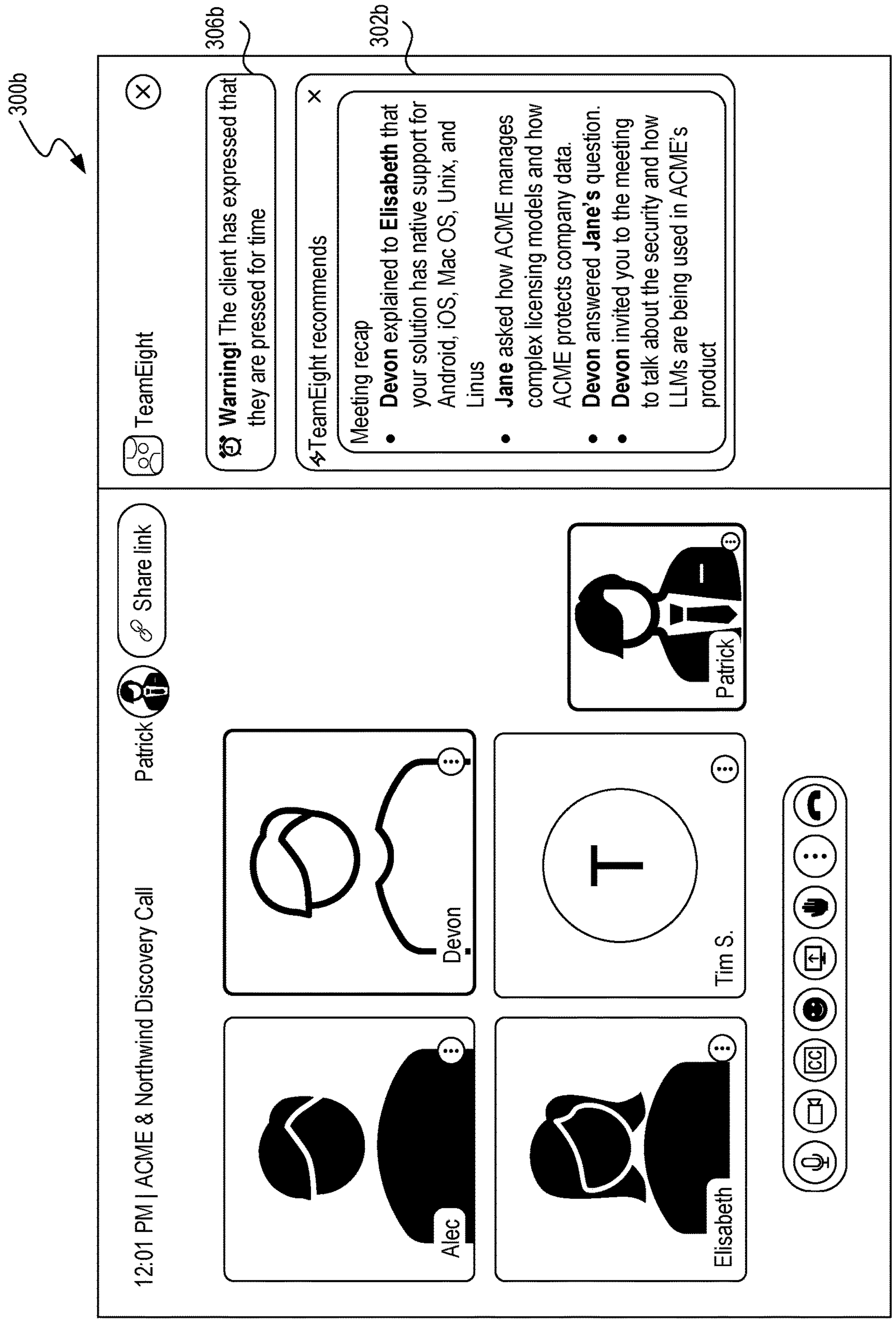
FIG. 3B is a second example UI illustrating invitation of an expert to a meeting, in accordance with some implementations of the present technology.

FIGS. 3A and 3B are example UIs 300*a*, 300*b* involving invitation of an expert to a meeting, in accordance with some implementations of the present technology. The UIs 300*a*, 300*b* include meeting insight lists 302*a* and 302*b*, preparation notes 304*a*, an invite suggestion 308*a*, and a timing indicator 306*b*. In some implementations, the UIs 300*a*, 300*b* are HUDs displayed by a meeting overlay application as described in relation to FIGS. 1A and 1B above.

Beginning with FIG. 3A, the UI 300*a* includes a meeting insight list 302*a*, which is a visual indicator including a textual summary of information associated with the meeting, such as goals for the meeting, content discussed within the meeting, and the like. In some implementations, the meeting insight list 302*a* is customized by a participant viewing the UI 300*a* (e.g., by uploading a list of meeting goals to a meeting enhancement server, such as the meeting enhancement server 102*a* or the meeting enhancement server 102*b* described, respectively, in relation to FIGS. 1A and 1B, in advance of the meeting) and/or by a persona-specific agent (e.g., one of the persona-specific agents 116*a* described in relation to FIG. 1A above) trained to generate content for the specific participant. For example, as depicted in FIG. 3A, "Devon" is the participant viewing the UI 300*a* and the meeting insight list 302*a* is customized by Devon and/or on Devon's behalf by a persona-specific agent associated with Devon.

In some implementations, the UI 300*a* includes preparation notes 304*a* for assisting the participant viewing the UI 300*a* (e.g., Devon) in contributing to the meeting. For example, the preparation notes 304*a* can be uploaded to the meeting enhancement server in advance of the meeting (e.g., by the participant) and displayed as a visual indicator within the UI 300*a* when the meeting begins. As another example, the preparation notes 304*a* can be generated by one or more AI agents based on the context of the meeting, as determined by a description of the context provided to the meeting enhancement server by the participant and/or by detecting the context based on input data from the meeting.

In some implementations, the UI 300*a* includes an invite suggestion 308*a*, which is a visual indicator suggesting an individual who is currently not participating in the meeting to invite as a participant. In such implementations, the meeting enhancement server processes input data from the meeting to determine that a discussion topic has been raised in the meeting (e.g., a question or comment about a particular subject matter or area of expertise) that can be more effectively answered by an individual with relevant expertise who is not yet participating in the meeting than by current participants in the meeting. For example, the meeting enhancement server can use the one or more AI agents and/or an individual not participating in the meeting to determine that the participants do not have expertise matching the discussion topic (e.g., expertise in the same subject area included as the discussion topic) and/or that a particular individual not participating in the meeting does have matching expertise. As another example, the meeting enhancement server can store artifacts (e.g., in an artifact database 110*a*, as described in relation to FIG. 1A above) indicating the expertise of various individuals and, when a discussion topic is detected, search those artifacts for an individual with matching expertise.

As illustrated in FIG. 3A, Elisabeth has been determined by the meeting enhancement server (e.g., based on input data associated with her behavior) to have asked a question about security, and the meeting enhancement server has responsively detected that security has become a discussion topic in the meeting. Continuing with the same example, the meeting enhancement server then suggests that Patrick, an individual with security expertise, be invited to the meeting via the generation of an invite suggestion 308*a*, which includes an interactable element that, when selected by Devon (e.g., by clicking on the corresponding portion of the UI 300*a* with a mouse cursor), causes Patrick to be invited to the meeting. In other implementations, the meeting enhancement server automatically invites an individual with expertise matching the discussion in response to detecting that the discussion topic does not match the expertise of current meeting participants. For example, the meeting enhancement server can detect the discussion topic of security in the manner described above and responsively invite Patrick (e.g., call Patrick via a meeting provider hosting the meeting, such as the meeting provider 104*a* described in relation to FIG. 1A above), who is determined to have expertise matching the discussion topic of security (e.g., by one or more AI agents of the meeting enhancement server), to the meeting automatically.

FIG. 3B depicts an example UI 300*b* as displayed for an expert after the expert has been invited to an ongoing meeting as described in relation to FIG. 3A above. For example, as depicted in FIG. 3B, the security expert Patrick has been invited to an ongoing meeting and is presented with a UI 300*b* customized for Patrick (e.g., differing from Devon's UI 300*a*). Continuing with the same example, the UI 300*b* includes a meeting recap list 302*b* including a recap/bullet point summary of occurrences within the meeting before the expert joined the meeting, thereby allowing the expert to be informed of the context of the meeting without needing to ask questions of the meeting participants. Such an example is illustrated in FIG. 3B; the meeting insight list 302*b* displayed to Patrick indicates that Patrick was invited by Devon to talk about security, aiding Patrick in understanding his role within the meeting.

In some implementations, rather than inviting a human expert to a meeting, the meeting enhancement server invites and/or activates an AI agent (e.g., by providing an audio cue or GUI selection that is received by an in-meeting bot service 122*a*, as described in relation to FIG. 1A above) trained to provide expertise matching a discussion topic in the meeting. In such implementations, the AI agent can be a persona-specific agent (e.g., one of the persona-specific agents 116*a* described in relation to FIG. 1A above) associated with an expert having expertise in the discussion topic which, by virtue of modeling the behavior of this expert, can act as a substitute for the expert within the meeting. For example, a persona-specific agent associated with Patrick can be invited to or otherwise added to a meeting in which security is discussed but which Patrick himself is unavailable to join. Continuing with the same example, the persona-specific agent can join the meeting either as an audio-only participant or as a video participant represented by a virtual avatar. Once in the meeting, the persona-specific agent can receive data from the meeting, answer questions (e.g., using text or simulated audio), present slides, and/or perform other actions to fulfill the role that Patrick can provide within a meeting. In implementations where more than one discussion topic is identified for which meeting participants lack expertise, a plurality of AI agents trained to provide expertise matching the different discussion topics can be invited or otherwise added to the meeting.

In some implementations, the UI 300*b* additionally or alternatively includes a timing indicator 306*b*, which can be a visual indicator including an indication of the time remaining in a meeting and/or a time pressure associated with one or more participants in the meeting. For example, as depicted in FIG. 3B, the timing indicator 306*b* includes text indicating the client is pressed for time, aiding Patrick in recognizing he has limited time to address the questions he was invited to the meeting to answer.

Figure 4A:
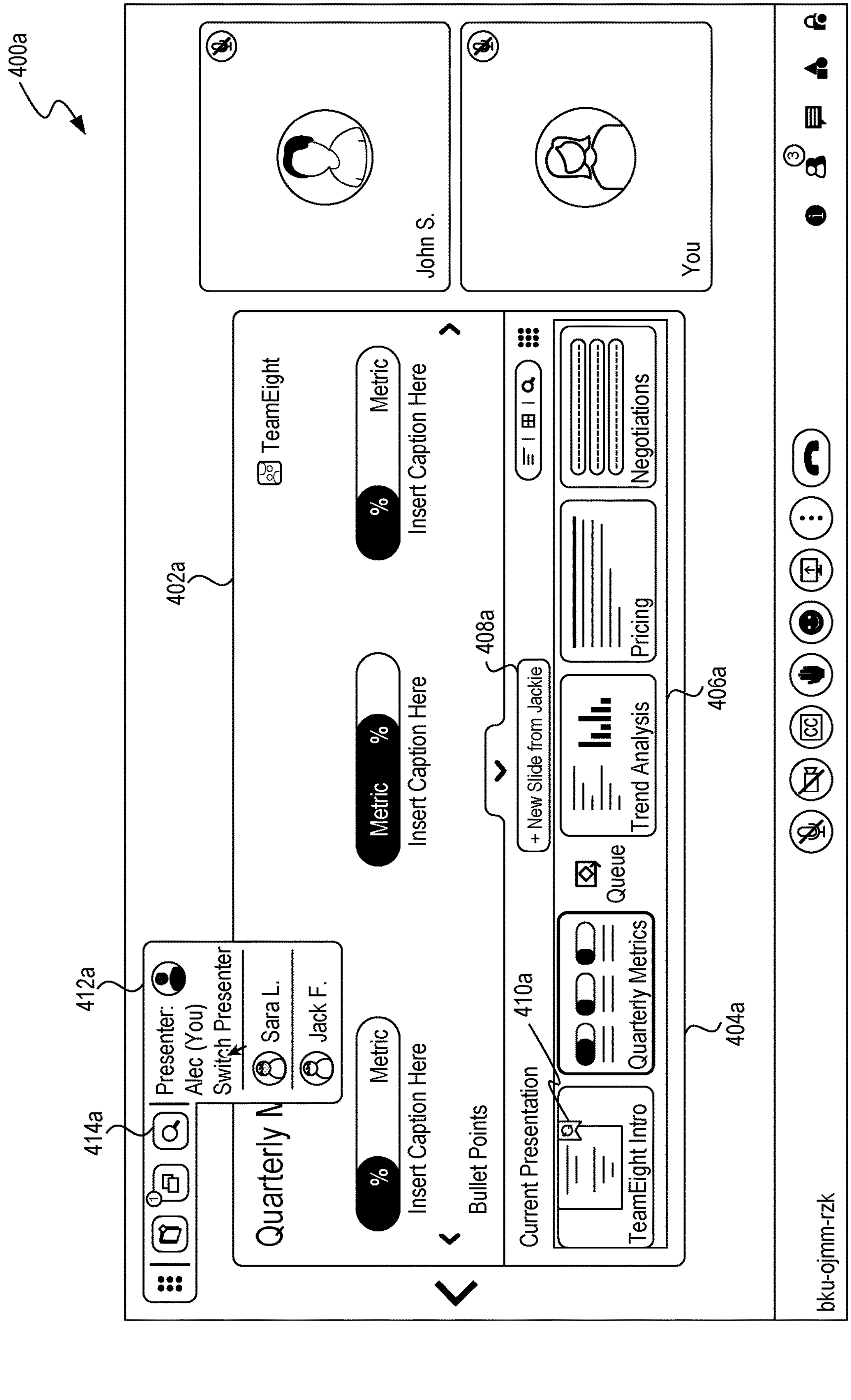
FIG. 4A is an example UI for dynamically modifying a set of presentation artifacts, in accordance with some implementations of the present technology.
Figure 4B:
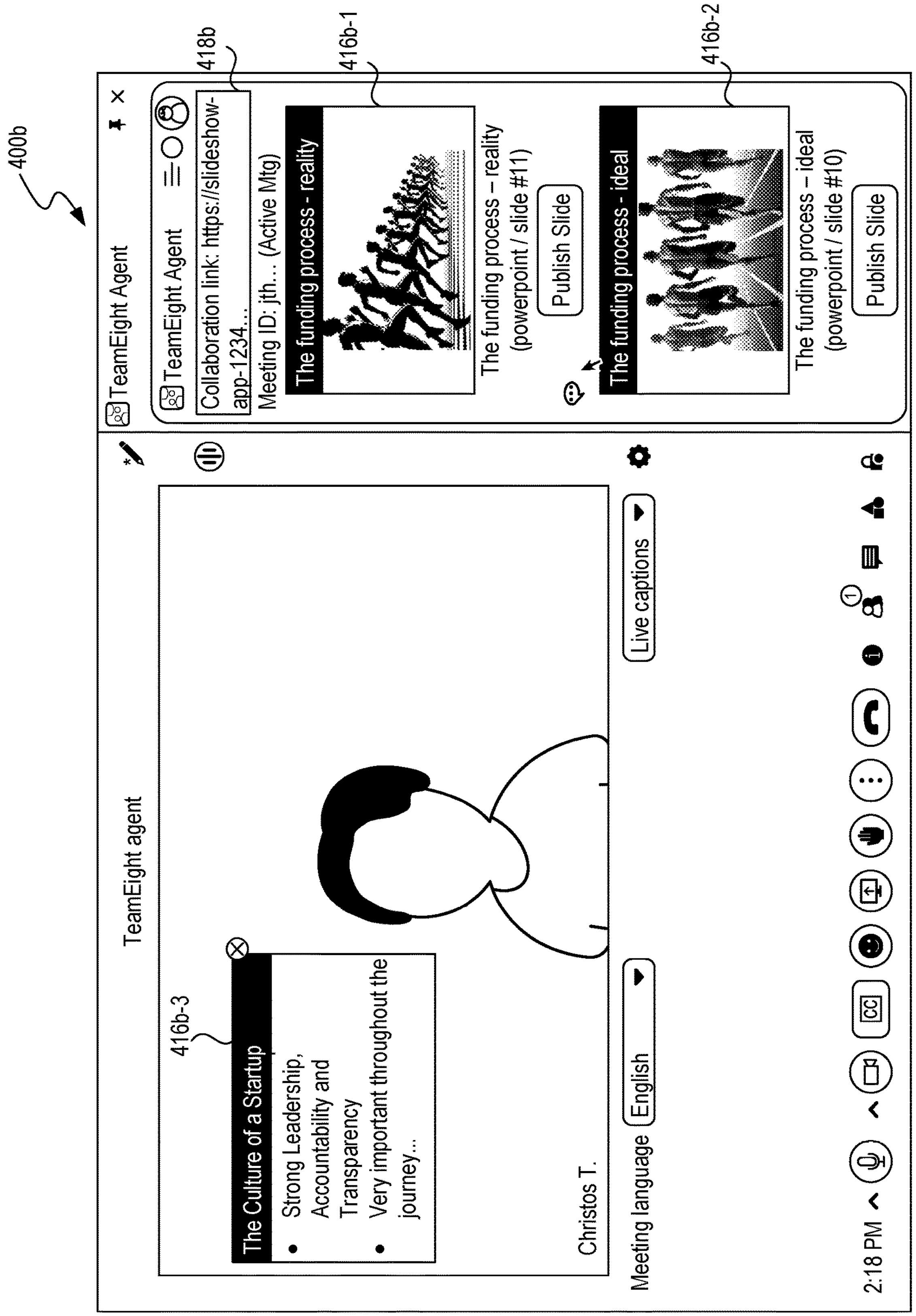
FIG. 4B is a second example UI for dynamically modifying a set of presentation artifacts, in accordance with some implementations of the present technology.

FIGS. 4A and 4B are example UIs 400*a*, 400*b* for dynamically modifying a set of presentation artifacts, in accordance with some implementations of the present technology. In some implementations, the UIs 400*a*, 400*b* are HUDs displayed by a meeting overlay application as described in relation to FIGS. 1A and 1B above. Beginning with FIG. 4A, the UI 400*a* includes a selected artifact 402*a*, a presentation artifact overlay 404*a*, a list of presentation artifacts 406*a*, a visual notification 408*a*, a bookmark 410*a*, a presenter indicator 412*a*, and a search indicator 414*a*.

FIG. 4A is an example UI 400*a* appearing to a presenter in a meeting. In some implementations, the UI 400*a* is a transparent or semi-transparent visual layer above a selected artifact 402*a* from a set of presentation artifacts being presented within an interface of a meeting provider (e.g., a meeting provider 104*a* as described in relation to FIG. 1A above). For example, the selected artifact 402*a* can be displayed in response to the presenter sharing (e.g., by selecting a "share screen" or "share window" feature within a meeting provider application) a display of the selected artifact 402*a* within a running canvas (e.g., the running canvas 112*a* described in relation to FIG. 1A above). The UI 400*a* includes various visual indicators for enhancing the presenter's interaction with the set of presentation artifacts and/or the presenter's ability to present the set of presentation artifacts to other meeting participants.

For example, one such visual indicator is a presentation artifact overlay 404*a*. The presentation artifact overlay 404*a* includes a list of presentation artifacts 406*a* from the set of presentation artifacts that have been presented and/or are queued to be presented according to the order of the set of presentation artifacts. The list of presentation artifacts 406*a* can thereby enable the presenter to view previous and/or upcoming presentation artifacts on a single screen including the interface of the meeting provider, improving the ease of referencing and presenting these artifacts without the use of multiple windows/screens. Additionally or alternatively, each artifact in the list of presentation artifacts 406*a* can be selectable by the presenter, causing the running canvas to update such that the selected artifact becomes the currently presented artifact, thereby enabling convenient navigation between a currently presented artifact and other artifacts in the set of presentation artifacts.

In some implementations, the UIs of other users belonging to the same organization as the presenter are additionally or alternatively included in the same presentation artifact overlay 404*a* and/or another visual indicator for navigating between presentation artifacts. In such implementations, both these other users and the presenter can control the artifact that is currently presented, enabling collaborative control of the set of presentation artifacts that can reduce the burden on the presenter to manage navigation of the set of presentation artifacts while simultaneously presenting and discussing the artifacts therein. In other implementations, other users with access to the running canvas can navigate between artifacts in the set of presentation artifacts via an interface of the running canvas, enabling the same collaborative control using a different interface.

In some implementations, the presentation artifact overlay 404*a* includes a visual notification 408*a* indicating to the presenter that another user has added and/or suggested the addition of an artifact to the set of presentation artifacts, which can be queued for presentation absent instructions to the contrary from the presenter. For example, as depicted in FIG. 4A, the visual notification 408*a* indicates that a user ("Jackie") other than the presenter ("Alec") has added a new slide to the set of presentation artifacts (e.g., the "trend analysis" slide below the visual notification 408*a*), which is next in the queue of artifacts to be presented. Thus, Alec is notified that the next artifact Alec may present is a slide that had not originally been the next artifact to present and/or was not originally included in the set of presentation artifacts at all, thereby giving Alec advance notice and/or time to prepare for presentation of the slide. In other implementations, the visual notification is an indication for the presenter to accept or decline a suggested addition/modification to the set of presentation artifacts rather than a simple notification that the addition/modification has already taken place. For example, the presenter can receive such a visual notification via the UI 400*a* and accept or decline the addition/modification by interacting with the notification, which can cause a corresponding action within the set of presentation artifacts (e.g., an artifact is added or re-ordered when the visual notification is accepted, the artifact is not added/modified when the visual notification is declined).

In some implementations, the presentation artifact overlay 404*a* includes a bookmark 410*a*. The bookmark 410*a* is a visual indicator of an artifact within the set of presentation artifacts after which the artifacts have been modified from a previous version of the set of presentation artifacts. For example, as depicted in FIG. 4A, the "Team Eight Intro" slide is marked with a bookmark 410*a*, indicating that one or more of the subsequent artifacts appearing in the presentation artifact overlay 404*a* were modified (e.g., by the presenter or another user) with respect to the previous version of the set of presentation artifacts (e.g., the set of presentation artifacts at the time presentation began). In some implementations, a selection of the bookmark 410*a* by the presenter reverts the set of presentation artifacts to the previous version and/or causes the artifact marked with the bookmark 410*a* to become the currently presented artifact.

In some implementations, the UI 400*a* includes a presenter indicator 412*a*, which is a visual indicator indicating the current presenter and/or other meeting participants who can become the presenter when selected via interaction with the presenter indicator 412*a*. For example, as depicted in FIG. 4A, the current presenter Alec can interact with the presenter indicator 412*a* by selecting with a mouse cursor the name of another meeting participant (e.g., "Sara L." or "Jack F."), causing a meeting enhancement server (e.g., the meeting enhancement server 102*a* or the meeting enhancement server 102*b* as described, respectively, in relation to FIGS. 1A and 1B) to grant the selected meeting participant primary control (e.g., via a running canvas, such as the running canvas 112*a* described in relation to FIG. 1A above and/or via a meeting overlay application, such as the meeting overlay application 106*a* described in relation to FIG. 1A above, accessed by the selected meeting participant) over presentation of the set of presentation artifacts.

In some implementations, the presenter can be an AI agent representing an individual (e.g., a persona-specific agent of the persona-specific agents 116*a* described in relation to FIG. 1A above) or another AI agent configured (e.g., by the in-meeting bot service 122*a* of FIG. 1A above) to present slides. For example, the AI agent can communicate with the meeting enhancement server using one or more tools (as described in more detail in relation to FIG. 13 below) to navigate through the set of presentation artifacts (e.g., via a running canvas) while a human meeting participant speaks about the artifacts being presented by the AI agent. Additionally or alternatively, the AI agent can generate text and/or simulated audio associated with the artifacts in the set of presentation artifacts as each artifact is presented, enabling the AI agent to present the artifacts independently or in collaboration with a human presenter.

In some implementations, the UI 400*a* includes a search indicator 414*a*, which is a visual indicator that, when interacted with by the presenter, allows the presenter to search for artifacts to present within the meeting. For example, the search indicator 414*a* can, when interacted with (e.g., when selected by a mouse cursor), cause display of a text interface allowing the presenter to input a natural language search query requesting a certain artifact to present. Continuing with the same example, the search query can be transmitted to one or more AI agents of the meeting enhancement server, which can process the search query (e.g., using an invoked AI model) to detect a semantic meaning of the query and/or retrieve an artifact (e.g., from the artifact database 110*a* described in relation to FIG. 1A above) associated with that semantic meaning (e.g., including content with a similar semantic meaning or pertaining to the same topic as the search query). The retrieved artifact can then be displayed to the presenter via the UI 400*a* and added to the set of presentation artifacts when selected by the presenter. In these and other implementations, the search indicator 414*a* appears in the UIs of meeting participants who are not presenters but have access to the running canvas. In such implementations, these participants can likewise search for artifacts to add to the set of presentation artifacts by interacting with the search indicator 414*a*, but selecting the retrieved artifact can suggest addition of the artifact into the set of presentation artifacts to the presenter instead of adding the artifact automatically.

FIG. 4B is a second example UI 400*b* appearing to a presenter in a meeting. The UI 400*b* includes three suggested artifacts 416*b*-1, 416*b*-2, 416*b*-3 and a collaboration link 418*b*. The UI 400*b* includes different visual features than the UI 400*a* on account of being displayed over an interface of a different meeting provider. The UI 400*b* additionally or alternatively differs from the UI 400*a* in that a search indicator is not included in the UI 400*b*. Instead, suggested artifacts 416*b* to include in a set of presentation artifacts are displayed as visual indicators within the UI 400*b* after being automatically generated and/or selected by one or more AI agents and provided to a meeting overlay application by the meeting enhancement server. For example, the one or more AI agents, the meeting overlay application, and the meeting enhancement server can be the same as or generally similar to, respectively, the one or more AI agents, the meeting overlay application 106*a*, and the meeting enhancement server 102*a* described in relation to FIG. 1A above. Continuing with the same example, the presenter can interact with one or more of the suggested artifacts 416*b* via the UI 400*b*, causing the suggested artifacts 416*b* that are interacted with to be added to the set of presentation artifacts in a running canvas (e.g., the running canvas 112*a* described in relation to FIG. 1A above).

In some implementations, the UI 400*b* includes a collaboration link 418*b*, which is a URL that, when selected or input into a web browser, causes the display of the running canvas within a web browser. Additionally or alternatively, the running canvas and the collaboration tools contained therein can be accessible exclusively to meeting participants and/or other individuals via the collaboration link 418*b*. Thus, by managing access to the collaboration link 418*b*, the presenter can manage the set of other individuals who can modify and/or suggest modifications to a set of presentation artifacts being presented via the running canvas.

Example Behavioral Modeling Platform

Figure 5:
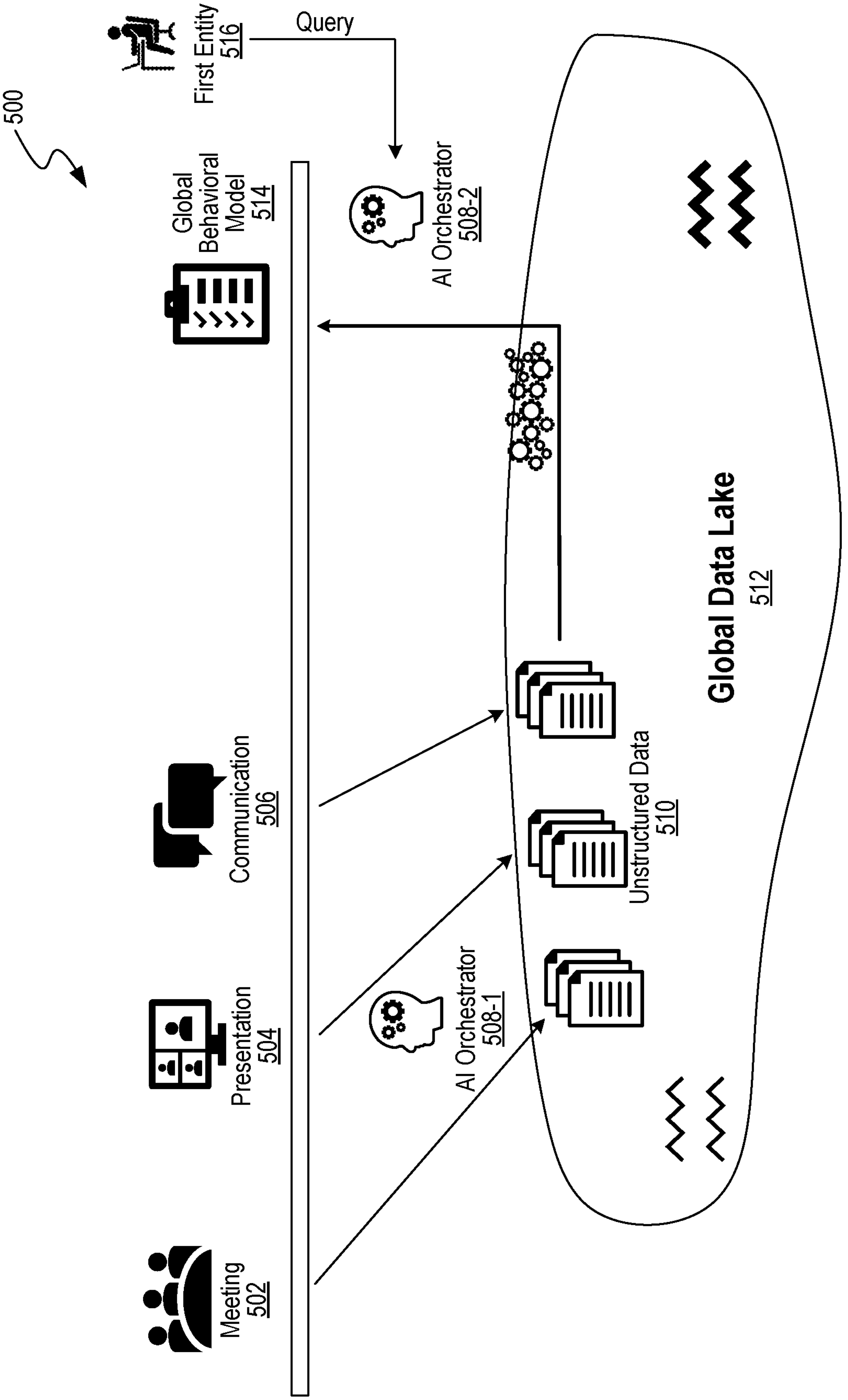
FIG. 5 is an example behavioral modeling platform for generating global behavioral models, in accordance with some implementations of the present technology.

FIG. 5 is an example behavioral modeling platform 500 for generating global behavioral models, in accordance with some implementations of the present technology. The behavioral modeling platform 500 includes a meeting 502, a presentation 504, a communication 506, AI orchestrators 508-1 and 508-2, unstructured data 510, a global data lake 512, a global behavioral model 514, and a first entity 516. The behavioral modeling platform 500 can be implemented using components of the example computer system illustrated and described in more detail with reference to FIG. 20. Likewise, implementations of the behavioral modeling platform 500 can include different and/or additional components or can be connected in different ways.

The behavioral modeling platform 500 is designed to capture, process, and analyze behavioral data from various sources to generate insights and forecasts about entity behavior. An entity is an actor such as an individual, company, or organization that interacts with the behavioral modeling platform 500 and/or other entities. The behavioral modeling platform 500 comprises several interconnected components that work together to transform raw input data into actionable behavioral models. Sources of data for the behavioral modeling platform 500 can include a meeting 502, a presentation 504, and/or a communication 506. A meeting 502 can be a virtual meeting, such as a videoconference or webinar, that includes one or more meeting participants located remotely from one another. The meeting 502 can include audio, video, and/or text data indicating behavioral information of meeting participants such as participant interactions, discussions, and decision-making processes. A presentation 504 can be a slideshow, a demonstration, and/or another form of content presented during meetings or a standalone event to provide information to or about an entity. A communication 506 is a recorded exchange of information between two or more entities (e.g., texts, emails, telephone calls).

The behavioral modeling platform 500 includes a first AI orchestrator 508-1 that receives data from the sources described above and automatically extracts unstructured data 510 associated with behavioral data, or data indicative of the past or future behavior of identifiable entities. For example, behavioral data can include data representing questions asked to an entity, topics discussed by an entity, a frequency of discussing a certain topic, an amount of time spent discussing a topic, a discussion about a feature of an entity between other entities, and/or an action item associated with an entity. The first AI orchestrator 508-1 can be a software component that invokes an AI model or algorithm, applies the model to a dataset, and processes the output of the model to automatically perform functions of the behavioral modeling platform 500. For example, the first AI orchestrator 508-1 can be the same as or generally similar to the AI orchestrator 114*a* described in relation to FIG. 1A above, except that the first AI orchestrator 508-1 specifically interacts with the behavioral modeling platform 500.

In some implementations, the first AI orchestrator 508-1 stores unstructured data 510 from one or more sources in a global data lake 512. The global data lake 512 can be hardware and/or software for storing artifacts uploaded to the behavioral modeling platform 500 and/or collected by the first AI orchestrator 508-1. For example, the global data lake 512 can include one or more user artifacts, which are described in more detail in relation to FIG. 7 below. When the first AI orchestrator 508-1 stores unstructured data 510 in the global data lake 512, the first AI orchestrator 508-1 can label artifacts with metadata to enable more efficient retrieval of the unstructured data 510 when used to generate a global behavioral model 514, as described in more detail below. The metadata can include the entity that generated the artifact, the department/role of the generating entity within a larger organization, a name of an organization to which the generating entity belongs, and/or a stage of an interaction involving the entity at the time the artifact was generated (e.g., due diligence stage for a transaction, ideation stage for a product, initial pitch for a sales effort).

In some implementations, the artifacts extracted from the available sources of data by the first AI orchestrator 508-1 are limited based on a predetermined level of behavioral data sharing. This level can be a global level of behavioral data sharing applied whenever new data enters the behavioral modeling platform 500 or can be a level specified by an entity, which is applied to data generated by that entity. In implementations where an entity selects a level of behavioral data sharing, the entity can select a level of behavioral data sharing via a graphical user interface (GUI), such as the data sharing selection GUI 600 described in relation to FIG. 6 below.

Different levels of behavioral data sharing reflect different degrees of completeness, degrees of specificity/anonymity, and/or types of data that can be extracted by the first AI orchestrator 508-1. For example, company-level behavioral data sharing can be selected, causing only broad statistics/features about an organization (e.g., overall headcount, revenue targets, deals closed, or profits for the organization) to which the entity providing the data belongs to be extracted. As a second example, department-level behavioral data sharing can be selected, causing the same and/or similar statistics/features as the company level to be collected but for a specific department or departments within the organization of the entity providing the data. As a third example, individual-level behavioral data sharing can be selected, causing artifacts indicating more precise information such as personality traits, completed tasks (e.g., closed deals, positions held), and/or other behaviors associated with an individual to be collected. In some implementations, the predetermined level of behavioral data sharing (whether global or entity-specific) enables the collection of lower/more generic levels of behavioral data in addition to the particular level selected.

In implementations where an entity selects a level of behavioral data sharing, the behavioral modeling platform 500 can enforce a reciprocal policy such that only data within the same level of behavioral data sharing that an entity provides can be processed by the behavioral modeling platform 500 when the entity inputs a query to generate a global behavioral model 514 (as described in more detail below). Enforcing such a reciprocal policy encourages entities to opt into higher levels of data sharing and thereby generates a compounding network effect within the behavioral modeling platform 500 where opting into higher levels of data sharing becomes increasingly more desirable as increasingly more data from other entities becomes available in return.

The behavioral modeling platform 500 also includes a second AI orchestrator 508-2, which can be the same as or generally similar to the first AI orchestrator 508-1, except that the second AI orchestrator 508-2 processes a subset of the unstructured data 510 stored in the global data lake 512 to generate a global behavioral model 514 rather than extracting unstructured data 510 from various data sources. The global behavioral model 514 is a forecast of the behavior of an entity based on data associated with the behavior of that entity in the global data lake 512 and/or a compilation of artifacts from the global data lake 512 indicating behavioral patterns of the entity. The global behavioral model 514 can include suggestions for how to interact with the entity to obtain a desired outcome (e.g., making a sale, closing a negotiation) and/or predictions for how an action towards the entity will change that entity's behavior. For example, the global behavioral model 514 can include preparation notes describing how to improve the odds of achieving an objective within a meeting with the entity, coaching for a salesperson describing how to improve the odds of selling a product to the entity, and/or benchmarking comparing the behavior of the entity to other, similar entities (e.g., entities of a similar size or in a similar industry). In implementations where the global behavioral model 514 includes benchmarking, comparisons within the benchmarking can include comparisons of a likelihood to close a deal, a length of a negotiation period, a willingness to spend on purchases, and/or similar comparisons. The second AI orchestrator 508-2 can generate the global behavioral model 514 by invoking an AI model to extract artifacts from the global data lake 512 that are identified by the AI model as being associated with behaviors of the entity that are indicative of future behavior and generating a forecast of said future behavior (e.g., using the AI model, another AI model, and/or a set of deterministic rules) based on those extracted artifacts.

In some implementations, the global behavioral model 514 is generated based on a query received from a first entity 516. A query describes a behavior of a second entity that the first entity 516 wishes to forecast. For example, a query can be a question such as "what is the best way to sell a SaaS product to Entity X?" or "how willing is Entity X to enter into joint ventures as compared to other entities in the same industry?" In such implementations, the global behavioral model 514 can include the information described above and/or benchmarking comparing interactions between the first entity 516 and the second entity to interactions between the second entity and other entities that have previously interacted with the second entity for similar reasons to the first entity 516. For example, positivity of the sentiment of the second entity in a certain stage of a sales negotiation with the first entity 516 can be compared to positivity of the sentiment of the second entity in the same stage of a sales negotiation with a third entity, where the third entity successfully closed the sale. Continuing with the same example, when the benchmarking indicates that the positivity of the second entity towards the first entity 516 is higher than the previous positivity of the second entity towards the third entity, the global behavioral model 514 can include a suggestion that the first entity 516 maintain its current behavior, while the global behavioral model 514 can include a suggestion for the first entity 516 to behave more like the third entity when the positivity of the second entity towards the first entity 516 is lower than the previous positivity of the second entity towards the third entity.

In such implementations, the artifacts extracted from the global data lake 512 by the second AI orchestrator 508-2 to generate the global behavioral model 514 can include artifacts from one or more categories related to the behavior of the first entity 516 and/or the second entity. For example, the artifacts can include artifacts associated with an engagement level between the first entity 516 and the second entity. Continuing with the same example, such artifacts can include (1) a date of last activity, which indicates how recently the latest interaction between the entities occurred, (2) a list of communication openings/interactions, which indicates whether the second entity is engaging with communications from the first entity 516, (3) a frequency of meetings or calls, revealing a level of active participation of the second entity, and/or (4) a response time measuring how promptly the second entity responds to the first entity 516.

As a second example, artifacts associated with a stage in an interaction between the first entity 516 and the second entity can be collected. Continuing with the same example, these artifacts can include (1) artifacts tracking whether the interaction has recently progressed from one stage to another, such as moving from discovery to proposal within a negotiation, (2) indicators of stagnation (e.g., indicators that the stage of the interaction has not changed for a significant period of time), and/or (3) indications of regression, such as moving back to negotiation after a verbal commitment to a particular proposition.

As a third example, artifacts associated with involvement of particular stakeholders (e.g., decision-makers) within the second entity can be collected. Continuing with the same example, these artifacts can include (1) an indication of whether decision-makers within the second entity have been identified by the first entity 516, (2) an indication of an internal champion within the second entity advocating for the desired outcome of the first entity 516, and/or (3) determinations of whether the first entity 516 is engaging multiple stakeholders within the second entity.

As a fourth example, artifacts indicating the completion/satisfaction of conditions or steps within a particular sales methodology can be collected. Continuing with the same example, the sales methodology can be a multi-part methodology such as Budget, Authority, Need, Timing (BANT), or Metrics, Economic Buyer, Decision Criteria, Decision Process, Identify Pain, and Champion (MEDDIC).

As a fifth example, velocity indicators associated with the speed at which an interaction is progressing can be collected. Continuing with the same example, these artifacts can include (1) an amount of time an interaction has been ongoing, (2) an indication of whether the interaction is moving faster or slower than is typical for the second entity, (3) historical data on whether the second entity has agreed to transactions having a similar size, type, or industry of relevance to a transaction under discussion between the entities, and/or (4) records of adjustments to or the current proximity of a proposed closing/termination date for an interaction.

As a sixth example, artifacts related to the completion of certain security and verification activities by the second entity can be collected. Continuing with the same example, these artifacts can include (1) approvals by the security team of the second entity, (2) proposals or quotes sent between the entities, (3) a commencement of legal or procurement review, and/or (4) redlines or master service agreements (MSAs) under review by the second entity.

As a seventh example, artifacts associated with negative behaviors of the second entity can be collected. Continuing with the same example, these artifacts can include (1) an indication of repeated rescheduling or no-shows, (2) an indication of procurement or legal delays, (3) negative feedback or pricing pushback from the second entity, and/or (4) instances of the second entity failing to respond to a proposal by the first entity.

In some implementations, the second AI orchestrator 508-2 weights the impact of each artifact on the suggestions/predictions in the global behavioral model 514 according to the strength of the correlation between the type of that artifact and a future behavior of the second entity being forecasted within the global behavioral model. The second AI orchestrator 508-2 can determine these weights based on training of the second AI orchestrator 508-2 using previous interactions involving the second entity that have known outcomes (e.g., deal reached, no deal reached, or negotiation of a deal postponed).

The second AI orchestrator 508-2 can be trained to account for a variety of factors when determining the weight of an artifact. For example, the weight of an artifact can be affected by the stage in an interaction during which the artifact was collected, with later stages of a deal being more heavily weighted than earlier stages. As a specific instance of the same example, a forecasted revenue amount can be predicted based on an artifact indicating an amount the second entity is willing to pay the first entity, with the amount being multiplied by a smaller fraction the earlier on in the interaction this artifact is obtained.

As a second example, the weight of an artifact can be affected by timing characteristics of the stage during which the artifact was collected. Continuing with the same example, timing characteristics can include time spent within the stage as compared to an average time spent in the stage by the second entity, and/or a longer time being spent within the stage than within other stages of the interaction.

As a third example, the weight of an artifact can be affected by a manual confidence rating provided by the first entity 516. Continuing with the same example, the confidence rating can be an optimistic rating that causes artifacts having a positive sentiment to be weighted more heavily, a pessimistic rating that causes artifacts having a positive sentiment to be weighted less heavily, a rating indicating the interaction will involve a high level effort, which increases the weight of artifacts suggesting further engagement with the second entity, and/or a "too early to tell" rating, which does not adjust the weights of various artifacts.

As a fourth example, the weight of an artifact can be affected based on an amount of interaction between the first entity 516 and the second entity at the time the artifact was collected. Continuing with the same example, frequent/recent interaction preceding the collection time can cause the artifact to be weighted more heavily, while infrequent/absent interaction preceding the collection time can cause the artifact to be weighted less heavily.

As a fifth example, the weight of an artifact can be affected based on historical accuracy of the source of the artifact (e.g., the entity providing/generating the artifact). Continuing with the same example, the weight of an artifact provided by an individual can be set proportionally to that individual's historical accuracy in predicting interaction outcomes (e.g., artifacts provided by a person who is 80% accurate are weighted by 0.8). Additionally or alternatively, positive artifacts generated by a consistently overly optimistic individual can be weighted less heavily than positive artifacts generated by a typically pessimistic individual, as the latter artifacts are less likely to be inflated.

As a sixth example, the weight of an artifact can be affected based on fluctuations in a projected value of the interaction that generated the artifact. Continuing with the same example, frequent fluctuations can indicate uncertainty and therefore cause an artifact to be weighted less heavily than artifacts from interactions with infrequent fluctuations in projected value.

Example User Interface

Figure 6:
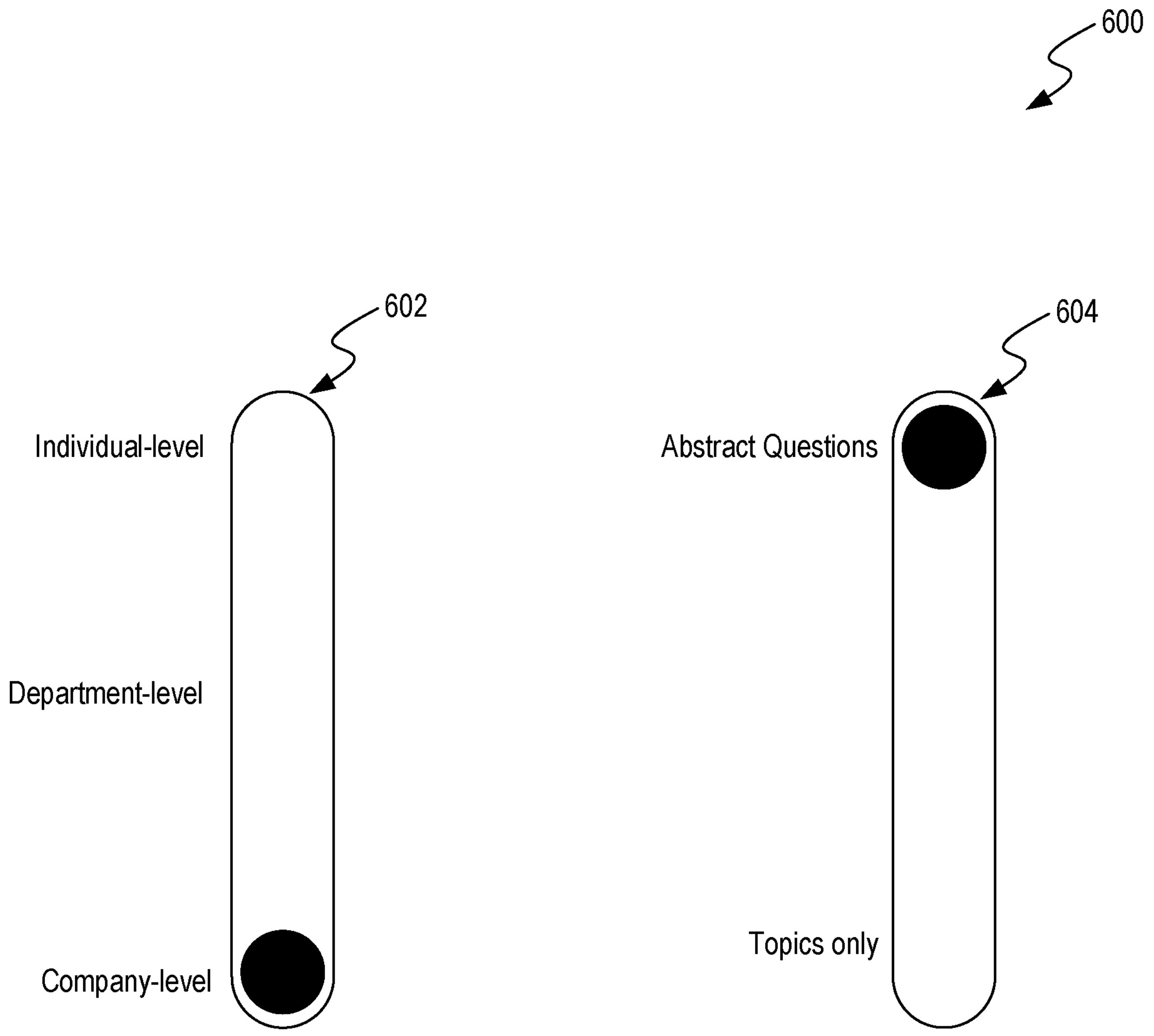
FIG. 6 illustrates a data sharing selection graphical user interface (GUI) for controlling behavioral data sharing levels of a behavioral modeling platform, in accordance with some implementations of the present technology.

FIG. 6 illustrates a data sharing selection GUI 600 for controlling behavioral data sharing levels of a behavioral modeling platform (e.g., the behavioral modeling platform 500 described in relation to FIG. 5 above), in accordance with some implementations of the present technology. The data sharing selection GUI 600 can allow an entity to customize the level of behavioral data sharing applicable to that entity within the behavioral modeling platform 500 described in relation to FIG. 5 above. As shown, the data sharing selection GUI 600 includes a level slider 602 and a question slider 604, which are visual controls allowing an entity to adjust a desired level of behavioral data sharing.

The level slider 602 can provide options for selecting different degrees of specificity/granularity for data collected about the entity. The level slider 602 can include settings for company-level, department-level, and individual-level sharing, as described in relation to FIG. 5 above. In some implementations, when a more specific level of data sharing is selected, more general data can also be shared. For example, when an entity selects individual-level on the level slider 602, data about departments within the entity and the entity as a whole can also be stored, as this data belongs to the more general department-level and company-level categories.

The question slider 604 can include settings for controlling the types of queries that can be made about the entity. For example, as depicted in FIG. 6, the question slider 604 provides the options "Abstract Questions" and "Topics only." Continuing with the same example, when "Abstract Questions" is selected, any generic question can be asked (e.g., provided by a first entity 516 as a query) and the behavioral modeling platform 500 will attempt to generate an associated global behavioral model. However, when "Topics only" is selected, other entities can only receive information about the entity associated with some or all of a list of topics discussed. Again continuing with the same example, the list of topics can include a topic discussed in a meeting without further clarification and/or other commonly queried performance topics such as number of sales, revenue generated, number of deals closed, and the like.

The settings of both the level slider 602 and the question slider 604 can be combined to determine the overall level of behavioral data sharing. For example, when "Department-level" and "Topics only" are selected, then department-specific data will be collected but only data associated with certain topics extracted from a meeting as applied to those departments will be shared (e.g., the number of sales or amount of revenue generated, broken down by department within the entity, will be available, but not every abstract question about the departments within the entity will be answered). The data sharing selection GUI 600 can integrate with components of the behavioral modeling platform 500 described in relation to FIG. 5 above to enforce the selected sharing preferences. For example, the selected sharing levels may be applied to data collected from meetings, presentations, and communications before the data is processed by the first AI orchestrator 508-1 and stored in the global data lake 512, reducing the amount of data stored by the first AI orchestrator 508-1 as unstructured data 510 in the global data lake 512 and thereby conserving computational resources from being spent on excess data retention.

Example Data Models

Figure 7:
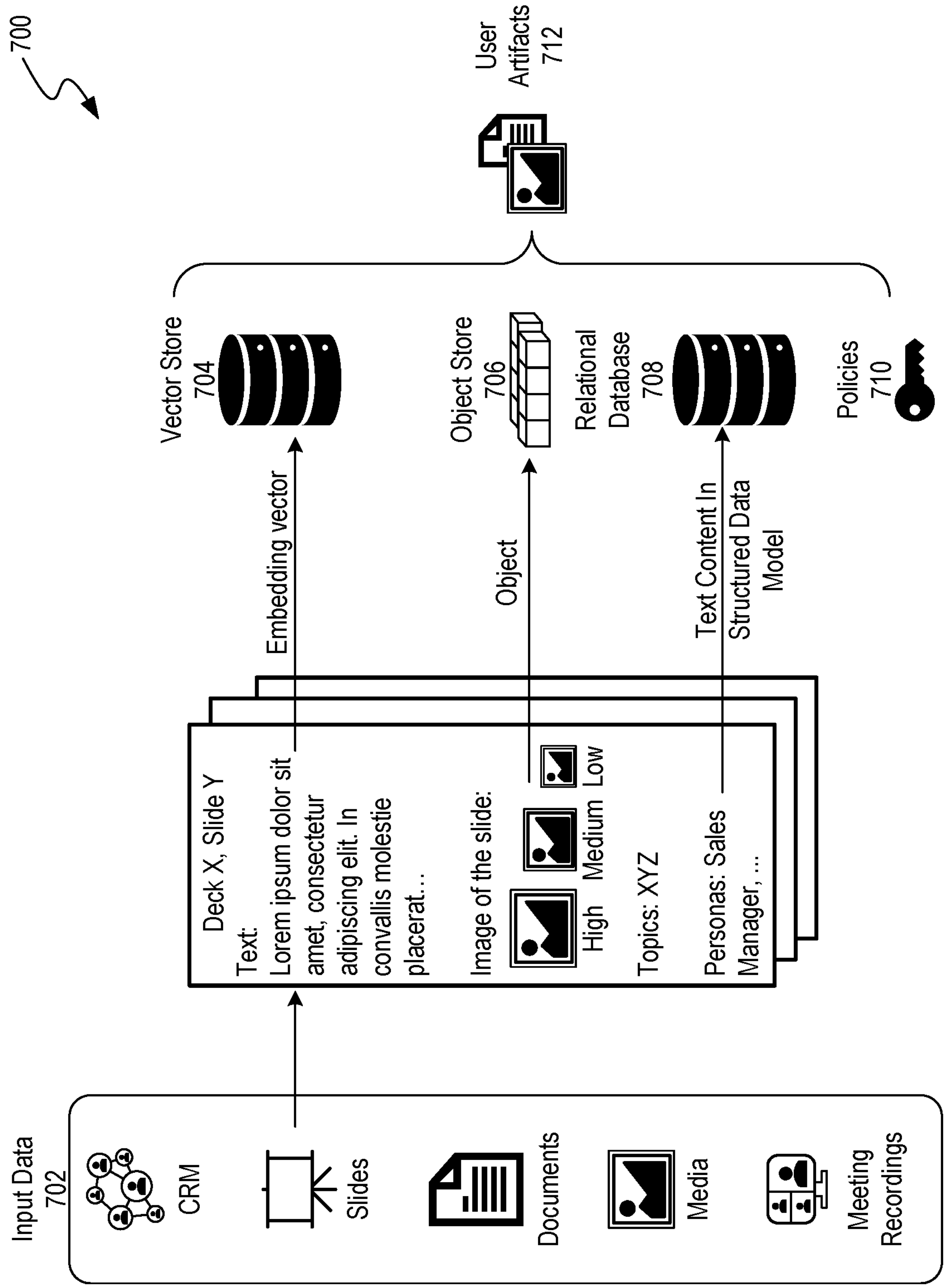
FIG. 7 is an example data model for the storage of user artifacts, in accordance with some implementations of the present technology.

FIG. 7 is an example data model 700 for the storage of user artifacts 712, in accordance with some implementations of the present technology. The data model 700 includes input data 702, a vector store 704, an object store 706, a relational database 708, policies 710, and user artifacts 712. The data model 700 can be implemented using components of the example computer system illustrated and described in more detail with reference to FIG. 20. Likewise, implementations of the data model 700 can include different and/or additional components or can be connected in different ways.

In some implementations, a meeting enhancement server receives input data 702 from a user (e.g., an organization or individual with access to the meeting enhancement server) via a meeting overlay application accessed by the user during a meeting and/or via direct input of the input data 702 into the meeting enhancement server via a UI of the meeting enhancement server. For example, the input data 702 can include artifacts such as customer relationship management (CRM) data, slides, documents, media, and/or meeting recordings. Additionally or alternatively, the input data can be provided by a user before a meeting and be processed/prepared by the meeting enhancement server prior to the user participating in a meeting. The meeting enhancement server and the meeting overlay application can be the same as or generally similar to, respectively, the meeting enhancement server **102*a* and the meeting overlay application 106*a* described in relation to FIG. 1**A above.

In such implementations, the meeting enhancement server compiles the input data 702 into one or more sets of presentation artifacts that are stored in an artifact database (e.g., the artifact database **110*a*** described in relation to FIG.

1A above) for later presentation by the user. For example, the meeting enhancement server can process the input data 702 using one or more AI agents to determine the semantic meaning of and/or the context for content included in each artifact of the input data 702. Continuing with the same example, the meeting enhancement server can then, based on the processing, compile artifacts with similar and/or related content into the same set of presentation artifacts. In some implementations, one or more created sets of presentation artifacts are slide decks including one or more slides with text and/or images, which are presented by a user to discuss a particular topic during a meeting.

In some implementations, a set of presentation artifacts are assigned a topic (e.g., a subject of the content within the set) and/or a persona (e.g., a role within the user's organization associated with the content of the set) and are categorized within an artifact database according to that topic or role. For example, users and/or the one or more AI agents can access the artifact database to retrieve an artifact associated with a particular topic or role. The users and/or the one or more AI agents can search the artifact database using that topic or role and receive results including the set of presentation artifacts assigned the searched-for topic or role.

In some implementations, an embedding vector (e.g., a numerical vector embedding representing the semantic meaning of a set of presentation artifacts) is stored in a vector store 704 for one or more sets of presentation artifacts. For example, the embedding vector can be an embedding generated by an AI model invoked by the one or more AI agents to represent the set and/or can be compared by an AI model invoked by the one or more AI agents to another embedding vector (e.g., generated based on input data from a meeting and/or a search query) to extract the set of presentation artifacts when the set is relevant to an ongoing meeting. In such implementations, the vector store 704 can be included in the artifact database.

In these and other implementations, individual artifacts included in a set of presentation artifacts are stored as objects (e.g., metadata and/or a unique identifier is associated with each artifact) in an object store 706, which is also included in the artifact database. The object store 706 is a combination of hardware and/or software storing data in an object-based architecture. Thus, individual artifacts are accessed from the object store 706 individually despite belonging to the same set of presentation artifacts, allowing the meeting enhancement server 102*a* to use/search for the artifacts independently of one another without repeatedly expending computational resources to separate artifacts from a set of presentation artifacts to which the artifacts belong.

In these and other implementations, text content included in a set of presentation artifacts is stored in a structured data model within a relational database 708, which is also included in the artifact database. The relational database 708 is a database storing the text content in a tabular format, enabling efficient comparison of the text content to other artifacts stored in a tabular format. The data stored in the vector store 704, object store 706, and relational database 708 are all included in a set of user artifacts 712 associated with the user from which the input data 702 is received.

In some implementations, policies 710 are associated with one or more of the user artifacts 712 to determine an authorized set of users who can access the user artifacts 712. For example, the policies 710 can allow the meeting enhancement server 102*a* to retrieve user artifacts from the artifact database on behalf of the user and/or other users specified by the policies 710 but not on behalf of other users.

Figure 8:
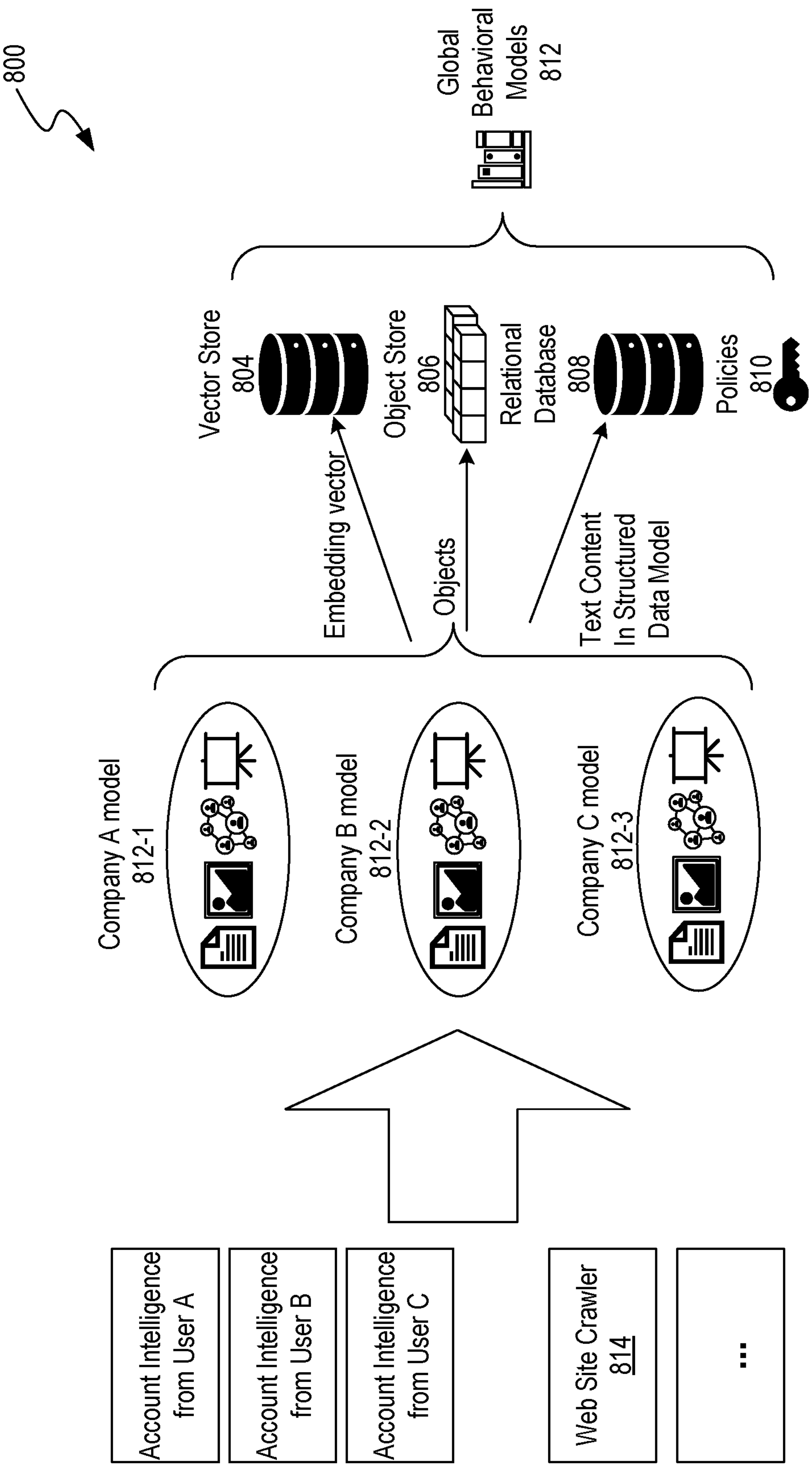
FIG. 8 is a second example data model for the creation of global behavioral models, in accordance with some implementations of the present technology.

FIG. 8 is a second example data model 800 for the creation of global behavioral models 812, in accordance with some implementations of the present technology. The data model 800 includes a vector store 804, an object store 806, a relational database 808, policies 810, global behavioral models 812, and a web site crawler 814. The vector store 804, the object store 806, the relational database 808, and the policies 810 can be the same as or generally similar to, respectively, the vector store 704, the object store 706, the relational database 708, and the policies 710 described in relation to FIG. 7 above. The data model 800 can be implemented using components of the example computer system illustrated and described in more detail with reference to FIG. 20. Likewise, implementations of the data model 800 can include different and/or additional components or can be connected in different ways.

A global behavioral model is a compilation of artifacts indicating the behavioral patterns of a particular entity (e.g., an individual or organization) that is compiled from multiple sources of artifacts available to the meeting enhancement server 102*a*. For example, as depicted in FIG. 8, three global behavioral models 812-1, 812-2, 812-3 for three different organizations (Company A, Company B, and Company C, respectively) can be compiled by the meeting enhancement server 102*a* based on user artifacts from one or more users of the meeting enhancement server 102*a* and/or public sources of data associated with the organizations. Continuing with the same example, the three global behavioral models 812-1, 812-2, 812-3 can be based on artifact intelligence from (e.g., a subset of the user artifacts generated by/belonging to) one or more users and/or artifacts extracted from public sources of data by a web site crawler 814 or other software for collecting data. Again continuing with the same example, the subset of user artifacts included in the artifact intelligence can be selected by searching all the artifacts associated with a user for particular artifacts associated with an entity and selecting only those artifacts to include in the artifact intelligence. The artifact intelligence can provide insight into news regarding an entity and/or the outcome of previous meetings with that entity, enabling future meeting participants meeting with that entity to tailor an approach to that meeting accordingly.

In some implementations, the web site crawler 814 is an automated script or program (e.g., a G2 Crawler) for browsing public sources of information (e.g., the internet) and extracting relevant content from those sources. For example, as depicted in FIG. 8, the web site crawler 814 can browse the internet or other source of information for artifacts related to Company A, Company B, and Company C and store the retrieved artifacts in the global behavioral model 812-1, 812-2, 812-3 corresponding to the relevant company.

As described in relation to the sets of presentation artifacts of FIG. 7, embedding vectors, objects, and/or text content in a structured data model can be generated based on the artifacts in each global behavioral model 812-1, 812-2, 812-3 and stored in a vector store 804, object store 806, and relational database 808, respectively. The vector store 804, object store 806, and relational database 808 can likewise be included in an artifact database (e.g., the artifact database 110*a* described in relation to FIG. 1A above) and policies 810 can determine the users on behalf of which a meeting enhancement server (e.g., the meeting enhancement server 102*a* described in relation to FIG. 1A above) can access the data stored therein.

Example Meeting Enhancement Method Flowcharts

Figure 9:
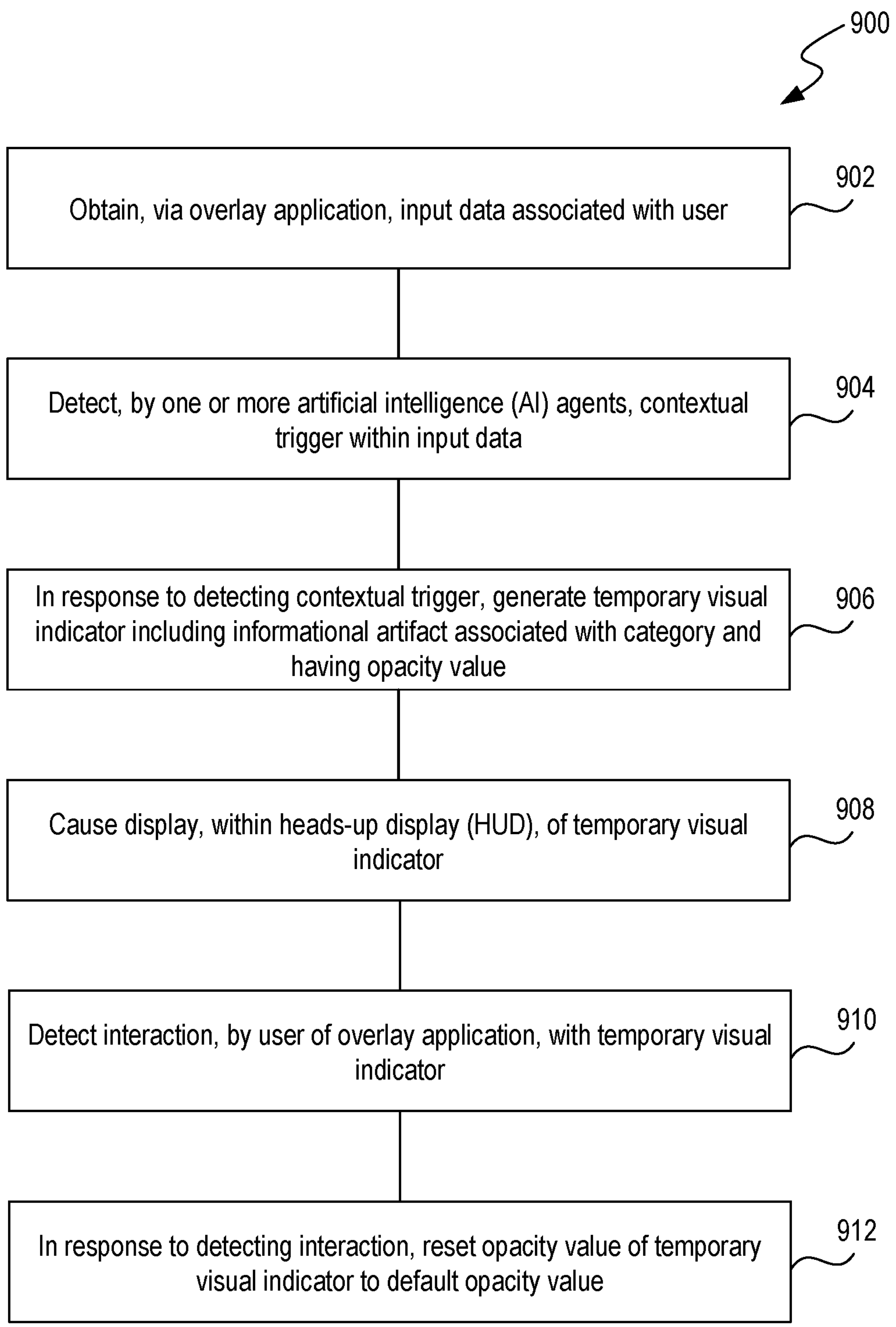
FIG. 9 is a flowchart depicting an example method of dynamically generating and displaying visual indicators within a heads-up display (HUD) of an overlay application, in accordance with some implementations of the present technology.

FIG. 9 is a flowchart depicting an example method 900 of dynamically generating and displaying visual indicators within a heads-up display of an overlay application, in accordance with some implementations of the present technology. In some implementations, the method 900 is performed by components of the example computer system illustrated and described in more detail in relation to FIG. 20 below, the meeting enhancement server 102*a* illustrated and described in more detail in relation to FIG. 1A above, and/or the meeting enhancement server 102*b* illustrated and described in more detail in relation to FIG. 1B above. Likewise, implementations can include different and/or additional operations or can perform the operations in different orders.

In operation 902, input data associated with a user is obtained via an overlay application. For example, the input data can be audio, closed captions, video, screen captures, and/or other artifacts generated during a meeting or other session in which the user participates. In some implementations, the overlay application is the same as or generally similar to the meeting overlay application 106*a* as described in relation to FIG. 1A above. The user can be the same as or generally similar to the user 136*b* described in relation to FIG. 1B above.

In operation 904, a contextual trigger within the input data is detected by one or more AI agents. The contextual trigger can be associated with a category of informational artifact. In some implementations, the one or more AI agents are the same as or generally similar to the one or more AI agents 108*b* described in relation to FIG. 1B above. The contextual trigger can be any signal within the input data that indicates specific information is relevant to display within the overlay application, such as a mention of a competitor by a meeting participant, a question or objection directed to a proposal presented during the meeting, and/or a request for a particular action to be taken. For example, the contextual trigger can be the same as or generally similar to the contextual trigger 132*b* described in relation to FIG. 1B above. In some implementations, the contextual trigger is at least one of a mention of a particular entity, a budgetary constraint, a timing objection, or an approval constraint, and the informational artifact is at least one of a distinguishing feature between the user and the particular entity, a value reframing, a momentum reframing, or an approval obtainment artifact.

In operation 906, in response to detecting the contextual trigger, a temporary visual indicator including an informational artifact associated with the category and having an opacity value is generated. The informational artifact can include information contextually relevant to a topic or issue raised by the contextual trigger that can be displayed to the user via the overlay application. The opacity value can be a measure of the visual opacity of the temporary visual indicator when the temporary visual indicator is displayed to the user. The temporary visual indicator can be the same as or generally similar to the temporary visual indicator 134*b* described in relation to FIG. 1B above. In some implementations, an urgency level of the informational artifact is determined based on the category, and an urgency indicator that visually represents the urgency level using at least one of a color or a pulsing effect is added to the temporary visual indicator. In these and other implementations, the temporary visual indicator is generated by obtaining unstructured data associated with the user from a global data lake, providing, as input, the unstructured data to the one or more AI agents, which generate, as output, a global behavioral model associated with the user, generating the informational artifact based on the global behavioral model, and inserting the informational artifact into the temporary visual indicator. For example, the global data lake and global behavioral model can be the same as or generally similar to, respectively, the global data lake 512 and global behavioral model 514 as described in relation to FIG. 5 above.

In operation 908, display of the temporary visual indicator is caused within a heads-up display (HUD). The HUD can be the same as or generally similar to the HUD 109*a* as described in relation to FIG. 1A above. In some implementations, the opacity value of the temporary visual indicator gradually decreases over a predetermined time interval. The gradual decrease in opacity enables the temporary visual indicator to direct attention of the user to the informational artifact by presenting the informational artifact prominently when first displayed, while still fading the informational artifact out of view over time such that the HUD does not become cluttered with persistent visual indicators that are no longer relevant. In some implementations, causing display, within the HUD, of the temporary visual indicator further includes determining, by the one or more AI agents, a specified location within the HUD and causing display of the temporary visual indicator at the specified location. The specified location can be based on either (i) a screen capture associated with the user or (ii) a predetermined screen location.

In operation 910, an interaction by a user of the overlay application with the temporary visual indicator is detected. The interaction can include hovering over the temporary visual indicator, clicking on the temporary visual indicator, and/or performing another gesture indicating interest, by the user, in the informational artifact.

In operation 912, in response to detecting the interaction, the opacity value of the temporary visual indicator is reset to a default opacity value. This reset mechanism allows the user to indicate that the information remains relevant to the user and should continue to be displayed visibly within the HUD. In some implementations, after the opacity value of the temporary visual indicator is reset, the temporary visual indicator is persisted within the HUD until a removal signal is received. The removal signal can be at least one of (i) a selection, from the user, to remove the temporary visual indicator or (ii) a detection, by the one or more AI agents, of a second contextual trigger within the input data, where the second contextual trigger indicates the informational artifact has a decreased relevance to a meeting including the user.

In some implementations, the input data is provided, as input, to the one or more AI agents, which generate, as output, a set of default visual indicators. Each default visual indicator in the set of default visual indicators can include a dynamic representation of a property of audio content included in the input data. Display of the set of default visual indicators can be caused within the HUD for a duration of a session of the overlay application.

Figure 10:
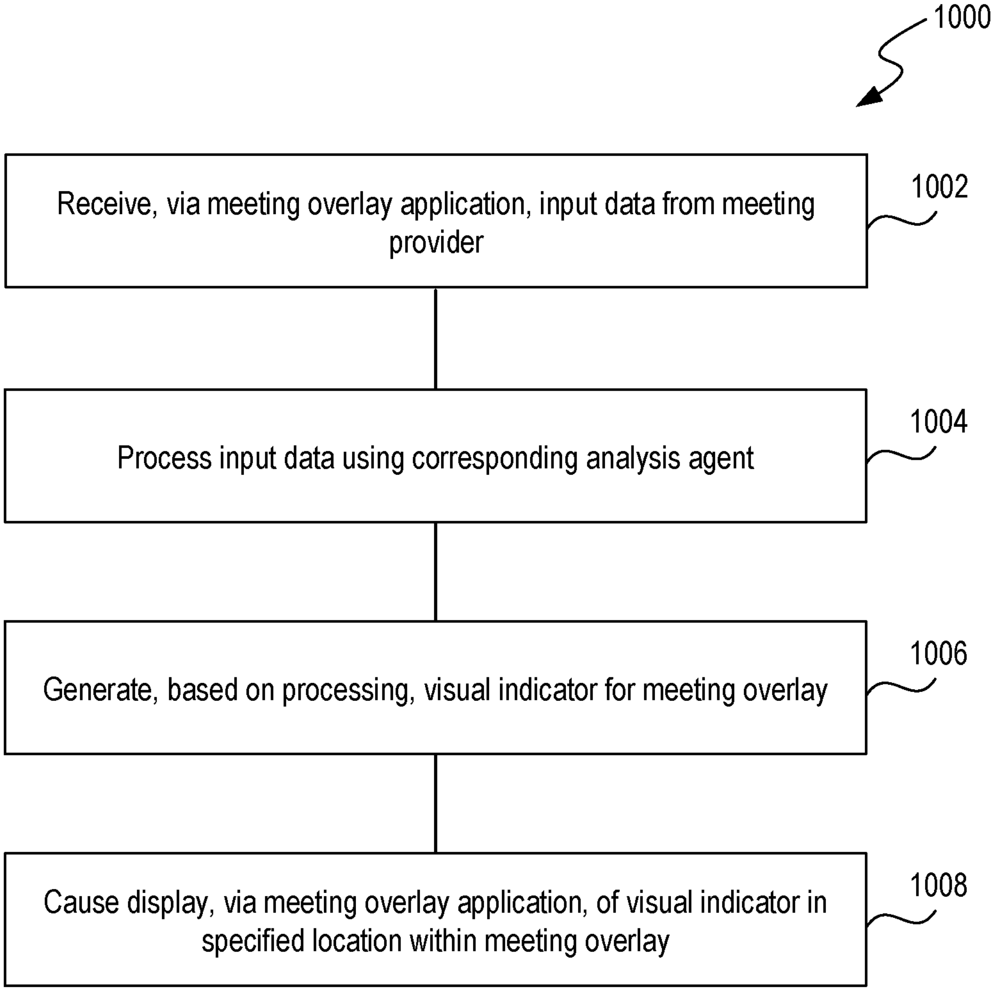
FIG. 10 is a flowchart depicting an example method of displaying a visual indicator in a meeting overlay UI, in accordance with some implementations of the present technology.

FIG. 10 is a flowchart depicting an example method 1000 of displaying a visual indicator in a meeting overlay UI, in accordance with some implementations of the present technology. In some implementations, the method 1000 is performed by components of the example computer system illustrated and described in more detail in relation to FIG. 20 below, the meeting enhancement server 102*a* illustrated and described in more detail in relation to FIG. 1A above, and/or the meeting enhancement server 102*b* illustrated and described in more detail in relation to FIG. 1B above. Likewise, implementations can include different and/or additional operations or can perform the operations in different orders.

In operation 1002, input data from a meeting provider is received via a meeting overlay application. For example, the input data can be audio, closed captions, video, screen captures, and/or other artifacts generated during a meeting hosted by the meeting provider. In some implementations, the meeting provider and meeting overlay application are the same as or generally similar to, respectively, the meeting provider 104*a* and the meeting overlay application 106*a* as described in relation to FIG. 1A above.

In operation 1004, the input data is processed using a corresponding analysis agent. In some implementations, the corresponding analysis agent is the same as or generally similar to one of the analysis agents 108*a* as described in relation to FIG. 1A above that processes the type of data corresponding to the input data. For example, in implementations where the input data is video data, the corresponding analysis agent can be a video analysis agent 108*a*-3, in implementations where the input data is audio, the corresponding analysis agent can be an audio analysis agent 108*a*-2, and so on. However, the present invention is not limited to the analysis agents 108*a* described in relation to FIG. 1A; the corresponding analysis agent can instead be a different analysis agent configured to process another type of data corresponding to the input data.

In operation 1006, a visual indicator for a meeting overlay is generated based on the processing of the corresponding analysis agent. In some implementations, the meeting overlay is the same as or generally similar to any of the meeting overlays/HUDs described in relation to FIGS. 2-4B or to another meeting overlay (e.g., generated by a meeting overlay application). Likewise, in these and other implementations, the visual indicator is the same as or generally similar to any one of the visual indicators described in relation to FIGS. 1A-4B above or to another visual element of the meeting overlay conveying information.

In operation 1008, a display of the visual indicator is caused, via a meeting overlay application, in a specified location within the meeting overlay. For example, the meeting overlay application can be the same as or generally similar to the meeting overlay application 106*a* as described in relation to FIG. 1A above and can receive the visual indicator from a meeting enhancement server. In some implementations, the specified location is determined in advance (e.g., by a provider of the meeting overlay application) or is specified by the meeting enhancement server that generated the visual indicator based on processing of a screen capture from a meeting participant (e.g., by a screen topology analysis agent 108*a*-1, as described in relation to FIG. 1A above).

Figure 11:
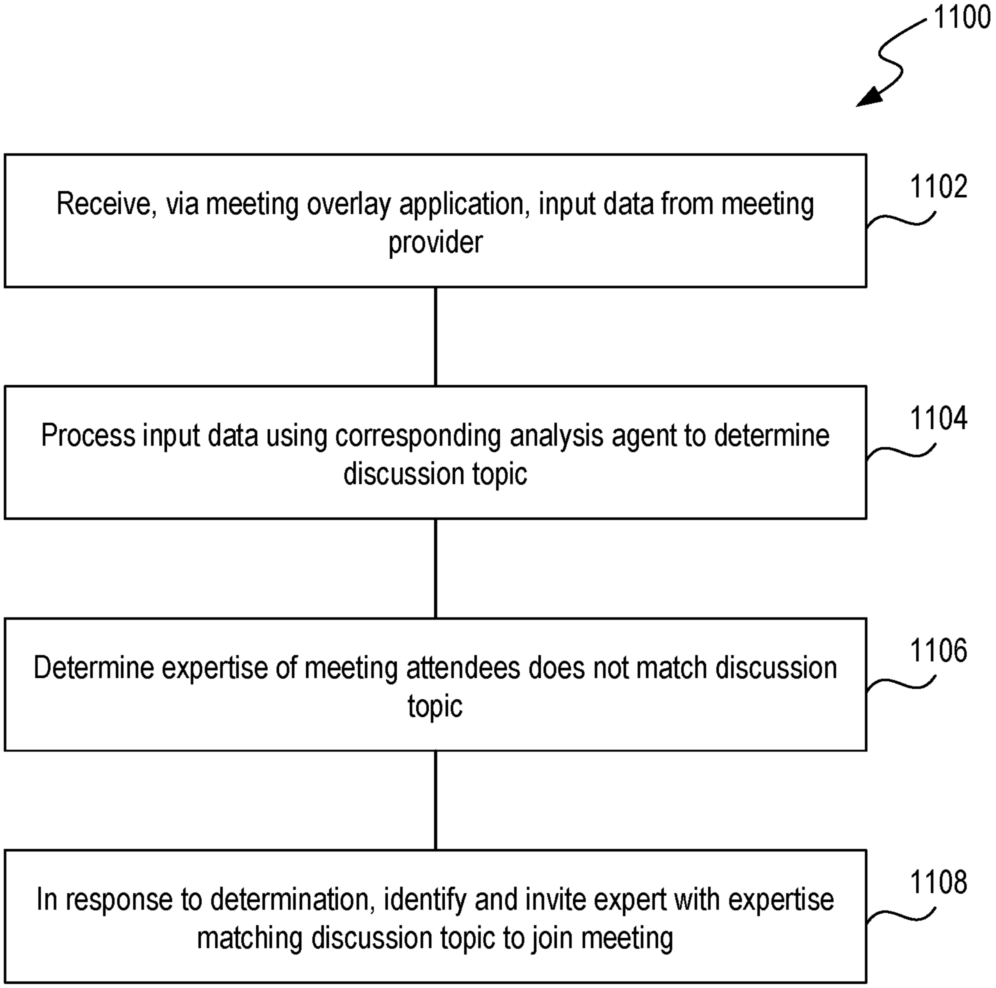
FIG. 11 is a flowchart depicting an example method of inviting an expert to a meeting, in accordance with some implementations of the present technology.

FIG. 11 is a flowchart depicting an example method 1100 of inviting an expert to a meeting, in accordance with some implementations of the present technology. In some implementations, the method 1100 is performed by components of the example computer system illustrated and described in more detail in relation to FIG. 20 below, the meeting enhancement server 102*a* illustrated and described in more detail in relation to FIG. 1A above, and/or the meeting enhancement server 102*b* illustrated and described in more detail in relation to FIG. 1B above. Likewise, implementations can include different and/or additional operations or can perform the operations in different orders.

In operation 1102, input data from a meeting provider is received via a meeting overlay application. For example, the input data can be audio, closed captions, video, screen captures, and/or other artifacts generated during a meeting hosted by the meeting provider. In some implementations, the meeting provider and meeting overlay application are the same as or generally similar to, respectively, the meeting provider 104*a* and the meeting overlay application 106*a* as described in relation to FIG. 1A above.

In operation 1104, the input data is processed using a corresponding analysis agent to determine a discussion topic. The discussion topic can be a particular subject matter or area of expertise discussed (e.g., via a question, comment, or other communicative expression of a meeting attendee) within the meeting from which the input data is received. In some implementations, the corresponding analysis agent is the same as or generally similar to one of the analysis agents 108*a* as described in relation to FIG. 1A above that processes the type of data corresponding to the input data. For example, in implementations where the input data is video data, the corresponding analysis agent can be a video analysis agent 108*a*-3, in implementations where the input data is audio, the corresponding analysis agent can be an audio analysis agent 108*a*-2, and so on. However, the present invention is not limited to the analysis agents 108*a* described in relation to FIG. 1A; the corresponding analysis agent can instead be a different analysis agent configured to process another type of data corresponding to the input data.

In operation 1106, a determination is made that the expertise of meeting attendees does not match the discussion topic. For example, the determination can be made using one or more AI agents and/or another component of a meeting enhancement server. In operation 1108, in response to this determination, an expert with expertise matching the discussion topic is invited to join the meeting. For example, the expert can be a human or AI agent expert (e.g., as generated by the in-meeting bot service 122*a* described in relation to FIG. 1A above) determined to have expertise matching the discussion topic in the same or a generally similar manner as the manner described in relation to FIG. 1A above. In some implementations, the expert is invited by automatically adding the expert to the meeting via the meeting provider or contacting the expert via the meeting provider or another messaging tool (e.g., SMS, iMessage, Slack®), enabling the expert to accept or decline the invitation to the meeting.

Figure 12:
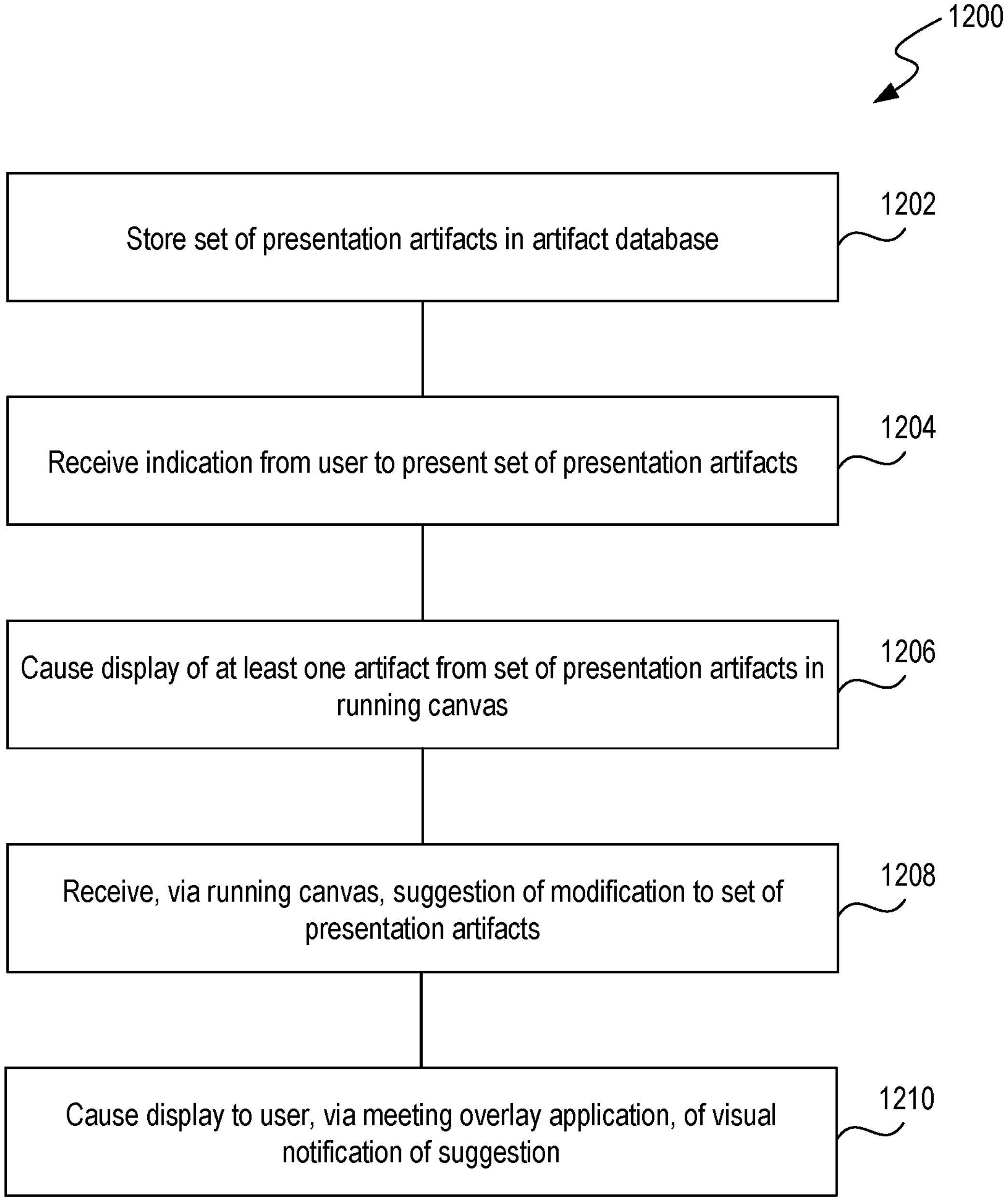
FIG. 12 is a flowchart depicting an example method of causing display of a visual notification of a suggested change in a set of presentation artifacts, in accordance with some implementations of the present technology.

FIG. 12 is a flowchart depicting an example method 1200 of causing display of a visual notification of a suggested change in a set of presentation artifacts, in accordance with some implementations of the present technology. In some implementations, the method 1200 is performed by components of the example computer system illustrated and described in more detail in relation to FIG. 20 below, the meeting enhancement server 102*a* illustrated and described in more detail in relation to FIG. 1A above, and/or the meeting enhancement server 102*b* illustrated and described in more detail in relation to FIG. 1B above. Likewise, implementations can include different and/or additional operations or can perform the operations in different orders.

In operation 1202, a set of presentation artifacts is stored in an artifact database. In some implementations, the set of presentation artifacts and the artifact database are the same as or generally similar to, respectively, the set of presentation artifacts and the artifact database 110*a* described in relation to FIG. 1A.

In operation 1204, an indication from a user to present the set of presentation artifacts is received. For example, the user can be a participant in a meeting hosted by a meeting provider 104*a* as described in relation to FIG. 1A above and can present one or more artifacts from the set of presentation artifacts to other meeting participants (e.g., by selecting a "share screen" or "share window" feature within a meeting provider application). In some implementations, the indication is received from the user via a running canvas 112*a* as described in relation to FIG. 1A above and/or via a UI of a meeting enhancement server.

In operation 1206, the display of at least one artifact from the set of presentation artifacts is caused in a running canvas. In some implementations, the running canvas is the same as or generally similar to the running canvas 112*a* described in relation to FIG. 1A above. In such implementations, the display of the at least one artifact is visible to one or more users with access to the running canvas (e.g., obtained via a collaboration link 418*b*, as described in relation to FIG. 4B above).

In operation 1208, a suggestion of a modification to the set of presentation artifacts is received via the running canvas. For example, the suggestion can be provided by a user as described in relation to FIG. 1A above and the suggested modification can be a suggested addition to, subtraction from, rearranging of, or another adjustment to the artifacts in the set of presentation artifacts.

In operation 1210, the display of a visual notification of the suggestion is caused to the user via a meeting overlay application. In some implementations, the meeting overlay application can be the same as or generally similar to a meeting overlay application 106*a* as described in relation to FIG. 1A above. In these and other implementations, the visual notification of the suggestion is the same as or generally similar to the visual notification 408*a* described in relation to FIG. 4A above or is another visual indicator that the user can interact with to accept or decline the suggestion.

Example Voice Agent Integration Environment

Figure 13:
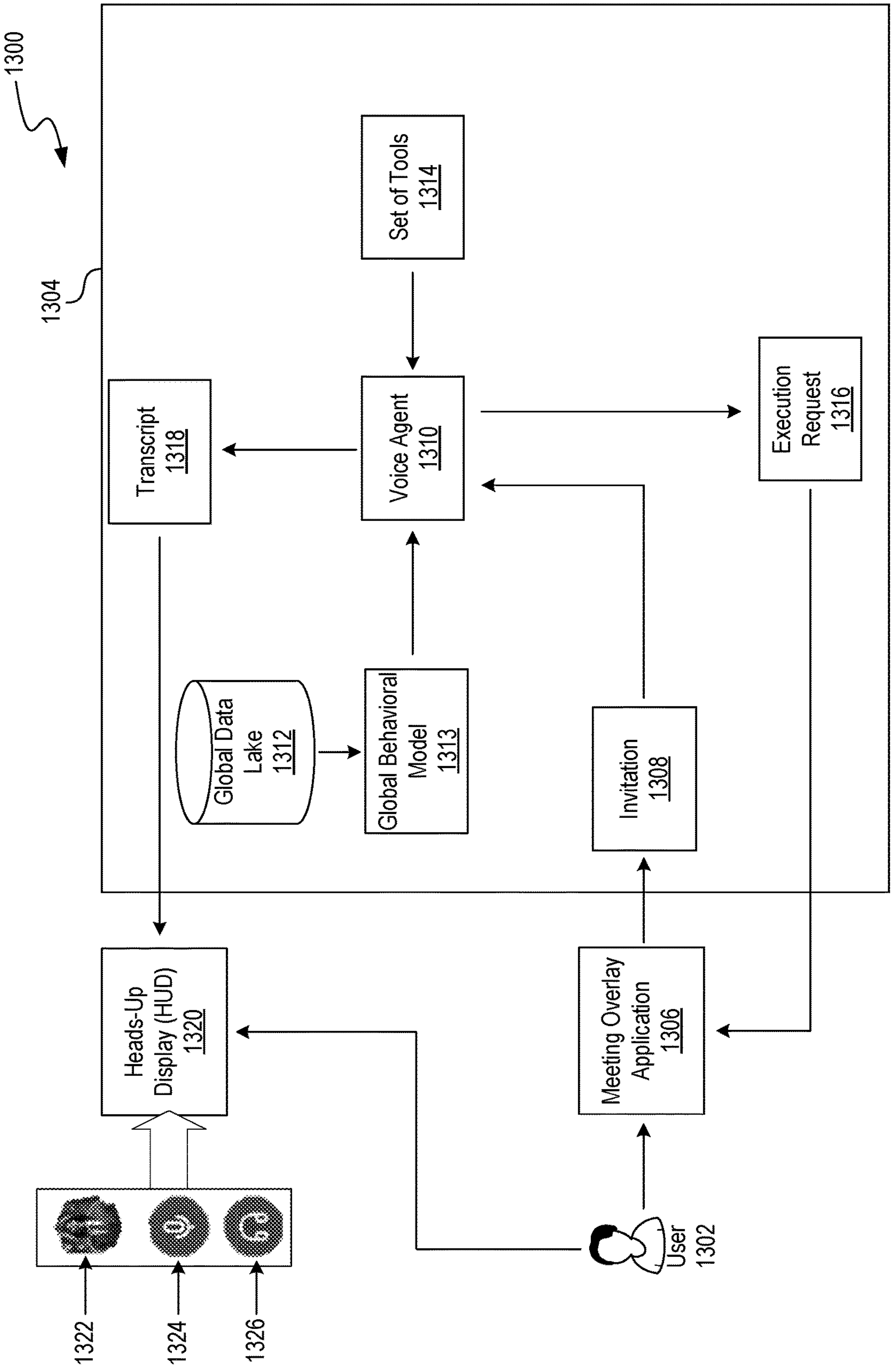
FIG. 13 illustrates a meeting environment for integrating a voice agent into a meeting, in accordance with some implementations of the present technology.

FIG. 13 illustrates a meeting environment 1300 for integrating a voice agent into a meeting, in accordance with some implementations of the present technology. The meeting environment 1300 includes a user 1302, a meeting enhancement server 1304, a meeting overlay application 1306, an invitation 1308, a voice agent 1310, a global data lake 1312, a global behavioral model 1313, a set of tools 1314, an execution request 1316, a transcript 1318, a HUD 1320, an agent icon 1322, a mute toggle 1324, and a deafen toggle 1326. The meeting environment 1300 can be implemented using components of the example computer system illustrated and described in more detail with reference to FIG. 20. Likewise, implementations of the meeting environment 1300 can include different and/or additional components or can be connected in different ways.

The user 1302 is an individual or entity having access to the meeting enhancement server 1304 and/or the meeting overlay application 1306. For example, the user 1302 can be a meeting participant in a virtual meeting hosted by a meeting provider (e.g., the meeting provider 104*a* described in relation to FIG. 1A above). The meeting enhancement server 1304 can be the same as or generally similar to the meeting enhancement server 102*a* as described in relation to FIG. 1A above, except that the meeting enhancement server 1304 specifically facilitates integration of the voice agent 1310 into the meeting. The meeting overlay application 1306 can be the same as or generally similar to the meeting overlay application 106*a* as described in relation to FIG. 1A above.

In some implementations, the meeting enhancement server 1304 obtains, from the user 1302 (e.g., via the meeting overlay application 1306) an invitation 1308. The invitation 1308 can be a signal (e.g., a hyperlink or other digital reference pointer) that, when accepted by the meeting enhancement server 1304 on behalf of a voice agent 1310, prompts the voice agent 1310 to join a meeting associated with the invitation 1308 and/or connect to another source of input data specified by the invitation 1308. The voice agent 1310 can be an AI agent (e.g., the one or more AI agents described in relation to FIG. 1A above) that generates audio simulating a human voice and can additionally be associated with an image or animated video representing an avatar of the voice agent 1310. The meeting enhancement server 1304 can select the invitation 1308 on behalf of the voice agent 1310 by interacting with (e.g., clicking or otherwise selecting) the invitation 1308 using a combination of hardware and/or software hosting the voice agent 1310. In other implementations, the voice agent 1310 is hosted separately from the meeting enhancement server 1304 and the invitation 1308 is sent to a different entity or software component that can accept the invitation 1308 on behalf of the voice agent 1310, including the voice agent 1310 itself.

In some implementations, the invitation 1308 specifies an operation mode for the voice agent 1310 that describes a role the voice agent 1310 is permitted to perform in relation to the meeting and/or other source of input data, thereby restricting outputs of the voice agent 1310 to those that are consistent with that role. For example, the operation mode can be one of three modes: (1) an autonomous mode giving the voice agent 1310 permission to join the meeting and make unsupervised contributions to the meeting, (2) a supervised mode giving the voice agent 1310 permission to join the meeting and make contributions to the meeting after human approval, or (3) a whisper mode giving the voice agent 1310 permission to interact with the user 1302 via the meeting overlay application 1306 without joining the meeting. In the autonomous mode, the voice agent 1310 can participate as a visible and/or audible meeting participant, responding to questions using simulated audio generated by the voice agent 1310 and/or presenting artifacts without requiring approval from the user 1302 for each of these actions. In the supervised mode, the voice agent 1310 can participate as a visible and/or audible meeting participant, but the voice agent 1310 pre-visualizes proposed responses and/or actions to the user 1302 before executing them, requiring explicit approval from the user 1302 before the voice agent 1310 directly interacts with the meeting. In the whisper mode, the voice agent 1310 does not join the meeting as a participant and is not visible or audible to other meeting participants besides the user 1302; instead, the voice agent 1310 provides guidance, recommendations, and/or other artifacts exclusively to the user 1302 via the meeting overlay application 1306 (e.g., via a HUD 1320, which can be the same as or generally similar to the HUD 109*a* described in relation to FIG. 1A above).

In some implementations, the meeting enhancement server 1304 activates the voice agent 1310 in accordance with the specified operation mode, meaning that the voice agent 1310 begins receiving and processing input data to generate outputs that are consistent with the role assigned to the voice agent 1310 by the invitation 1308. In other implementations, the invitation 1308 does not specify an operation mode but the meeting enhancement server 1304 nevertheless activates the voice agent 1310 in accordance with one of the three example operation modes described above. In such embodiments, the operation mode can be predetermined by the meeting enhancement server 1304 (e.g., by a global setting, based on a meeting provider associated with the invitation, and/or based on a preference of the user 1302) or determined upon receipt of the invitation 1308 by one or more other AI agents included in the meeting enhancement server 1304 (e.g., based on input data being received from the meeting associated with the invitation 1308).

As depicted in FIG. 13, the meeting enhancement server 1304 includes a global data lake 1312. The global data lake 1312 can be the same as or generally similar to the global data lake 512 as described in relation to FIG. 5 above. The global data lake 1312 stores unstructured data associated with meeting participants such as the user 1302, including behavioral data extracted from meetings, presentations, and/or communications. In some implementations, the meeting enhancement server 1304 obtains unstructured data associated with a meeting participant from the global data lake 1312. The meeting enhancement server 1304 can also provide, as input, the unstructured data to one or more AI agents, which generate, as output, a global behavioral model 1313 associated with the meeting participant. For example, the one or more AI agents can be the same as or generally similar to the one or more AI agents described in relation to FIG. 1A above and the global behavioral model 1313 can be the same as or generally similar to the global behavioral model 514 as described in relation to FIG. 5 above. In some implementations, the global behavioral model 1313 is provided to the voice agent 1310 as context for processing audio streams produced by the meeting participant during the meeting. Context is data accessible by the voice agent 1310 that provides background information to the voice agent 1310 while the voice agent 1310 is generating an output, thereby enabling the output to incorporate/reflect the context and be more specific and/or targeted to a particular input. Although it is common for AI agents such as voice agents to be provided with context, the present technology improves upon existing contextualization methods by specifically providing a global behavioral model 1313 that reflects various sources of unstructured data stored in the global data lake 1312. This source of context can be richer and/or more tailored to an individual meeting participant than other context sources that include less historical information and/or that are not focused on an individual, thereby enabling more specific/targeted responses of the voice agent 1310 than other solutions.

In some implementations, the meeting enhancement server 1304 provides the voice agent 1310 with access to a set of tools 1314. Each tool in the set of tools 1314 can be a set of computer-implemented instructions that, when executed, performs a function of the meeting overlay application 1306. For example, each tool in the set of tools can execute an application programming interface (API) for modifying a component of the meeting overlay application 1306, such as a running canvas (e.g., the running canvas 112*a* described in relation to FIG. 1A above). For example, the API can be a GET running canvas API that returns the current running canvas including all metadata, the current presentation index, the highest presentation index, and/or a representation of the artifacts that can be used to render each artifact visually, a GET presentation array API that returns a presentation index array associated with the running canvas, an INSERT artifact at index position X API that inserts an artifact into the set of presentation artifacts at the specified index position X, a REMOVE artifact at index position X API that removes an artifact at the specified index position X and fails if the index position is less than or equal to the highest presentation index, a PRESENT artifact at index X API that presents, within a meeting, the artifact at the specified index X, or a MOVE artifact at index position X to index position Y API that swaps the artifact at position X with the artifact at position Y. The set of tools 1314 can also include other tools for generating artifacts, generating and/or displaying visual elements, and/or otherwise modifying a HUD included in the meeting overlay application 1306. Although depicted as a separate component of the meeting environment 1300 in FIG. 13, the HUD 1320 can be included in the meeting overlay application 1306 and, accordingly, be manipulated by execution of the set of tools 1314 in certain implementations.

In some implementations, the voice agent 1310 exclusively manipulates the meeting overlay application 1306 by requesting execution of one or more tools from the set of tools 1314, which can responsively be executed by the meeting enhancement server 1304 and/or the meeting overlay application 1306. This tool-based architecture constrains the voice agent 1310 to interact with the meeting overlay application 1306 through defined interfaces, enabling controlled and predictable behavior of the voice agent 1310 within the meeting environment 1300, reducing errors in comparison to systems in which an AI agent such as the voice agent 1310 must perform interactions without the use of defined interfaces. This constraint additionally improves computational efficiency of the meeting environment 1300 by reducing the number of processes the voice agent 1310 must perform itself to determine which actions to take (e.g., as all possible actions are defined by the limited set of tools 1314) and/or to create changes within the meeting overlay application 1306, as outsourcing processes to the meeting enhancement server 1304 and/or the meeting overlay application 1306, which can execute the processes using deterministic logic that expends fewer computational resources than the probabilistic AI model logic of the voice agent 1310, is less computationally intensive.

In some implementations, in response to receiving an audio stream from the meeting, the voice agent 1310 selects, based on a semantic meaning of the audio stream and the global behavioral model 1313, a particular tool from the set of tools 1314 to execute. For example, the voice agent 1310 can invoke an AI model to determine the semantic meaning of the audio stream and compare the semantic meaning to the global behavioral model 1313 to identify an appropriate response or action. The voice agent 1310 then generates an execution request 1316 for the particular tool which, when executed, realizes the response or action, and transmits the execution request 1316 to the meeting overlay application 1306 and/or the meeting enhancement server 1304. In response to obtaining the execution request 1316, the meeting overlay application 1306 and/or the meeting enhancement server 1304 can execute the particular tool. In some implementations, computational efficiency by the voice agent 1310 is improved by processing the audio stream directly (e.g., using a speech interpretation model), rather than transcoding the audio stream into text that is then interpreted by an AI model, as skipping this transcoding step reduces latency and consumes fewer computational resources than alternatives where audio is transcoded.

In some implementations, the particular tool is a speech approval tool. When the speech approval tool is executed, the meeting enhancement server 1304 generates a transcript 1318 including text representing a proposed audio response, or audio generated by the voice agent 1310 that is intended to address a topic asked about and/or discussed in the audio stream. The transcript 1318 can then be transmitted from the voice agent 1310 to the HUD 1320 for display to the user 1302 and the transcript 1318 can be displayed therein alongside an approval button. Upon interaction, by the user 1302, with the approval button, the meeting enhancement server 1304 determines that the proposed audio response is approved for production within the meeting and directs the voice agent 1310 to produce the proposed audio response within the meeting. The speech approval tool enables the supervised mode of operation, where the user 1302 maintains control over the voice agent's contributions to the meeting.

In some implementations, the particular tool is a visual indicator tool. When the visual indicator tool is executed, the meeting enhancement server 1304 generates an informational artifact based on the global behavioral model 1313 and the semantic meaning of the audio stream. The informational artifact is included in a visual indicator, and the meeting overlay application 1306 causes display, within the HUD 1320 viewable by the user 1302, of the visual indicator. For example, the visual indicator can be the same as or generally similar to the temporary visual indicator **134*b* as described in relation to FIG. 1B above, except that the visual indicator is specifically generated based on analysis by the voice agent 1310 of the audio stream and the global behavioral model 1313**.

In some implementations, the particular tool is a presentation tool. When the presentation tool is executed, the meeting enhancement server 1304 extracts, based on the global behavioral model 1313 and the semantic meaning of the audio stream, a presentation artifact from an artifact database. For example, the artifact database can be the same as or generally similar to the artifact database **110*a* as described in relation to FIG. 1A above. The meeting overlay application 1306 then causes display of the presentation artifact within a running canvas of the meeting overlay application 1306. For example, the running canvas can be the same as or generally similar to the running canvas 112*a* as described in relation to FIG. 1**A above.

In some implementations, the particular tool is a direct guidance tool. When the direct guidance tool is executed, the meeting enhancement server 1304 receives, from the voice agent 1310, a natural language response to the audio stream. The meeting enhancement server 1304 then provides, via the meeting overlay application 1306, the natural language response to the user 1302 (e.g., causes display and/or audible playback of the natural language response). The direct guidance tool enables the whisper mode of operation, where the voice agent 1310 provides audio and/or text guidance exclusively to the user 1302 without other meeting participants hearing the guidance.

The HUD 1320 can be the same as or generally similar to the HUD **109*a* as described in relation to FIG. 1A above, except that the HUD 1320 additionally includes controls for the voice agent 1310. As depicted in FIG. 13, the HUD 1320 includes an agent icon 1322 representing the voice agent 1310 (e.g., distinguishing the voice agent 1310 from other AI agents of the meeting enhancement server 1304, which can invoke different AI models and/or be trained differently), a mute toggle 1324, and a deafen toggle 1326. The agent icon 1322 provides a visual indication to the user 1302 that the voice agent 1310 is active within the meeting environment 1300 and that the voice agent 1310**, rather than another AI agent, can perform actions therein.

In some implementations, the meeting overlay application 1306 causes display, within the HUD 1320 viewable by the user 1302, of the mute toggle 1324 and the deafen toggle 1326. The mute toggle 1324 allows the user 1302 to control, by interacting with the mute toggle 1324, whether the voice agent 1310 produces audio responses within the meeting. For example, in response to receiving, from the user 1302, a selection of the mute toggle 1324, the meeting overlay application 1306 can direct the voice agent 1310 to either produce audio responses within the meeting or refrain from producing audio responses within the meeting, depending on the current state of the mute toggle 1324. The deafen toggle 1326 can allow the user 1302 to control, by interacting with the deafen toggle 1326, whether the voice agent 1310 processes audio streams from the meeting. In response to receiving, from the user 1302, a selection of the deafen toggle 1326, the meeting overlay application 1306 directs the voice agent 1310 to either refrain from processing the audio stream or resume processing the audio stream, depending on the current state of the deafen toggle 1326. The mute toggle 1324 and deafen toggle 1326 provide the user 1302 with control over actions of the voice agent 1310 performed in relation to the meeting, enabling the user 1302 to mitigate risks associated with conversational AI, such as hallucination, context drift, and/or otherwise undesirable actions/responses by the voice agent 1310, by temporarily silencing or deafening the voice agent 1310 as needed.

Example Overlay Application Integration Method Flowcharts

Figure 14:
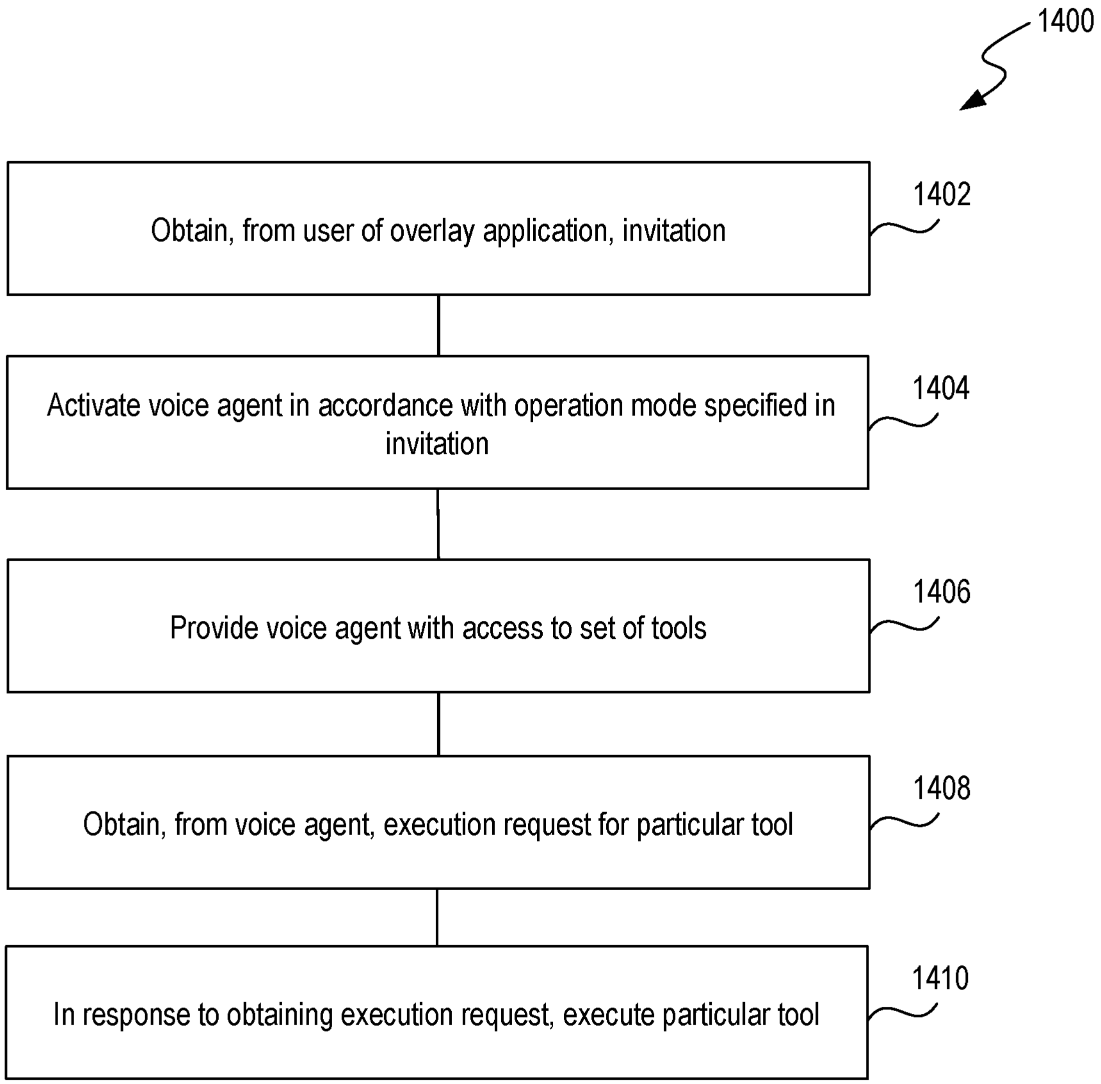
FIG. 14 is a flowchart depicting an example method of integrating a voice agent into a meeting via an overlay application, in accordance with some implementations of the present technology.

FIG. 14 is a flowchart depicting an example method 1400 of integrating a voice agent into a meeting via an overlay application, in accordance with some implementations of the present technology. In some implementations, the method 1400 is performed by components of the example computer system illustrated and described in more detail in relation to FIG. 20 below and/or the meeting environment 1300 illustrated and described in more detail in relation to FIG. 13 above. Likewise, implementations can include different and/or additional operations or can perform the operations in different orders.

In operation 1402, an invitation is obtained from a user of an overlay application. The invitation can specify an operation mode for a voice agent. For example, the overlay application can be the same as or generally similar to the meeting overlay application 1306 as described in relation to FIG. 13 above. The invitation can be the same as or generally similar to the invitation 1308 as described in relation to FIG. 13 above. The voice agent can be the same as or generally similar to the voice agent 1310 as described in relation to FIG. 13 above. In some implementations, the operation mode is either an autonomous mode giving the voice agent permission to join the meeting and make unsupervised contributions to the meeting, a supervised mode giving the voice agent permission to join the meeting and make contributions to the meeting after human approval, or a whisper mode giving the voice agent permission to interact with the user via the overlay application without joining the meeting.

In operation 1404, the voice agent is activated in accordance with the operation mode specified in the invitation. For example, activating the voice agent can cause the voice agent to receive and process input data to generate outputs that are consistent with the role assigned to the voice agent by the invitation.

In operation 1406, the voice agent is provided with access to a set of tools. Each tool in the set of tools can be a set of computer-implemented instructions that, when executed, performs a function of the overlay application. In some implementations, in response to receiving an audio stream associated with the user, the voice agent selects, based on a semantic meaning of the audio stream, a particular tool from the set of tools to execute. For example, the set of tools can be the same as or generally similar to the set of tools 1314 as described in relation to FIG. 13 above. In some implementations, the voice agent exclusively manipulates the overlay application by requesting execution of one or more tools from the set of tools. In these and other implementations, unstructured data associated with a meeting participant included in a meeting is obtained from a global data lake, the unstructured data is provided, as input, to one or more AI agents, which generate, as output, a global behavioral model associated with the meeting participant, and the global behavioral model is provided to the voice agent as context for the audio stream. For example, the global data lake can be the same as or generally similar to the global data lake 1312 as described in relation to FIG. 13 above, and the global behavioral model can be the same as or generally similar to the global behavioral model 1313 as described in relation to FIG. 13 above.

In operation 1408, an execution request for the particular tool is obtained from the voice agent. For example, the execution request can be the same as or generally similar to the execution request 1316 as described in relation to FIG. 13 above.

In operation 1410, in response to obtaining the execution request, the particular tool is executed. In some implementations, the particular tool is a speech approval tool, and executing the particular tool includes (1) generating a transcript including text representing a proposed audio response, generated by the voice agent, to the audio stream, (2) causing display, within a HUD viewable by the user, of the transcript and an approval button, (3) determining, upon interaction, by the user, with the approval button, that the proposed audio response is approved for production within the meeting, and (4) directing the voice agent to produce the proposed audio response within the meeting. For example, the transcript can be the same as or generally similar to the transcript 1318 as described in relation to FIG. 13 above, and the HUD can be the same as or generally similar to the HUD 1320 as described in relation to FIG. 13 above. In other implementations, the particular tool is a visual indicator tool, and executing the particular tool includes (1) generating an informational artifact based on the global behavioral model and the semantic meaning of the audio stream, (2) including the informational artifact in a visual indicator, and (3) causing display, within a HUD viewable by the user, of the visual indicator. In still other implementations, the particular tool is a presentation tool, and executing the particular tool includes (1) extracting, based on the global behavioral model and the semantic meaning of the audio stream, a presentation artifact from an artifact database, and (2) causing display of the presentation artifact within a running canvas of the meeting overlay application. For example, the artifact database can be the same as or generally similar to the artifact database 110*a* as described in relation to FIG. 1A above, and the running canvas can be the same as or generally similar to the running canvas 112*a* as described in relation to FIG. 1A above. In further implementations, the particular tool is a direct guidance tool, and executing the particular tool includes (1) receiving, from the voice agent, an audio response to the audio stream, and (2) causing playback, by the meeting overlay application, of the audio response to the user.

In some implementations, a mute toggle for the voice agent and a deafen toggle for the voice agent are displayed within a HUD viewable by the user, a selection of the mute toggle is received from the user, and in response to the selection of the mute toggle, the voice agent is directed to either produce audio responses within the meeting or refrain from producing audio responses within the meeting. Additionally or alternatively, a selection of the deafen toggle can be received from the user, and in response to the selection of the deafen toggle, the voice agent is directed to either refrain from processing the audio stream or resume processing the audio stream. For example, the mute toggle can be the same as or generally similar to the mute toggle 1324 as described in relation to FIG. 13 above, and the deafen toggle can be the same as or generally similar to the deafen toggle 1326 as described in relation to FIG. 13 above.

FIGS. 13 and 14 describe implementations of the present technology in which a set of tools is provided to a voice agent and executed by that voice agent to perform functions of an overlay application. These implementations expose the functionality of the overlay application to the voice agent such that the overlay application can be dynamically manipulated by the voice agent. However, the present technology is not limited to dynamic manipulation of the overlay application by voice agents; other applications, which can include other AI agents different from the voice agent, can also be provided with the set of tools and thereby manipulate the overlay application in response to data received by those applications (e.g., input data from a meeting that is transmitted, to the applications, by a meeting enhancement server or the overlay application). In such implementations, the overlay application is thereby exposed as a structured, programmatic platform that interacts with other applications and connects those applications to meetings and/or other sources of input data. An example of exposing an overlay application to other applications is described in more detail in relation to FIG. 15 below.

Figure 15:
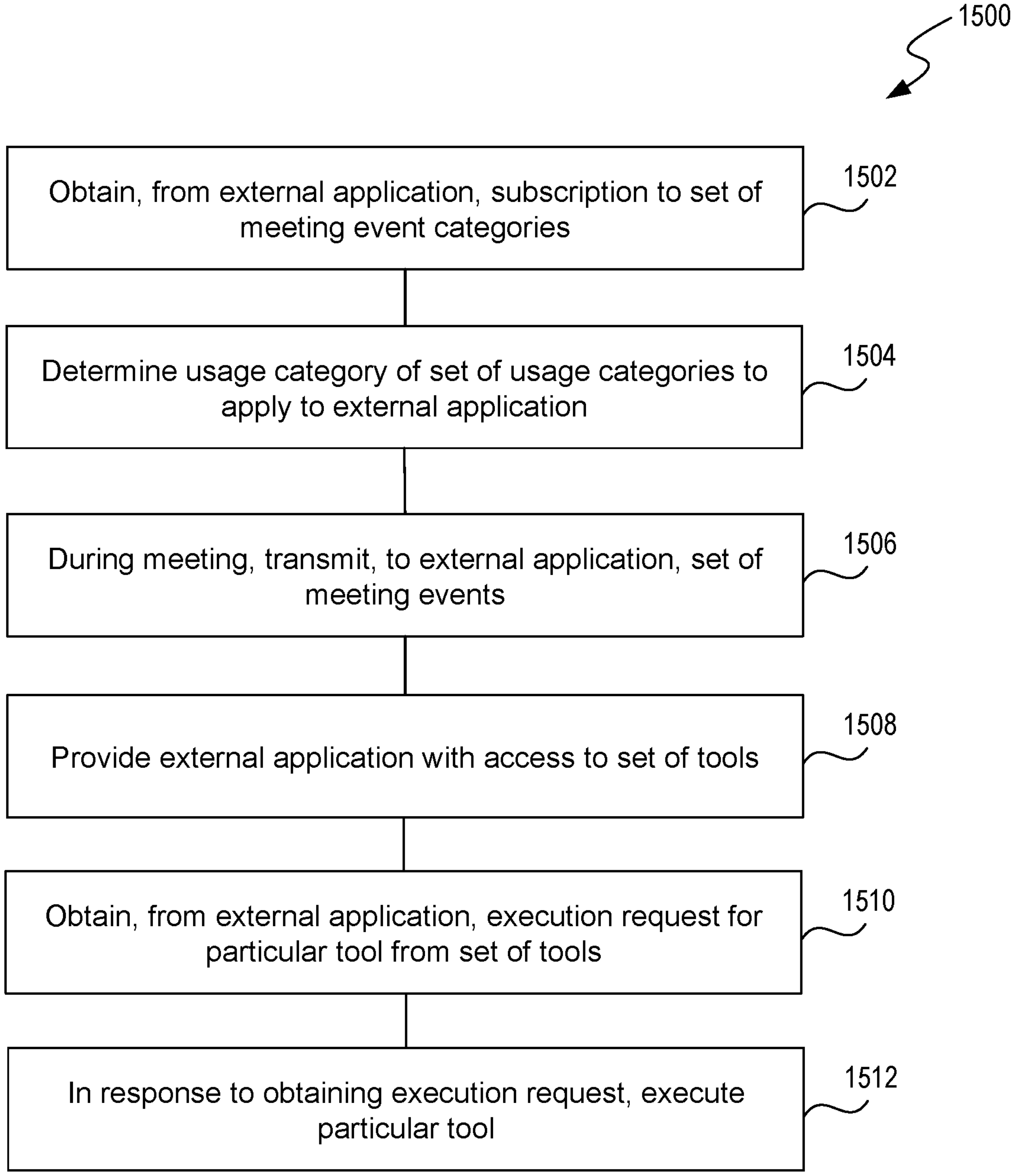
FIG. 15 is a flowchart depicting an example method of exposing a meeting overlay application as a platform for external applications, in accordance with some implementations of the present technology.

FIG. 15 is a flowchart depicting an example method 1500 of exposing a meeting overlay application as a platform for external applications, in accordance with some implementations of the present technology. In some implementations, the method 1500 is performed by components of the example computer system illustrated and described in more detail in relation to FIG. 20 below and/or the meeting environment 1300 illustrated and described in more detail in relation to FIG. 13 above. Likewise, implementations can include different and/or additional operations or can perform the operations in different orders.

In operation 1502, a subscription to a set of meeting event categories is obtained from an external application. Each meeting event category of the set of meeting event categories can be associated with a type of action performed within a meeting. The external application can be a third-party application that has registered (e.g., via a platform developer portal of a meeting enhancement server, such as the meeting enhancement server 102*a* described in relation to FIG. 1A above) to gain access to core platform capabilities of a meeting overlay application. For example, the external application can subscribe to a specific meeting event category through a defined API that transmits meeting events associated with the specific meeting event category. The set of meeting event categories can include categories such as a participant join/leave category, a speaker change category, a screen sharing start/stop category, a slide presented category, an in-meeting poll started/completed category, and/or a keyword mentioned category (e.g., where a keyword is a specific word or sequence of natural language indicating the external application should perform an action). Each of these example meeting event categories can be associated with a corresponding type of detectable meeting event, which is an action falling within the particular category (e.g., a participant leaving a meeting is a meeting event included in the participant join/leave category). In implementations where the specific keyword mentioned category is included, explicit user consent can be required before the external application receives events associated with that category, thereby preserving privacy of meeting participants included in the meeting. The subscription can be transmitted to a meeting enhancement server (e.g., the meeting enhancement server 102*a* described in relation to FIG. 1A above) in a structured data format, such as a JSON payload, and stored by the meeting enhancement server in association with an identifier of the external application, such that the meeting enhancement server can track, over time, the set of meeting event categories for which the external application should receive transmissions (as described in more detail below).

In operation 1504, a usage category of a set of usage categories to apply to the external application is determined. Each usage category of the set of usage categories can be associated with a display template for an overlay application, which is a preconfigured visual layout of a display of the overlay application (e.g., a HUD 109*a* as described in relation to FIG. 1A above) that can include predetermined locations for displaying particular categories of visual indicators. Furthermore, the display template associated with each usage category can be tailored to a particular usage, by the external application, of the overlay application that is specified by the usage category. The particular usage by the external application can be indicated by the external application itself upon registration, determined by the meeting enhancement server based on an identity of the external application (e.g., applications known to include translation software are automatically associated with a transcription and translation category), and/or determined based on the subscription obtained from the external application.

In some implementations, the set of usage categories can include at least one of a transcription and translation category, a contextual data display category, an interactive polling category, or an agenda tracking category. In such an example, the transcription and translation category can be determined when the external application is a transcription/translation tool that subscribes to a speaker change event, indicating interest in receiving audio for particular speakers to translate and/or transcribe. As another example, when the contextual data display category is determined, the external application can be a customer relationship management (CRM) tool that subscribes to a participant joined event, indicating interest in receiving notification when particular participants join so that a last known status and/or action item can be displayed, within the overlay application, in association with those particular participants. As yet another example, when the interactive polling category is determined, the external application can be an educational application that subscribes to the in-meeting poll started/completed category to inject quiz questions and collect responses via the overlay application, displaying aggregated results for meeting participants. As a further example, when the agenda tracking category is determined, the external application can be a productivity application that subscribes to a keyword mentioned category to detect an occurrence of one or more keywords that indicate one or more agenda items have been completed, enabling the external application to direct the overlay application to check off agenda steps as they happen within a display template.

In operation 1506, during the meeting, a set of meeting events is transmitted to the external application. Each meeting event in the set of meeting events can be associated with at least one meeting event category of the set of meeting event categories, thereby notifying the external application that particular meeting events of relevance to the external application have occurred and/or providing the external application with data necessary for performing actions in relation to those meeting events. The set of meeting events can be transmitted in a structured data format such as a JSON payload detailing each event of the set of meeting events and/or including context associated with each event. For example, when a participant joins or leaves the meeting, a meeting event that is associated with the participant joined/left category and that indicates a name of a meeting participant who has just joined/left the meeting can be transmitted to the external application.

In operation 1508, the external application is provided with access to a set of tools. Each tool in the set of tools can be a set of computer-implemented instructions that, when executed, causes display of one or more visual indicators of the display template. For example, the set of tools can be generally similar to the set of tools 1314 as described in relation to FIG. 13 above, except that the set of tools specifically enables the external application to inject visual indicators into the display template in response to receiving the set of meeting events. In some implementations, the set of tools is a subset of all available tools for manipulating the overlay application that is selected based on the usage category such that only tools relevant to the usage category (e.g., that cause display of visual indicators within the particular display template) are exposed to the external application. Thus, computational efficiency of the external application can be improved, as the external application does not have to expend computational resources on considering the execution of tools that are inoperable within the particular display template.

In operation 1510, an execution request for a particular tool from the set of tools is obtained from the external application. The execution request can be generated, by the external application, based on the set of meeting events. The execution request can be the same as or generally similar to the execution request 1316 as described in relation to FIG. 13 above, except that the execution request in operation 1510 is specifically generated by the external application in response to receiving one or more meeting events from the set of meeting events. For example, the external application can include one or more AI agents or a set of deterministic instructions that process the set of meeting events to determine a responsive visual indicator to display within the overlay application and select the particular tool as a tool that, when executed, causes display of that visual indicator.

In operation 1512, in response to obtaining the execution request, the particular tool is executed. Executing the particular tool can cause display of one or more visual indicators within a HUD (e.g., the HUD 109*a* described in relation to FIG. 1A above) viewable by one or more meeting participants. For example, when the external application is a transcription and translation service, executing the particular tool can cause display of a transcription or translation of a current speaker's voice within the HUD. As another example, when the external application is a CRM tool, executing the particular tool can cause display of a contextual data card including information about a meeting participant next to the meeting participant's video within the HUD. As yet another example, when the external application is an educational application, executing the particular tool can cause display of a quiz question and/or aggregated results of a poll within the HUD. As a further example, when the external application is an agenda tracking service, executing the particular tool can cause display of an agenda with checked-off steps within the HUD. Executing the particular tool can cause the visual indicator to be generated and/or positioned within the HUD as described in relation to the visual indicators of FIGS. 1A and 1B above.

Example Dynamic Overlay Tracking Environment

Figure 16:
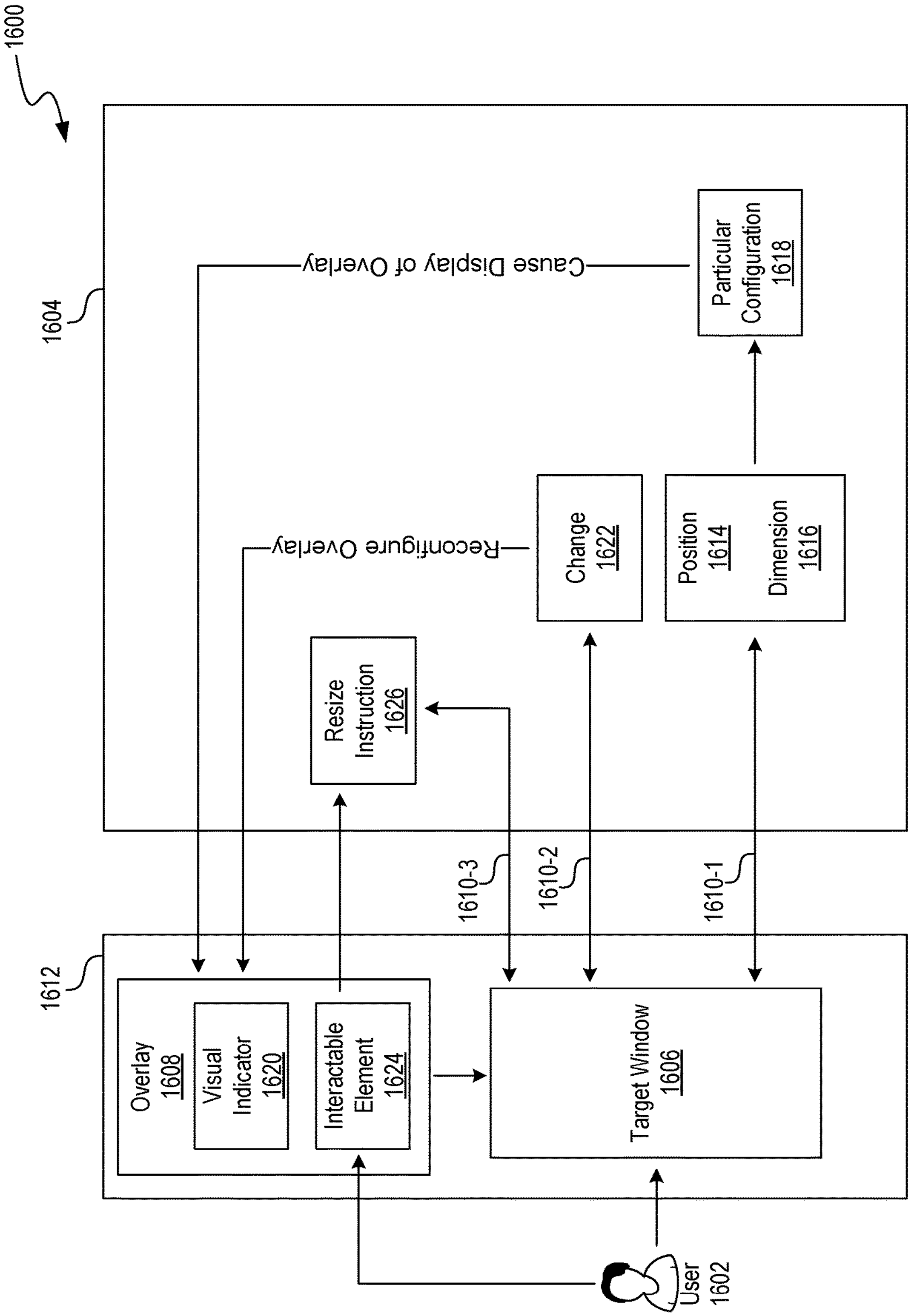
FIG. 16 illustrates a dynamic overlay tracking environment for dynamically configuring an overlay based on a target window, in accordance with some implementations of the present technology.

FIG. 16 illustrates a dynamic overlay tracking environment 1600 for dynamically configuring an overlay based on a target window, in accordance with some implementations of the present technology. The dynamic overlay tracking environment 1600 includes a user 1602, an overlay application 1604, a target window 1606, an overlay 1608, one or more operating system-level application programming interfaces (APIs) 1610, a computing device 1612, a position 1614, a dimension 1616, a particular configuration 1618, a visual indicator 1620, a change 1622, an interactable element 1624, and a resize instruction 1626. The dynamic overlay tracking environment 1600 can be implemented using components of the example computer system illustrated and described in more detail with reference to FIG. 20. Likewise, implementations of the dynamic overlay tracking environment 1600 can include different and/or additional components or can be connected in different ways.

The user 1602 is an individual or entity that interacts with a target window 1606, which is a window of a software application (e.g., a meeting provider 104*a* as described in relation to FIG. 1A above or another computer application) in relation to which an overlay application 1604 generates and causes display of an overlay 1608. For example, the user 1602 can be a meeting participant in a virtual meeting hosted by a meeting provider. The overlay application 1604 is a standalone desktop application rather than a native plugin to the application generating the target window 1606. This architecture provides platform agnosticism, allowing the overlay 1608 to function consistently across various software application windows, even where the application is not a meeting provider (e.g., CRM applications, documentation editors, presentation applications such as Microsoft® PowerPoint®). The overlay application 1604 can be the same as or generally similar to the meeting overlay application 106*a* as described in relation to FIG. 1A above, except that the overlay application 1604 specifically implements window management and anchoring mechanisms for tracking changes to the target window 1606 and dynamically configuring the overlay 1608 relative to the target window 1606, as described in more detail below. As depicted in FIG. 16, the target window 1606 and the overlay 1608 can be hosted/displayed on a computing device 1612, which can be a server computer, a personal computer (PC), a tablet computer, a mobile telephone, a game console, or any other electronic device including one or more elements of the example computer system illustrated and described in more detail with reference to FIG. 20 that enable hosting of a software application.

In some implementations, the overlay application 1604 obtains, from the user 1602, a selection of the target window 1606 for display of the overlay 1608. Selecting the target window 1606 can cause the overlay 1608 to attach to the target window 1606 or be displayed within the computing device 1612 such that the overlay 1608 overlaps and/or is approximately adjacent to the target window 1606. The selection can specify that the target window 1606 is one of several types: (1) an active window, meaning the overlay 1608 attaches to whichever open window on the computing device 1612 is currently being interacted with by the user 1602, (2) a fixed application window, meaning the overlay 1608 attaches to a specific application type such as a meeting provider application or a presentation application, or (3) an automatically selected window, meaning the overlay application 1604 determines which windows to attach to based on a set of rules. For example, when the user 1602 selects the active window option, the overlay 1608 follows interactions of the user 1602 as the user 1602 switches between applications, such as moving from a meeting window to a presentation application. When the user 1602 selects the fixed application window option, the overlay 1608 is displayed as attached to one or more application windows of a particular type, regardless of which window the user 1602 is currently interacting with. When the user 1602 selects the automatically selected window option, the overlay application 1604 applies rules to determine appropriate windows for attachment. For example, a rule can be that the overlay 1608 is displayed for specific categories of applications that are likely to be compatible with the overlay 1608 (e.g., meeting provider applications, presentation applications) but not for other applications (e.g., text editors, command prompts). As another example rule, the overlay 1608 can be displayed only when the overlay application 1604 detects (e.g., using an operating system-level API of the computing device 1612, as described in more detail below) that a camera, a microphone, and/or another input device included in or connected to the computing device 1612 is currently active.

In some implementations, the overlay application 1604 communicates with the target window 1606 through one or more operating system-level APIs. An operating system-level API is a set of standardized functions and/or protocols for communicating with the operating system of the computing device 1612. These APIs enable requests to be made and/or data to be received from the operating system in association with processes being performed on the computing device 1612 by any target application/window, regardless of the target's internal structure. For example, the one or more operating system-level APIs can include Windows API (WinAPI) for Windows operating systems and/or Cocoa APIs for macOS operating systems. Using the one or more operating system-level APIs to communicate with the target window 1606 can represent a technical improvement over existing overlay tracking systems that interface with applications/windows directly, as these systems can require customized code that is tailored to each application/window being tracked, resulting in inflexible window tracking applications that only work for a limited subset of applications/windows on the computing device 1612 and/or that have a large memory footprint on the computing device 1612, as additional code segments must be stored and processed for each unique target application/window tracked by the window tracking application.

As depicted in FIG. 16, a first API 1610-1 included in the one or more operating system-level APIs obtains a position 1614 and a dimension 1616 of the target window 1606. The position 1614 represents the location of the target window 1606 within a display of the computing device 1612, including coordinates that specify where the target window 1606 is positioned on one or more display screens. The dimension 1616 represents a width and/or height of the target window 1606 within the one or more display screens (e.g., in an amount of pixels, inches, or other standardized measurement unit). Additionally or alternatively, the one or more operating system-level APIs can obtain a z-order (e.g., a depth ordering relative to other windows) of the target window 1606.

In some implementations, based on the position 1614 and the dimension 1616, the overlay application 1604 determines a particular configuration 1618 for the overlay 1608. The particular configuration 1618 includes a position of a visual indicator 1620 relative to the target window 1606 (e.g., a number of pixels away in an x- and/or y-direction relative to an anchor point, such as a boundary or center, of the target window 1606) and a size of the visual indicator 1620 relative to the target window 1606 (e.g., a ratio of the relative areas of the visual indicator 1620 and the target window 1606 within a display screen of the computing device 1612). The visual indicator 1620 can be the same as or generally similar to the visual indicators described in relation to FIGS. 1A and 1B above and can be generated in a same or generally similar manner. For example, the particular configuration 1618 can indicate to position the visual indicator 1620 in a top-center quadrant of the target window 1606, along a side edge of the target window 1606 (e.g., either within or outside, and approximately adjacent to, the side edge), or in another location that maintains a consistent spatial relationship with the target window 1606. By determining the particular configuration 1618, the overlay application 1604 can thereby position the visual indicator 1620 within the overlay 1608 relative to the target window 1606, which can create a visual effect of native integration and which enables consistency of placement of visual indicators displayed relative to the target window 1606 at different times.

In some implementations, the overlay application 1604 can dynamically change the shape of the overlay 1608 based on the dimension 1616 of the target window 1606. For example, the overlay 1608 can transition from a narrow, horizontal bar when the dimension 1616 indicates that the target window 1606 is wide to a stacked, vertical panel when the dimension 1616 indicates that the target window 1606 is narrow. Additionally or alternatively, the visual indicator 1620 can be inserted into the overlay 1608 with a semi-transparent background that allows mouse clicks and/or other interactions of the user 1602 to pass through the overlay 1608 and interact with the target window 1606 beneath it, enabling the visual indicator 1620 to be displayed without disrupting operation of the target window 1606.

In some implementations, the overlay application 1604 monitors, via the one or more operating system-level APIs, for changes to at least one of the position 1614 or the dimension 1616 of the target window 1606. A second API 1610-2 included in the one or more operating system-level APIs detects a change 1622 to the target window 1606. The change 1622 can include modifications to the position 1614 and/or the dimension 1616 of the target window 1606, such as when the user 1602 moves, resizes, minimizes, and/or maximizes the target window 1606. In some implementations, the monitoring is performed at a predetermined time interval, meaning the monitoring occurs each time a predetermined duration of time elapses (e.g., every x milliseconds). The predetermined time interval can be selected (e.g., by the user 1602) based on a resulting central processing unit (CPU) usage of the computing device 1612. Decreasing the predetermined time interval can increase responsiveness of reacting to the change 1622 (since monitoring occurs more frequently) but also increases CPU usage of the computing device 1612, as more monitoring operations are performed. Thus, selecting an effective monitoring rate based on a resulting CPU usage enables the overlay application 1604 to balance responsiveness with computational efficiency more effectively than other solutions, as the two metrics are directly correlated. In other implementations, the monitoring is event-based rather than monitoring-based, meaning the overlay application 1604 receives asynchronous events from the operating system (e.g., via the one or more operating system-level APIs) when the target window 1606 changes position or dimension, conserving computational resources by enabling responsiveness of the overlay application 1604 to changes without performing repeated monitoring that would consume excessive CPU resources.

In response to detecting the change 1622, the overlay application 1604 can reconfigure the overlay 1608 to maintain at least one of (i) the position of the visual indicator 1620 relative to the target window 1606 or (ii) the size of the visual indicator 1620 relative to the target window 1606. For example, if the user 1602 drags the target window 1606 to a new location, the overlay application 1604 can move the overlay 1608 to maintain a same distance of the visual indicator 1620 from an anchor point of the target window 1606. As another example, where the user 1602 resizes the target window 1606, the overlay 1608 can dynamically scale in size, reposition internal components (e.g., the visual indicator 1620), and/or adjust transparency and/or size to maintain the position and/or size of the visual indicator 1620 relative to the target window 1606. As an additional example, where the target window 1606 is maximized, the overlay 1608 can expand and/or reposition its internal components to maintain the position and/or size of the visual indicator 1620 relative to the target window 1606. In some implementations where the target window 1606 is minimized, rather than maintaining at least one of the position or the size, the overlay 1608 can be hidden or collapsed into a non-intrusive dock icon (e.g., an icon that is not displayed over the target window 1606), thereby removing the visual indicator 1620 from view on the computing device 1612 entirely.

In some implementations, the overlay 1608 includes an interactable element 1624 that the user 1602 can select. The interactable element 1624 can be a button, toggle, or other graphical user interface (GUI) element that, when selected, toggles display of a second visual indicator within the overlay 1608. For example, selection of the interactable element 1624 can expand or collapse, depending on a current state of the interactable element 1624, a panel of the overlay 1608 that displays information, controls, and/or other artifacts. In such implementations, a third API 1610-3 of the one or more operating system-level APIs can transmit a resize instruction 1626 from the overlay application 1604 to the operating system of the computing device 1612, which responsively modifies at least one dimension of the target window 1606. When the selection of the interactable element 1624 causes display of the second visual indicator, the resize instruction 1626 can direct the computing device 1612 to decrease the dimension 1616 of the target window 1606, making room for the second visual indicator to appear within the overlay 1608 (e.g., such that the target window 1606 and the overlay 1608 together appear as a unified application). When the selection of the interactable element 1624 hides display of the second visual indicator, the resize instruction 1626 can direct the computing device 1612 to increase the dimension 1616 of the target window 1606, allowing the target window 1606 to occupy the space previously used by the second visual indicator that is not currently displayed within the overlay 1608. This coordinated resizing can enable the overlay 1608 and the target window 1606 to appear visually integrated regardless of which portions of the overlay 1608 are currently displayed and/or to avoid displaying the second visual indicator such that some or all of the second visual indicator appears off-screen, providing a technical improvement over other overlay technologies that do not adapt to interactable element selections.

Example Dynamic Overlay Tracking Method Flowchart

Figure 17:
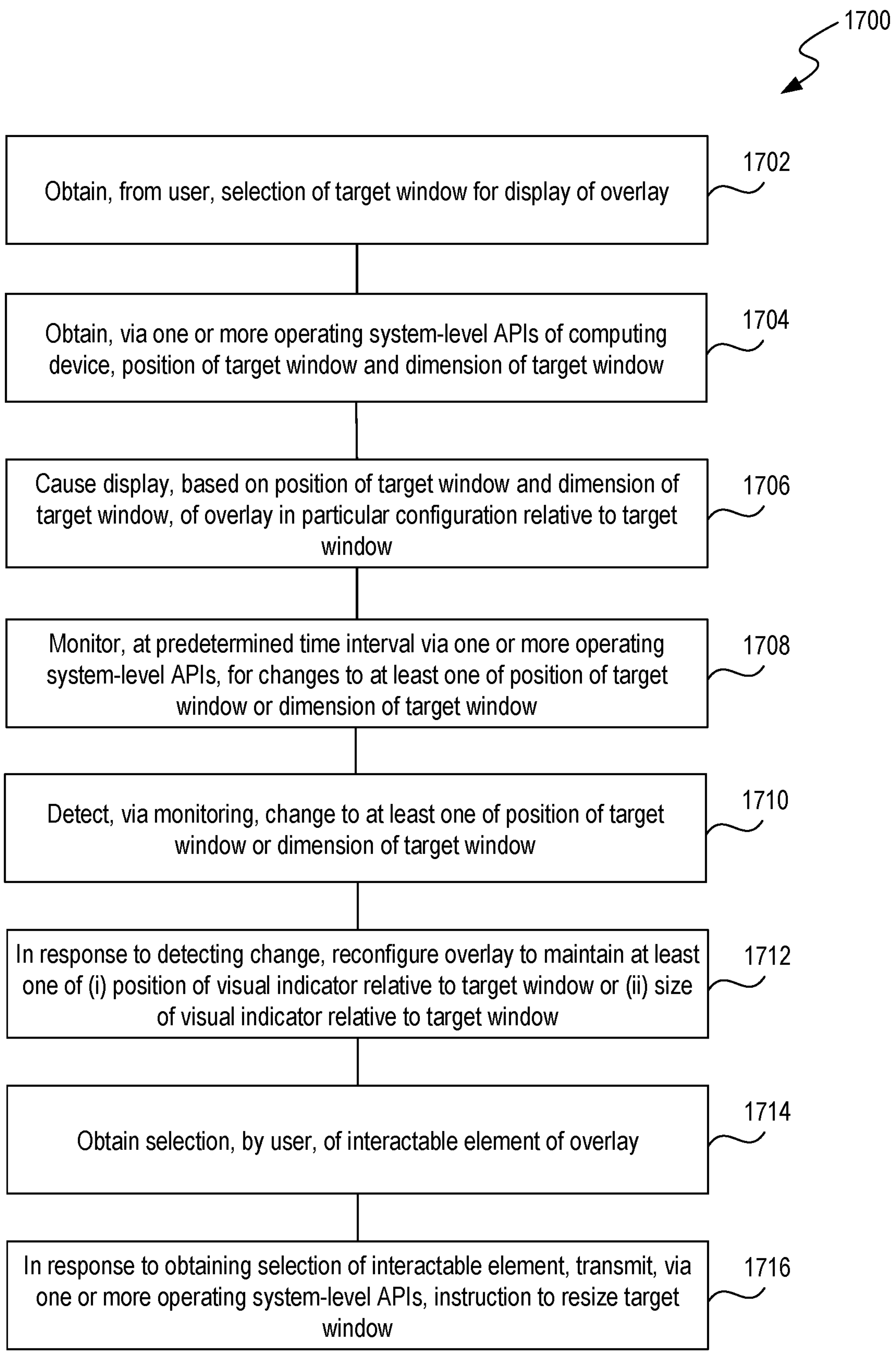
FIG. 17 is a flowchart depicting an example method of dynamically configuring an overlay to track a target window, in accordance with some implementations of the present technology.

FIG. 17 is a flowchart depicting an example method 1700 of dynamically configuring an overlay to track a target window, in accordance with some implementations of the present technology. In some implementations, the method 1700 is performed by components of the example computer system illustrated and described in more detail in relation to FIG. 20 below and/or the dynamic overlay tracking environment 1600 illustrated and described in more detail in relation to FIG. 16 above. Likewise, implementations can include different and/or additional operations or can perform the operations in different orders.

In operation 1702, a selection of a target window for display of an overlay is obtained from a user. The selection can specify that the target window is an active window, a fixed application window, or an automatically selected window. For example, the user can be the same as or generally similar to the user 1602 as described in relation to FIG. 16 above, and the target window can be the same as or generally similar to the target window 1606 as described in relation to FIG. 16 above. The overlay can be the same as or generally similar to the overlay 1608 as described in relation to FIG. 16 above.

In operation 1704, a position of the target window and a dimension of the target window are obtained via one or more operating system-level APIs of a computing device. For example, the one or more operating system-level APIs can include APIs that are the same as or generally similar to the first API 1610-1, the second API 1610-2, and/or the third API 1610-3 as described in relation to FIG. 16 above. The position can be the same as or generally similar to the position 1614 as described in relation to FIG. 16 above, and the dimension can be the same as or generally similar to the dimension 1616 as described in relation to FIG. 16 above. The computing device can be the same as or generally similar to the computing device 1612 as described in relation to FIG. 16 above.

In operation 1706, display of the overlay in a particular configuration relative to the target window is caused based on the position of the target window and the dimension of the target window. The overlay can include a visual indicator generated based on input data associated with the target window. The particular configuration can include a position of the visual indicator relative to the target window and a size of the visual indicator relative to the target window. For example, the particular configuration can be the same as or generally similar to the particular configuration 1618 as described in relation to FIG. 16 above, and the visual indicator can be the same as or generally similar to the visual indicator 1620 as described in relation to FIG. 16 above.

In operation 1708, monitoring is performed, at a predetermined time interval via the one or more operating system-level APIs, for changes to at least one of the position of the target window or the dimension of the target window. The predetermined time interval can be selected based on a resulting central processing unit (CPU) usage of the computing device. For example, the monitoring can be performed via the second API 1610-2 as described in relation to FIG. 16 above.

In operation 1710, a change to at least one of the position of the target window or the dimension of the target window is detected via the monitoring. For example, the change can be the same as or generally similar to the change 1622 as described in relation to FIG. 16 above.

In operation 1712, in response to detecting the change, the overlay is reconfigured to maintain at least one of (i) the position of the visual indicator relative to the target window or (ii) the size of the visual indicator relative to the target window. For example, the overlay application 1604 as described in relation to FIG. 16 above can reconfigure the overlay 1608 to maintain the relative spatial relationships between the visual indicator 1620 and the target window 1606.

In operation 1714, a selection, by the user, of an interactable element of the overlay is obtained. The selection of the interactable element can toggle display, within the overlay, of a second visual indicator. For example, the interactable element can be the same as or generally similar to the interactable element 1624 as described in relation to FIG. 16 above.

In operation 1716, in response to obtaining the selection of the interactable element, an instruction to resize the target window is transmitted via the one or more operating system-level APIs. Upon the selection of the interactable element causing display of the second visual indicator, the instruction can direct the computing device to decrease the dimension of the target window. Upon the selection of the interactable element hiding display of the second visual indicator, the instruction can direct the computing device to increase the dimension of the target window. For example, the instruction can be the same as or generally similar to the resize instruction 1626 as described in relation to FIG. 16 above, and the instruction can be transmitted via the third API 1610-3 as described in relation to FIG. 16 above.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer") and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks and there can be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term "DNN" can encompass any neural network having multiple layers, including graph neural networks (GNNs), convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" can be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset can be a collection of text documents, referred to as a text corpus (or simply referred to as a corpus). The corpus can represent a language domain (e.g., a single language), can represent a subject domain (e.g., scientific papers), and/or can encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or can be unlabeled.

As another example, to train an ML model that is intended to generate images, the training dataset can be a dataset of image-text pairs. The dataset represents a text domain (e.g., a caption corresponding to the image), a language domain (e.g., the language the caption is written in), and/or encompasses another domain or domains, be they larger or smaller than a single text or language domain. For example, a relatively large and non-subject-specific dataset can be created by extracting images from online web pages and/or publicly available social media posts and associating text captions with those images.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger dataset. For example, a dataset can be split into three mutually exclusive subsets: a training set, a validation (or cross-validation) set, and a testing set. The three subsets of data can be used sequentially during ML model training. For example, the training set can be first used to train one or more ML models, each ML model, e.g., having a particular architecture, having a particular training procedure, being describable by a set of model hyperparameters, and/or otherwise being varied from the other of the one or more ML models. The validation (or cross-validation) set can then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (i.e., with the training set) can begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) can begin. The output generated from the testing set can be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training can be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model can be deployed to generate output in real-world applications (also referred to as "inference").

In some examples, a trained ML model can be fine-tuned, meaning that the values of the learned parameters can be adjusted slightly in order for the ML model to better model a specific task. Fine-tuning of an ML model typically involves further training the ML model on a number of data samples (which can be smaller in number/cardinality than those used to train the model initially) that closely target the specific task. For example, an ML model for generating natural language that has been trained generically on publicly available text corpora can be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can be used as shorthand for an ML-based language model (i.e., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model can contain hundreds of thousands of learned parameters or in the case of an LLM can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

Additionally or alternatively, language models can be embedded into other ML models, such as a diffusion model (e.g., Stable Diffusion, DaLL-E, Midjourney), that are trained to generate images based on processing of a natural language input performed by the language models. For example, the language model can process the natural language input into a guidance vector containing information regarding the type of image to be generated. The diffusion model can then receive an input tensor, which is typically an image of randomly generated noise. Through a process of denoising, noise is gradually removed from the input tensor in a manner specified by the guidance vector. The denoising process continues until the resulting image resembles the type of image specified by the natural language input. The diffusion model can then provide the resulting image as output.

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. Although transformer-based language models are described herein, it should be understood that the present disclosure can be applicable to any ML-based model, including language models based on other neural network architectures such as RNN-based language models.

Figure 18:
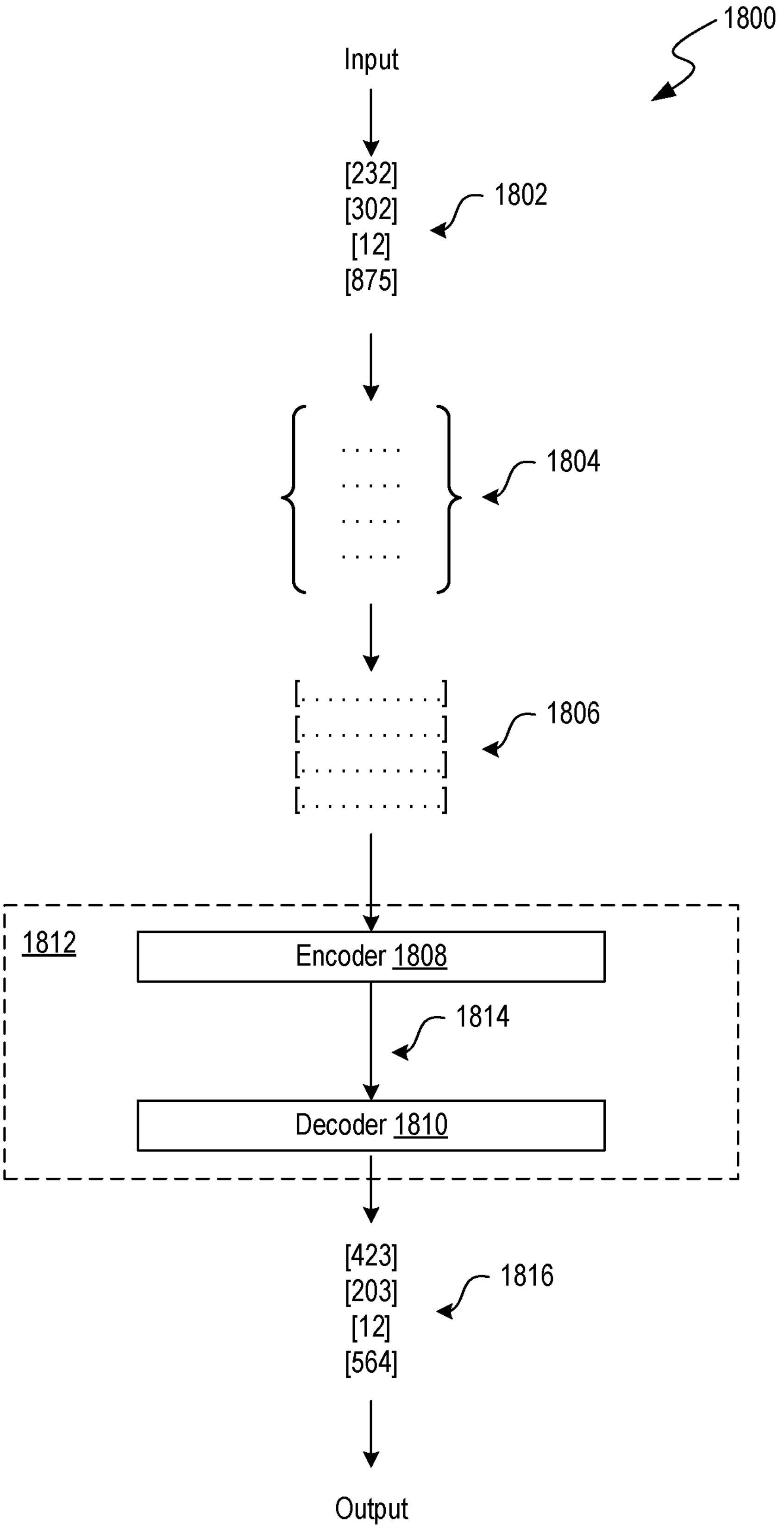
FIG. 18 is a block diagram of an example transformer, in accordance with some implementations of the present technology.

FIG. 18 is a block diagram 1800 of an example transformer 1812, in accordance with some implementations of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence.

The transformer 1812 includes an encoder 1808 (which can comprise one or more encoder layers/blocks connected in series) and a decoder 1810 (which can comprise one or more decoder layers/blocks connected in series). Generally, the encoder 1808 and the decoder 1810 each include a plurality of neural network layers, at least one of which can be a self-attention layer. The parameters of the neural network layers can be referred to as the parameters of the language model.

The transformer 1812 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 1812 is trained to perform certain functions on other input formats than natural language input. For example, the input can include objects, images, audio content, or video content, or a combination thereof.

The transformer 1812 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input, generating images based on natural language inputs). FIG. 18 illustrates an example of how the transformer 1812 can process textual input data. Input to a language model (whether transformer-based or otherwise) typically is in the form of natural language that can be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 18, a short sequence of tokens 1802 corresponding to the input text is illustrated as input to the transformer 1812. Tokenization of the text sequence into the tokens 1802 can be performed by some pre-processing tokenization module such as, for example, a byte-pair encoding tokenizer (the "pre" referring to the tokenization occurring prior to the processing of the tokenized input by the LLM), which is not shown in FIG. 18 for simplicity. In general, the token sequence that is inputted to the transformer 1812 can be of any length up to a maximum length defined based on the dimensions of the transformer 1812. Each token 1802 in the token sequence is converted into an embedding vector 1806 (also referred to simply as an embedding 1806). An embedding 1806 is a learned numerical representation (such as, for example, a vector) of a token that captures some semantic meaning of the text segment represented by the token 1802. The embedding 1806 represents the text segment corresponding to the token 1802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 1806 corresponding to the "write" token will be closer to another embedding corresponding to the "jot down" token in the vector space as compared to the distance between the embedding 1806 corresponding to the "write" token and another embedding corresponding to the "summary" token.

The vector space can be defined by the dimensions and values of the embedding vectors. Various techniques can be used to convert a token 1802 to an embedding 1806. For example, another trained ML model can be used to convert the token 1802 into an embedding 1806. In particular, another trained ML model can be used to convert the token 1802 into an embedding 1806 in a way that encodes additional information into the embedding 1806 (e.g., a trained ML model can encode positional information about the position of the token 1802 in the text sequence into the embedding 1806). In some examples, the numerical value of the token 1802 can be used to look up the corresponding embedding in an embedding matrix 1804 (which can be learned during training of the transformer 1812).

The generated embeddings 1806 are input into the encoder 1808. The encoder 1808 serves to encode the embeddings 1806 into feature vectors 1814 that represent the latent features of the embeddings 1806. The encoder 1808 can encode positional information (i.e., information about the sequence of the input) in the feature vectors 1814. The feature vectors 1814 can have very high dimensionality (e.g., on the order of thousands or tens of thousands), with each element in a feature vector 1814 corresponding to a respective feature. The numerical weight of each element in a feature vector 1814 represents the importance of the corresponding feature. The space of all possible feature vectors 1814 that can be generated by the encoder 1808 can be referred to as the latent space or feature space.

Conceptually, the decoder 1810 is designed to map the features represented by the feature vectors 1814 into meaningful output, which can depend on the task that was assigned to the transformer 1812. For example, if the transformer 1812 is used for a translation task, the decoder 1810 can map the feature vectors 1814 into text output in a target language different from the language of the original tokens 1802. Generally, in a generative language model, the decoder 1810 serves to decode the feature vectors 1814 into a sequence of tokens. The decoder 1810 can generate output tokens 1816 one by one. Each output token 1816 can be fed back as input to the decoder 1810 in order to generate the next output token 1816. By feeding back the generated output and applying self-attention, the decoder 1810 is able to generate a sequence of output tokens 1816 that has sequential meaning (e.g., the resulting output text sequence is understandable as a sentence and obeys grammatical rules). The decoder 1810 can generate output tokens 1816 until a special [EOT] token (indicating the end of the text) is generated. The resulting sequence of output tokens 1816 can then be converted to a text sequence in post-processing. For example, each output token 1816 can be an integer number that corresponds to a vocabulary index. By looking up the text segment using the vocabulary index, the text segment corresponding to each output token 1816 can be retrieved, the text segments can be concatenated together, and the final output text sequence can be obtained.

In some examples, the input provided to the transformer 1812 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an application programming interface (API)). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Artificial Intelligence System

Figure 19:
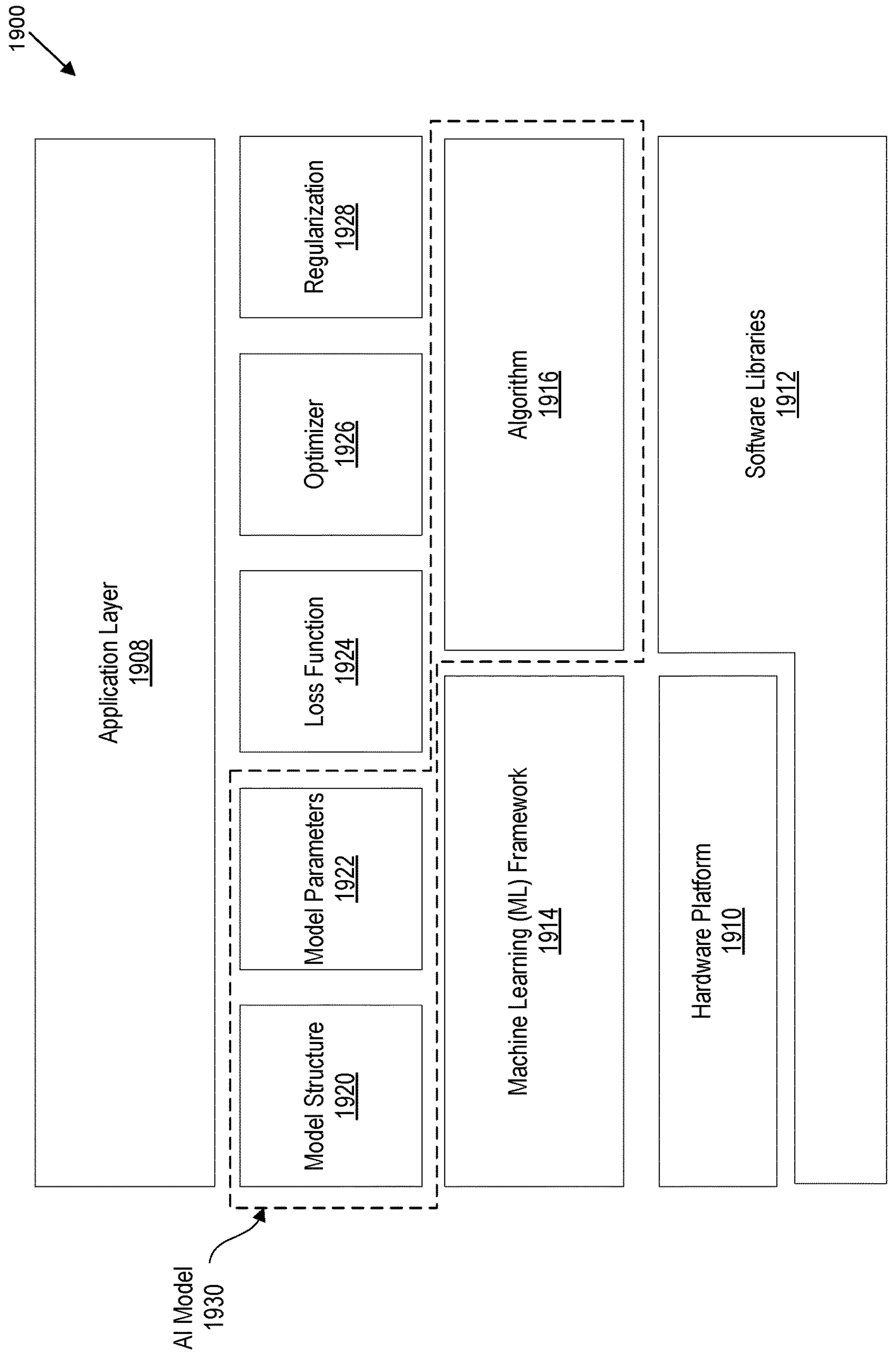
FIG. 19 is a block diagram that illustrates an example of an artificial intelligence (AI) system in which at least some operations described herein can be implemented.

FIG. 19 is a block diagram that illustrates an example of an AI system 1900 in which at least some operations described herein can be implemented. Example ML models can include one or more models executed by the one or more AI agents described in relation to FIG. 1A above. Accordingly, the one or more AI agents can include one or more components of the AI system 1900.

As shown in FIG. 19, the AI system 1900 can include a set of layers, which conceptually organize elements within an example network topology for the AI system's architecture to implement a particular AI model 1930. Generally, an AI model 1930 is a computer-executable program implemented by the AI system 1900 that analyzes data to make predictions. Information can pass through each layer of the AI system 1900 to generate outputs for the AI model 1930. The layers can include a data layer 1902, a structure layer 1904, a model layer 1906, and an application layer 1908. The algorithm 1916 of the structure layer 1904 and the model structure 1920 and model parameters 1922 of the model layer 1906 together form the example AI model 1930. The optimizer 1926, loss function engine 1924, and regularization engine 1928 work to refine and optimize the AI model 1930, and the data layer 1902 provides resources and support for application of the AI model 1930 by the application layer 1908.

The data layer 1902 acts as the foundation of the AI system 1900 by preparing data for the AI model 1930. As shown, the data layer 1902 can include two sub-layers: a hardware platform 1910 and one or more software libraries 1912. The hardware platform 1910 can be designed to perform operations for the AI model 1930 and include computing resources for storage, memory, logic, and networking. The hardware platform 1910 can process amounts of data using one or more servers. The servers can perform backend operations such as matrix calculations, parallel calculations, ML training, and the like. Examples of servers used by the hardware platform 1910 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 1910 can include Infrastructure as a Service (laaS) resources, which are computing resources (e.g., servers, memory, etc.) offered by a cloud services provider. The hardware platform 1910 can also include computer memory for storing data about the AI model 1930, application of the AI model 1930, and training data for the AI model 1930. The computer memory can be a form of random-access memory (RAM), such as dynamic RAM, static RAM, and non-volatile RAM.

The software libraries 1912 can be thought of as suites of data and programming code, including executables, used to control the computing resources of the hardware platform 1910. The programming code can include low-level primitives (e.g., fundamental language elements) that form the foundation of one or more low-level programming languages such that servers of the hardware platform 1910 can use the low-level primitives to carry out specific operations. The low-level programming languages do not require much, if any, abstraction from a computing resource's instruction set architecture, allowing them to run quickly with a small memory footprint. Examples of software libraries 1912 that can be included in the AI system 1900 include Intel Math Kernel Library, Nvidia cuDNN, Eigen, and OpenBLAS.

The structure layer 1904 can include an ML framework 1914 and an algorithm 1916. The ML framework 1914 can be thought of as an interface, library, or tool that allows users to build and deploy the AI model 1930. The ML framework 1914 can include an open-source library, an API, a gradient-boosting library, an ensemble method, and/or a deep learning toolkit that work with the layers of the AI system to facilitate development of the AI model 1930. For example, the ML framework 1914 can distribute processes for application or training of the AI model 1930 across multiple resources in the hardware platform 1910. The ML framework 1914 can also include a set of pre-built components that have the functionality to implement and train the AI model 1930 and allow users to use pre-built functions and classes to construct and train the AI model 1930. Thus, the ML framework 1914 can be used to facilitate data engineering, development, hyperparameter tuning, testing, and training for the AI model 1930. Examples of ML frameworks 1914 that can be used in the AI system 1900 include TensorFlow, PyTorch, Scikit-Learn, Keras, Caffe, LightGBM, Random Forest, and Amazon Web Services.

The algorithm 1916 can be an organized set of computer-executable operations used to generate output data from a set of input data and can be described using pseudocode. The algorithm 1916 can include complex code that allows the computing resources to learn from new input data and create new/modified outputs based on what was learned. In some implementations, the algorithm 1916 can build the AI model 1930 through being trained while running computing resources of the hardware platform 1910. This training allows the algorithm 1916 to make predictions or decisions without being explicitly programmed to do so. Once trained, the algorithm 1916 can run at the computing resources as part of the AI model 1930 to make predictions or decisions, improve computing resource performance, or perform tasks. The algorithm 1916 can be trained using supervised learning, unsupervised learning, semi-supervised learning, and/or reinforcement learning.

Using supervised learning, the algorithm 1916 can be trained to learn patterns (e.g., map input data to output data) based on labeled training data. The training data can be labeled by an external user or operator. For instance, a user can collect a set of training data, such as by capturing data from sensors, images from a camera, outputs from a model, and the like. In an example implementation, training data can include asset tracking histories with known threat levels, resources with known relevancy scores measuring their relevance to known assets, and logs of physical and digital features with known correspondences and similarities. The user can label the training data based on one or more classes and train the AI model 1930 by inputting the training data to the algorithm 1916. The algorithm determines how to label the new data based on the labeled training data. The user can facilitate collection, labeling, and/or input via the ML framework 1914. In some instances, the user can convert the training data to a set of feature vectors for input to the algorithm 1916. Once trained, the user can test the algorithm 1916 on new data to determine if the algorithm 1916 is predicting accurate labels for the new data. For example, the user can use cross-validation methods to test the accuracy of the algorithm 1916 and retrain the algorithm 1916 on new training data if the results of the cross-validation are below an accuracy threshold.

Supervised learning can involve classification and/or regression. Classification techniques involve teaching the algorithm 1916 to identify a category of new observations based on training data and are used when input data for the algorithm 1916 is discrete. Said differently, when learning through classification techniques, the algorithm 1916 receives training data labeled with categories (e.g., classes) and determines how features observed in the training data (e.g., service name, asset room location, asset internet protocol (IP) address) relate to the categories (e.g., high risk or low risk of cybersecurity attack). Once trained, the algorithm 1916 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1916 is continuous. Regression techniques can be used to train the algorithm 1916 to predict or forecast relationships between variables. To train the algorithm 1916 using regression techniques, a user can select a regression method for estimating the parameters of the model. The user collects and labels training data that is input to the algorithm 1916 such that the algorithm 1916 is trained to understand the relationship between data features and the dependent variable(s). Once trained, the algorithm 1916 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for ML-based pre-processing operations.

Under unsupervised learning, the algorithm 1916 learns patterns from unlabeled training data. In particular, the algorithm 1916 is trained to learn hidden patterns and insights of input data, which can be used for data exploration or for generating new data. Here, the algorithm 1916 does not have a predefined output, unlike the labels output when the algorithm 1916 is trained using supervised learning. Said another way, unsupervised learning is used to train the algorithm 1916 to find an underlying structure of a set of data, group the data according to similarities, and represent that set of data in a compressed format. In some implementations, performance of the algorithm 1916 that can use unsupervised learning is improved because it can learn how to fine-tune the model by setting an ideal cutoff score for relevancy rank, as described herein.

A few techniques can be used in unsupervised learning: clustering, anomaly detection, and techniques for learning latent variable models. Clustering techniques involve grouping data into different clusters that include similar data such that other clusters contain dissimilar data. For example, during clustering, data with possible similarities remain in a group that has less or no similarities to another group. Examples of clustering techniques include density-based methods, hierarchical-based methods, partitioning methods, and grid-based methods. In one example, the algorithm 1916 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1916 can be trained to be an Isolation Forest, local outlier factor (LOF) algorithm, or k-NN algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 1916 include factor analysis, item response theory, latent profile analysis, and latent class analysis.

The model layer 1906 implements the AI model 1930 using data from the data layer 1902 and the algorithm 1916 and ML framework 1914 from the structure layer 1904, thus enabling decision-making capabilities of the AI system 1900. The model layer 1906 includes a model structure 1920, model parameters 1922, a loss function engine 1924, an optimizer 1926, and a regularization engine 1928.

The model structure 1920 describes the architecture of the AI model 1930 of the AI system 1900. The model structure 1920 defines the complexity of the pattern/relationship that the AI model 1930 expresses. Examples of structures that can be used as the model structure 1920 include decision trees, support vector machines, regression analyses, Bayesian networks, Gaussian processes, genetic algorithms, and neural networks. The model structure 1920 can include a number of structure layers, a number of nodes (or neurons) at each structure layer, and activation functions of each node. Each node's activation function defines how the node converts data received to data output. The structure layers can include an input layer of nodes that receive input data and an output layer of nodes that produce output data. The model structure 1920 can include one or more hidden layers of nodes between the input and output layers. The model structure 1920 can be a neural network that connects the nodes in the structured layers such that the nodes are interconnected. Examples of neural networks include a transformer (e.g., the transformer 1812, as described in relation to FIG. 18 above) or another neural network described above.

The model parameters 1922 represent the relationships learned during training and can be used to make predictions and decisions based on input data. The model parameters

1922 can weight and bias the nodes and connections of the model structure 1920. For instance, when the model structure 1920 is a neural network, the model parameters 1922 can weight and bias the nodes in each layer of the neural networks such that the weights determine the strength of the nodes and the biases determine the thresholds for the activation functions of each node. The model parameters 1922, in conjunction with the activation functions of the nodes, determine how input data is transformed into desired outputs. The model parameters 1922 can be determined and/or altered during training of the algorithm 1916.

The loss function engine 1924 can determine a loss function, which is a metric used to evaluate performance of the AI model 1930 during training. For instance, the loss function engine 1924 can measure the difference between a predicted output of the AI model 1930 and the actual output of the AI model 1930 and is used to guide optimization of the AI model 1930 during training to minimize the loss function. The loss function can be presented via the ML framework 1914 such that a user can determine whether to retrain or otherwise alter the algorithm 1916 if the loss function is over a threshold. In some instances, the algorithm 1916 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1926 adjusts the model parameters 1922 to minimize the loss function during training of the algorithm 1916. In other words, the optimizer 1926 uses the loss function generated by the loss function engine 1924 as a guide to determine what model parameters lead to the most accurate AI model 1930. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 1926 used can be determined based on the type of model structure 1920 and the size of data and the computing resources available in the data layer 1902.

The regularization engine 1928 executes regularization operations. Regularization is a technique that prevents over-fitting and underfitting of the AI model 1930. Overfitting occurs when the algorithm 1916 is overly complex and too adapted to the training data, which can result in poor performance of the AI model 1930. Underfitting occurs when the algorithm 1916 is unable to recognize even basic patterns from the training data such that it cannot perform well on training data or on validation data. The regularization engine 1928 can apply one or more regularization techniques to fit the algorithm 1916 to the training data properly, which helps constrain the resulting AI model 1930 and improves its ability for generalized application. Examples of regularization techniques include lasso (L1) regularization, ridge (L2) regularization, and elastic (L1 and L2) regularization.

The application layer 1908 describes how the AI system 1900 is used to solve problems or perform tasks. In an example implementation, the application layer 1908 can include one or more AI agents, the meeting enhancement server 102*a* and/or meeting overlay application 106*a* as described in relation to FIG. 1A above, and/or the meeting enhancement server 102*b* and/or meeting overlay application 106*b* as described in relation to FIG. 1B above.

Computer System

Figure 20:
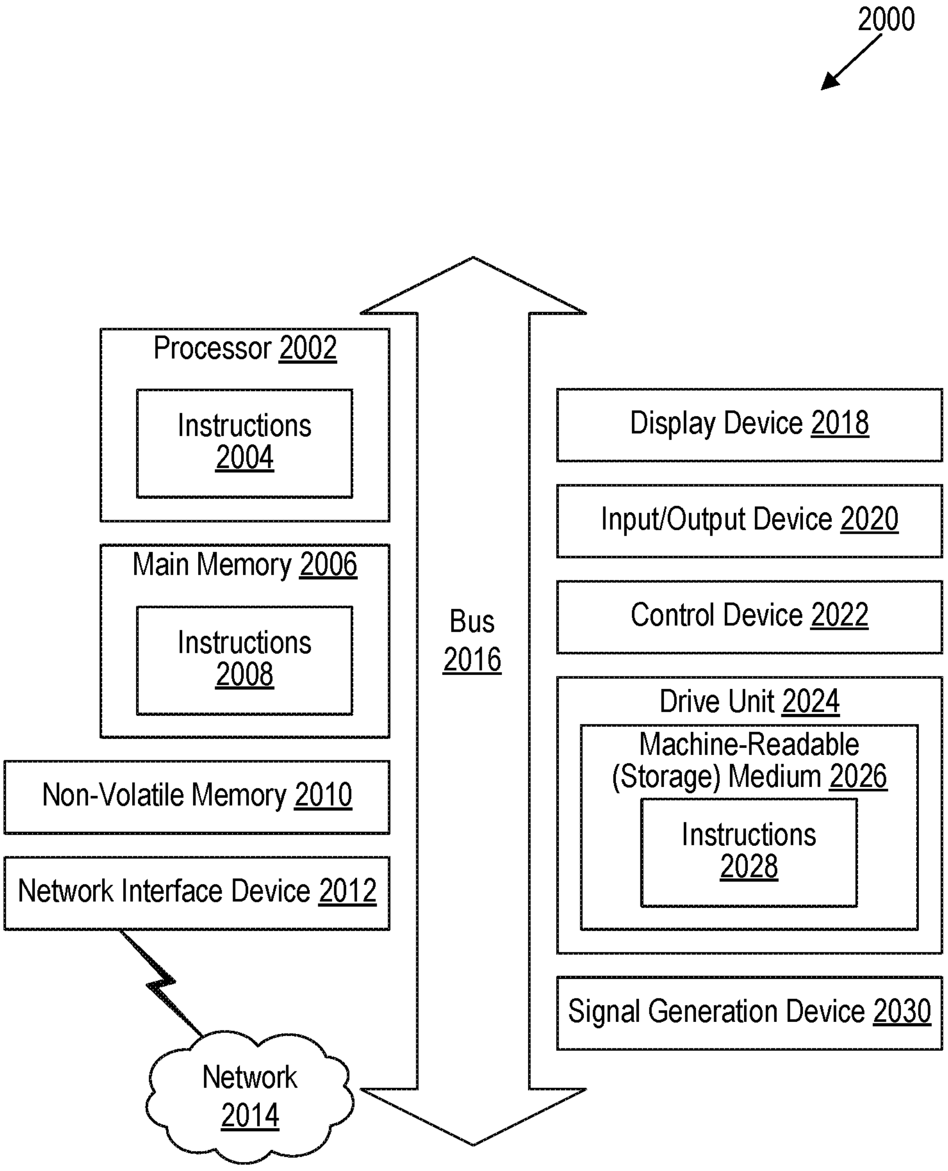
FIG. 20 is a block diagram that illustrates an example of a computer system in which at least some operations described herein can be implemented.

FIG. 20 is a block diagram that illustrates an example of a computer system 2000 in which at least some operations described herein can be implemented. As shown, the computer system 2000 can include: one or more processors 2002, main memory 2006, non-volatile memory 2010, a network interface device 2012, a video display device 2018, an I/O device 2020, a control device 2022 (e.g., keyboard and pointing device), a drive unit 2024 that includes a machine-readable (storage) medium 2026, and a signal generation device 2030 that are communicatively connected to a bus 2016. The bus 2016 represents one or more physical buses and/or point-to-point connections that are connected by appropriate bridges, adapters, or controllers. Various common components (e.g., cache memory) are omitted from FIG. 20 for brevity. Instead, the computer system 2000 is intended to illustrate a hardware device on which components illustrated or described relative to the examples of the figures and any other components described in this specification can be implemented.

The computer system 2000 can take any suitable physical form. For example, the computer system 2000 can share a similar architecture as that of a server computer, personal computer (PC), tablet computer, mobile telephone, game console, music player, wearable electronic device, network-connected ("smart") device (e.g., a television or home assistant device), augmented reality (AR)/virtual reality (VR) systems (e.g., head-mounted display), or any electronic device capable of executing a set of instructions that specify action(s) to be taken by the computer system 2000. In some implementations, the computer system 2000 can be an embedded computer system, a system-on-chip (SOC), a single-board computer (SBC) system, or a distributed system such as a mesh of computer systems, or it can include one or more cloud components in one or more networks. Where appropriate, one or more computer systems 2000 can perform operations in real time, in near real time, or in batch mode.

The network interface device 2012 enables the computer system 2000 to mediate data in a network 2014 with an entity that is external to the computer system 2000 through any communication protocol supported by the computer system 2000 and the external entity. Examples of the network interface device 2012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 2006, non-volatile memory 2010, machine-readable (storage) medium 2026) can be local, remote, or distributed. Although shown as a single medium, the machine-readable (storage) medium 2026 can include multiple media (e.g., a centralized/distributed database and/or associated caches and servers) that store one or more sets of instructions 2028. The machine-readable (storage) medium 2026 can include any medium that is capable of storing, encoding, or carrying a set of instructions for execution by the computer system 2000. The machine-readable (storage) medium 2026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 2010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2004, 2008, 2028) set at various times in various memory and storage devices in computing device(s). When read and executed by the processor 2002, the instruction(s) cause the computer system 2000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A method of integrating a voice agent into a meeting, the method comprising:

obtaining, from a user of a meeting overlay application, an invitation specifying an operation mode for the voice agent that is (1) an autonomous mode giving the voice agent permission to join the meeting and make unsupervised contributions to the meeting, (2) a supervised mode giving the voice agent permission to join the meeting and make contributions to the meeting after human approval, or (3) a whisper mode giving the voice agent permission to interact with the user via the meeting overlay application without joining the meeting;

activating the voice agent in accordance with the operation mode specified in the invitation;

obtaining, from a global data lake, unstructured data associated with a meeting participant included in the meeting;

providing, as input, the unstructured data to one or more artificial intelligence (AI) agents, which generate, as output, a global behavioral model associated with the meeting participant;

providing the global behavioral model to the voice agent as context for an audio stream produced by the meeting participant during the meeting;

providing the voice agent with access to a set of tools, wherein each tool in the set of tools is a set of computer-implemented instructions that, when executed, performs a function of the meeting overlay application, wherein the voice agent exclusively manipulates the meeting overlay application by requesting execution of one or more tools from the set of tools, and wherein, in response to receiving the audio stream, the voice agent selects, based on a semantic meaning of the audio stream and the global behavioral model, a particular tool from the set of tools to execute;

obtaining, from the voice agent, an execution request for the particular tool; and in response to obtaining the execution request, executing the particular tool.

2. The method of claim 1, wherein the particular tool is a speech approval tool, further comprising executing the particular tool by:

generating a transcript including text representing a proposed audio response, generated by the voice agent, to the audio stream;

causing display, within a heads-up display (HUD) viewable by the user, of the transcript and an approval button;

upon interaction, by the user, with the approval button, determining that the proposed audio response is approved for production within the meeting; and directing the voice agent to produce the proposed audio response within the meeting.

3. The method of claim 1, wherein the particular tool is a visual indicator tool, further comprising executing the particular tool by:

generating an informational artifact based on the global behavioral model and the semantic meaning;

including the informational artifact in a visual indicator; and causing display, within the HUD viewable by the user, of the visual indicator.

4. The method of claim 1, wherein the particular tool is a presentation tool, further comprising executing the particular tool by:

extracting, based on the global behavioral model and the semantic meaning, a presentation artifact from an artifact database; and causing display of the presentation artifact within a running canvas of the meeting overlay application.

5. The method of claim 1, wherein the particular tool is a direct guidance tool, further comprising executing the particular tool by:

receiving, from the voice agent, a natural language response to the audio stream; and providing, via the meeting overlay application, the natural language response to the user.

6. The method of claim 1, further comprising:

causing display, within the HUD viewable by the user, of a mute toggle for the voice agent and a deafen toggle for the voice agent;

receiving, from the user, a selection of the mute toggle;

in response to the selection of the mute toggle, directing the voice agent to either produce audio responses within the meeting or refrain from producing audio responses within the meeting;

receiving, from the user, a selection of the deafen toggle; and in response to the selection of the deafen toggle, directing the voice agent to either refrain from processing the audio stream or resume processing the audio stream.

7. A system comprising:

at least one hardware processor; and at least one non-transitory memory storing instructions, which, when executed by the at least one hardware processor, cause the system to:

obtain, from a user of a meeting overlay application, an invitation, wherein the invitation specifies an operation mode for a voice agent in relation to a meeting;

activate the voice agent in accordance with the operation mode specified in the invitation;

obtain, from a global data lake, unstructured data associated with a meeting participant included in the meeting;

provide, as input, the unstructured data to one or more artificial intelligence (AI) agents, which generate, as output, a global behavioral model associated with the meeting participant;

provide the global behavioral model to the voice agent as context for an audio stream produced by the meeting participant during the meeting;

provide the voice agent with access to a set of tools, wherein each tool in the set of tools is a set of computer-implemented instructions that, when executed, performs a function of the meeting overlay application, and wherein, in response to receiving the audio stream, the voice agent selects, based on a semantic meaning of the audio stream and the global behavioral model, a particular tool from the set of tools to execute;

obtain, from the voice agent, an execution request for the particular tool; and in response to obtaining the execution request, execute the particular tool.

8. The system of claim 7, wherein the operation mode is either an autonomous mode giving the voice agent permission to join the meeting and make unsupervised contributions to the meeting, a supervised mode giving the voice agent permission to join the meeting and make contributions to the meeting after human approval, or a whisper mode giving the voice agent permission to interact with the user via the meeting overlay application without joining the meeting.

9. The system of claim 7, wherein the voice agent exclusively manipulates the meeting overlay application by requesting execution of one or more tools from the set of tools.

10. The system of claim 7, wherein the particular tool is a speech approval tool, further comprising instructions causing the system to execute the particular tool by:

generating a transcript including text representing a proposed audio response, generated by the voice agent, to the audio stream;

causing display, within a heads-up display (HUD) viewable by the user, of the transcript and an approval button;

upon interaction, by the user, with the approval button, determining that the proposed audio response is approved for production within the meeting; and directing the voice agent to produce the proposed audio response within the meeting.

11. The system of claim 7, wherein the particular tool is a visual indicator tool, further comprising instructions causing the system to execute the particular tool by:

generating an informational artifact based on the global behavioral model and the semantic meaning;

including the informational artifact in a visual indicator; and causing display, within the HUD viewable by the user, of the visual indicator.

12. The system of claim 7, wherein the particular tool is a presentation tool, further comprising instructions causing the system to execute the particular tool by:

extracting, based on the global behavioral model and the semantic meaning, a presentation artifact from an artifact database; and causing display of the presentation artifact within a running canvas of the meeting overlay application.

13. The system of claim 7, wherein the particular tool is a direct guidance tool, further comprising instructions causing the system to execute the particular tool by:

receiving, from the voice agent, a natural language response to the audio stream; and providing, via the meeting overlay application, the natural language response to the user.

14. The system of claim 7, further comprising instructions causing the system to:

cause display, within the HUD viewable by the user, of a mute toggle for the voice agent and a deafen toggle for the voice agent;

receive, from the user, a selection of the mute toggle;

in response to the selection of the mute toggle, direct the voice agent to either produce audio responses within the meeting or refrain from producing audio responses within the meeting;

receive, from the user, a selection of the deafen toggle; and in response to the selection of the deafen toggle, direct the voice agent to either refrain from processing the audio stream or resume processing the audio stream.

15. One or more non-transitory, computer-readable storage media comprising instructions recorded thereon, wherein the instructions, when executed by at least one data processor of a system, cause the system to:

obtain, from a user of an overlay application, an invitation, wherein the invitation specifies an operation mode for a voice agent;

activate the voice agent in accordance with the operation mode specified in the invitation;

provide the voice agent with access to a set of tools, wherein each tool in the set of tools is a set of computer-implemented instructions that, when executed, performs a function of the overlay application, and wherein, in response to receiving an audio stream associated with the user, the voice agent selects, based on a semantic meaning of the audio stream, a particular tool from the set of tools to execute;

obtain, from the voice agent, an execution request for the particular tool; and in response to obtaining the execution request, execute the particular tool.

16. The one or more non-transitory, computer-readable storage media of claim 15, further comprising instructions causing the system to:

obtain, from a global data lake, unstructured data associated with the user;

provide, as input, the unstructured data to one or more artificial intelligence (AI) agents, which generate, as output, a global behavioral model associated with the user; and provide the global behavioral model to the voice agent as context for the audio stream.

17. The one or more non-transitory, computer-readable storage media of claim 15, wherein the operation mode is either an autonomous mode giving the voice agent permission to join a meeting including the user and make unsupervised contributions to the meeting, a supervised mode giving the voice agent permission to join the meeting and make contributions to the meeting after human approval, or a whisper mode giving the voice agent permission to interact with the user via the meeting overlay application without joining the meeting.

18. The one or more non-transitory, computer-readable storage media of claim 15, wherein the voice agent exclusively manipulates the overlay application by requesting execution of one or more tools from the set of tools.

19. The one or more non-transitory, computer-readable storage media of claim 15, wherein the particular tool is a speech approval tool, further comprising instructions causing the system to execute the particular tool by:

generating a transcript including text representing a proposed audio response, generated by the voice agent, to the audio stream;

causing display, within a heads-up display (HUD) viewable by the user, of the transcript and an approval button;

upon interaction, by the user, with the approval button, determining that the proposed audio response is approved for production; and directing the voice agent to produce the proposed audio response.

20. The one or more non-transitory, computer-readable storage media of claim 15, further comprising instructions causing the system to:

cause display, within the HUD viewable by the user, of a mute toggle for the voice agent and a deafen toggle for the voice agent;

receive, from the user, a selection of the mute toggle;

in response to the selection of the mute toggle, direct the voice agent to either produce audio responses or refrain from producing audio responses;

receive, from the user, a selection of the deafen toggle; and in response to the selection of the deafen toggle, direct the voice agent to either refrain from processing the audio stream or resume processing the audio stream.

* * * * *